(12) United States Patent
Kato

(10) Patent No.: US 12,445,711 B2
(45) Date of Patent: Oct. 14, 2025

(54) APPARATUS, IMAGE PROCESSING SYSTEM, COMMUNICATION SYSTEM, METHOD FOR SETTING, IMAGE PROCESSING METHOD, AND RECORDING MEDIUM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 17/760,922

(22) PCT Filed: Sep. 23, 2020

(86) PCT No.: PCT/IB2020/058857
§ 371 (c)(1),
(2) Date: Mar. 16, 2022

(87) PCT Pub. No.: WO2021/059139
PCT Pub. Date: Apr. 1, 2021

(65) Prior Publication Data
US 2022/0345619 A1  Oct. 27, 2022

(30) Foreign Application Priority Data

Sep. 27, 2019 (JP) ................... 2019-177611
Mar. 6, 2020 (JP) ................... 2020-038773
(Continued)

(51) Int. Cl.
*H04N 23/62* (2023.01)
*G06T 7/20* (2017.01)
(Continued)

(52) U.S. Cl.
CPC ............... *H04N 23/62* (2023.01); *G06T 7/20* (2013.01); *G06V 20/52* (2022.01); *H04N 7/183* (2013.01);
(Continued)

(58) Field of Classification Search
CPC .. H04N 23/62; H04N 7/183; H04N 21/23418; H04N 21/4728; G06V 20/52; G06T 7/20
See application file for complete search history.

(56) References Cited

U.S. PATENT DOCUMENTS

2006/0093185 A1    5/2006  Kato et al.
2012/0140068 A1 *  6/2012  Monroe ................. H04N 7/183
                                                           348/143
(Continued)

FOREIGN PATENT DOCUMENTS

CN    110 263 703 A    9/2019
EP     1 267 313 A2   12/2002
(Continued)

OTHER PUBLICATIONS

European Office Action dated Oct. 11, 2023 issued in corresponding European Patent Application No. 20786066.9.
(Continued)

*Primary Examiner* — Sunghyoun Park
(74) *Attorney, Agent, or Firm* — Harness, Dickey & Pierce, P.L.C.

(57) ABSTRACT

An apparatus includes: display controlling means for displaying, on a display, a viewable-area image representing a viewable area of a captured image having been captured; and accepting means for receiving an instruction to set the viewable-area image as a detectable area in which an object can be detected.

24 Claims, 45 Drawing Sheets

| | | | |
|---|---|---|---|
| (30) | Foreign Application Priority Data | | |
| Sep. 8, 2020 | (JP) | | 2020-150328 |
| Sep. 8, 2020 | (JP) | | 2020-150329 |

(51) Int. Cl.
    *G06V 20/52*     (2022.01)
    *H04N 7/18*     (2006.01)
    *H04N 21/234*     (2011.01)
    *H04N 21/4728*     (2011.01)

(52) U.S. Cl.
    CPC ... *H04N 21/23418* (2013.01); *H04N 21/4728* (2013.01)

(56) References Cited

U.S. PATENT DOCUMENTS

| | | | | |
|---|---|---|---|---|
| 2012/0236133 | A1* | 9/2012 | Gallagher | G06T 5/50 |
| | | | | 348/E13.037 |
| 2012/0327188 | A1* | 12/2012 | Takemura | G08G 1/167 |
| | | | | 348/148 |
| 2014/0218612 | A1 | 8/2014 | Belsarkar | |
| 2014/0353044 | A1* | 12/2014 | Lambert | E21B 34/06 |
| | | | | 175/236 |
| 2015/0103178 | A1* | 4/2015 | Itoh | G06V 20/41 |
| | | | | 348/159 |
| 2015/0279116 | A1 | 10/2015 | Yachida | |
| 2016/0210516 | A1* | 7/2016 | Kim | H04N 7/181 |
| 2016/0277772 | A1* | 9/2016 | Campbell | G06T 19/006 |
| 2017/0185828 | A1 | 6/2017 | Yamamoto et al. | |
| 2017/0296913 | A1* | 10/2017 | Numaguchi | G06F 3/017 |
| 2017/0358186 | A1* | 12/2017 | Harpole | G08B 13/19615 |
| 2018/0365814 | A1* | 12/2018 | Yokomizo | H04N 23/81 |
| 2019/0080197 | A1 | 3/2019 | Kato | |
| 2019/0104254 | A1 | 4/2019 | Cha et al. | |
| 2019/0130167 | A1 | 5/2019 | Ng et al. | |
| 2019/0130752 | A1* | 5/2019 | Takaki | B60T 7/12 |
| 2019/0174070 | A1 | 6/2019 | Jang | |
| 2019/0318171 | A1* | 10/2019 | Wang | G06V 10/764 |
| 2020/0029027 | A1* | 1/2020 | Behrenberg | H04N 21/21805 |

FOREIGN PATENT DOCUMENTS

| | | | |
|---|---|---|---|
| EP | 2 112 637 | A1 | 10/2009 |
| GB | 2 570 498 | A | 7/2019 |
| JP | 2006-113711 | | 4/2006 |
| JP | 2012-065010 | A | 3/2012 |
| JP | 2016-178406 | A | 10/2016 |
| JP | 2017-118324 | A | 6/2017 |
| JP | 2019-049978 | | 3/2019 |
| JP | 2019-095523 | A | 6/2019 |
| JP | 2019-103074 | A | 6/2019 |
| JP | 2020-025258 | A | 2/2020 |
| KR | 2016 0078154 | A | 7/2016 |
| WO | WO 2019/026828 | A1 | 2/2019 |

OTHER PUBLICATIONS

Dantone, Matthias, et al. "Augmented Faces," 2011 IEEE International Conference on Computer Vision Workshops (ICCV Workshops), IEEE Nov. 6, 2011, pp. 24-31.

International Search Report issued on Jan. 14, 2021 in PCT/IB2020/058857 filed on Sep. 23, 2020.

Office Action dated Apr. 30, 2024 issued in corresponding Japanese Patent Application No. 2020-150328.

Office Action dated Feb. 6, 2024 issued in corresponding Japanese Patent Application No. 2020-150329.

Office Action dated Aug. 20, 2024 issued in corresponding Japanese Patent Application No. 2020-150328.

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

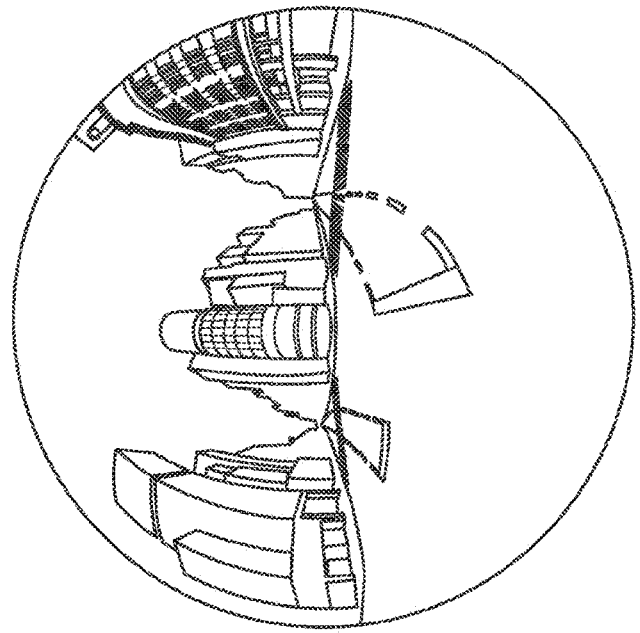
FIG. 5A
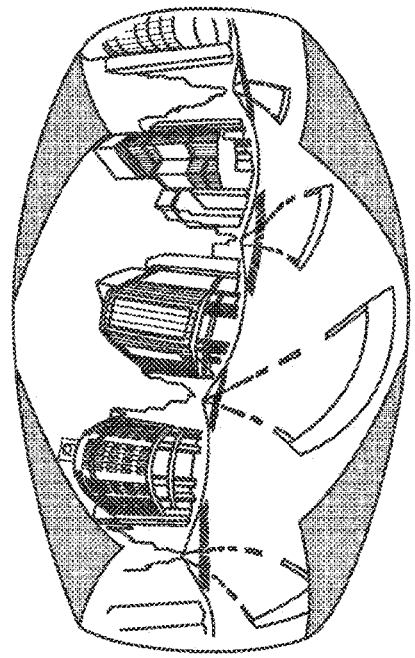
FIG. 5B
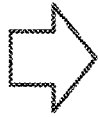
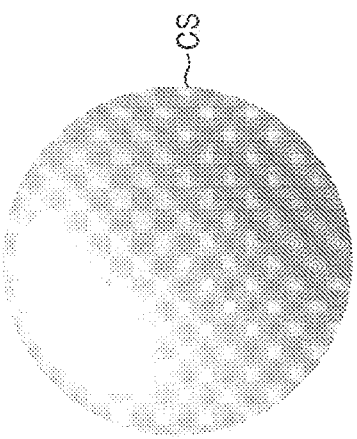

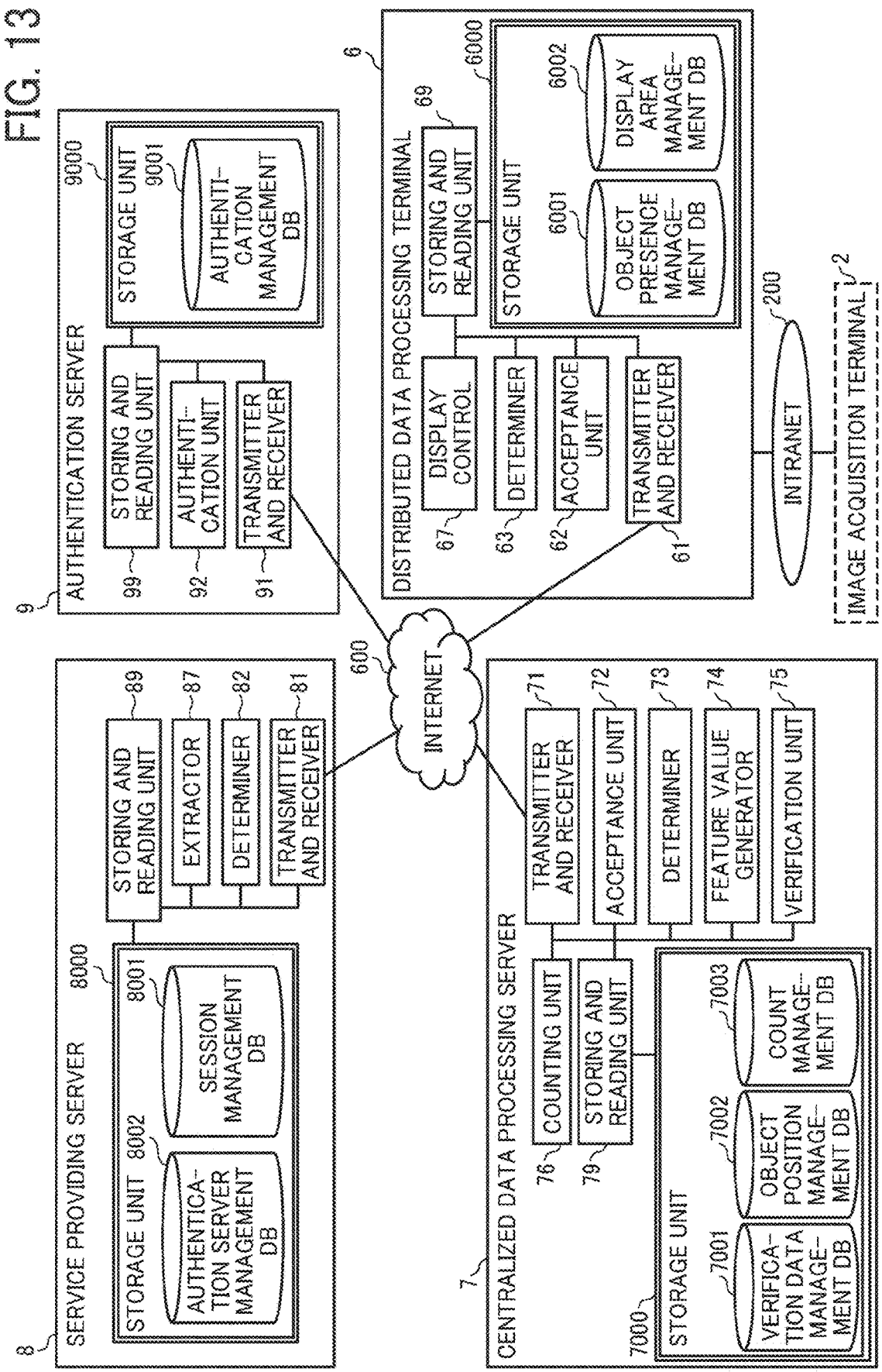

FIG. 14A

| MODEL NUMBER (TYPE) | NUMBER OF IMAGING ELEMENTS | LENS TYPE |
|---|---|---|
| AAA111 | 1 | WIDE-ANGLE LENS |
| AAA112 | 2 | FISH-EYE LENS |
| ... | ... | ... |

FIG. 14B

| NUMBER OF IMAGING ELEMENTS | CYCLE VALUE (fps) |
|---|---|
| 1 | 60 |
| 2 | 30 |
| ... | ... |

FIG. 15A

| NUMBER OF IMAGING ELEMENTS | IMAGE ACQUISITION PROGRAM |
|---|---|
| 1 | ProgC01 (1 SYSTEM) |
| 2 | ProgC02 (2 SYSTEMS) |
| ... | ... |

FIG. 15B

| NUMBER OF IMAGING ELEMENTS | IMAGE COMPOSITION PROGRAM |
|---|---|
| 1 | NONE |
| 2 | ProgS02 (IMAGE COMPOSITION) |
| ... | ... |

FIG. 15C

| LENS TYPE | DISTORTION CORRECTION PROGRAM |
|---|---|
| WIDE-ANGLE LENS | ProgW01 (WIDE-ANGLE CORRECTION) |
| FISH-EYE LENS | ProgW02 (FISH-EYE CORRECTION) |
| ... | ... |

FIG. 15D

| AUTHENTICATION SERVER ID | SERVICE PROGRAM |
|---|---|
| a01 | ProgD01 (OBJECT DETECTION) |
| a02 | ProgD02 (OBJECT COUNTING) |
| a03 | ProgD03 (... PROCESS) |

FIG. 16

OBJECT INFORMATION MANAGEMENT TABLE

| NUMBER | POSITION (COORDINATE) | WIDTH | HEIGHT | MATCH FLAG |
|---|---|---|---|---|
| 1 | xn0, yn0 | width0 | height0 | |
| 2 | xn1, yn1 | width1 | height1 | |
| 3 | xn2, yn2 | width2 | height2 | * |
| ... | ... | ... | ... | ... |

FIG. 17

OBJECT DISPLACEMENT MANAGEMENT TABLE

| PARTIAL IMAGE ID | POSITION (COORDINATE) | WIDTH | HEIGHT | VERIFICATION STATUS | OBJECT ID | MATCH FLAG |
|---|---|---|---|---|---|---|
| p001 | x0, y0 | width0 | height0 | 0 (BEFORE VERIFICATION) | | |
| p002 | x1, y1 | width1 | height1 | 1 (VERIFYING) | | |
| p003 | x2, y2 | width2 | height2 | 2 (VERIFICATION COMPLETED) | | |
| p004 | x3, y3 | width3 | height3 | | s001 | |
| ... | ... | ... | ... | ... | ... | ... |

FIG. 18A

| OBJECT ID |
|---|
| S001 |
| S002 |
| ... |

FIG. 18B

| | TARGET AREA | DESTINATION AREA | | | |
|---|---|---|---|---|---|
| | | LEFT | UPPER | RIGHT | LOWER |
| DETECTION AREA DISPLAY FIELD | 1 | 2 | 3 | 4 | |

FIG. 19A

| FILE NAME OF OBJECT IMAGE | OBJECT ID |
|---|---|
| s001.jpg | s001 |
| s002.jpg | s002 |
| ... | ... |

FIG. 19B

| DATE/TIME | AREA NUMBER | OBJECT ID |
|---|---|---|
| ... | ... | ... |
| 2019/4/16 08:50:46 | 1 | s001 |
| 2019/4/16 08:51:38 | 2 | s001 |
| 2019/4/16 08:51:49 | 1 | s002 |
| ... | ... | ... |

FIG. 19C

| TIME SLOT | DESTINATION AREA | | | |
|---|---|---|---|---|
| | LEFT | UPPER | RIGHT | LOWER |
| ... | ... | ... | ... | ... |
| 2019/4/16 08 | 0 | 0 | 0 | 0 |
| 2019/4/16 09 | 0 | 10 | 2 | 0 |
| 2019/4/16 10 | 1 | 2 | 1 | 0 |
| ... | ... | ... | ... | ... |

FIG. 20

SESSION MANAGEMENT TABLE

| SESSION ID | TERMINAL ID | IP ADDRESS |
|---|---|---|
| se01 | asai@myhost.ricoo.com/theta1 | 1.2.1.3 |
| se02 | asai@myhost.ricoo.com/pc | 1.2.1.4 |
| se03 | jim@myhost.obrom.com/theta2 | 1.2.2.3 |
| ... | ... | ... |

FIG. 22

AUTHENTICATION SERVER MANAGEMENT TABLE

| AUTHENTICATION SERVER ID | AUTHENTICATION SERVER URL |
|---|---|
| a01 | http:// ⋯ |
| a02 | http:// ⋯ |
| a03 | http:// ⋯ |
| ⋯ | ⋯ |

FIG. 23A

AUTHENTICATION MANAGEMENT TABLE

| USER ID (SUBJECT FOR AUTHENTICATION) | PASSWORD |
|---|---|
| asai@myhost.ricoo.com | aaaa |
| jim@myhost.obrom.com | abab |
| ⋯ | ⋯ |

FIG. 23B

AUTHENTICATION MANAGEMENT TABLE

| USER ID (SUBJECT FOR AUTHENTICATION) | PASSWORD |
|---|---|
| asai | baba |
| kurt | bbbb |
| ⋯ | ⋯ |

FIG. 23C

AUTHENTICATION MANAGEMENT TABLE

| USER ID (SUBJECT FOR AUTHENTICATION) | PASSWORD |
|---|---|
| kondo | caca |
| kulbaski | cccc |
| ⋯ | ⋯ |

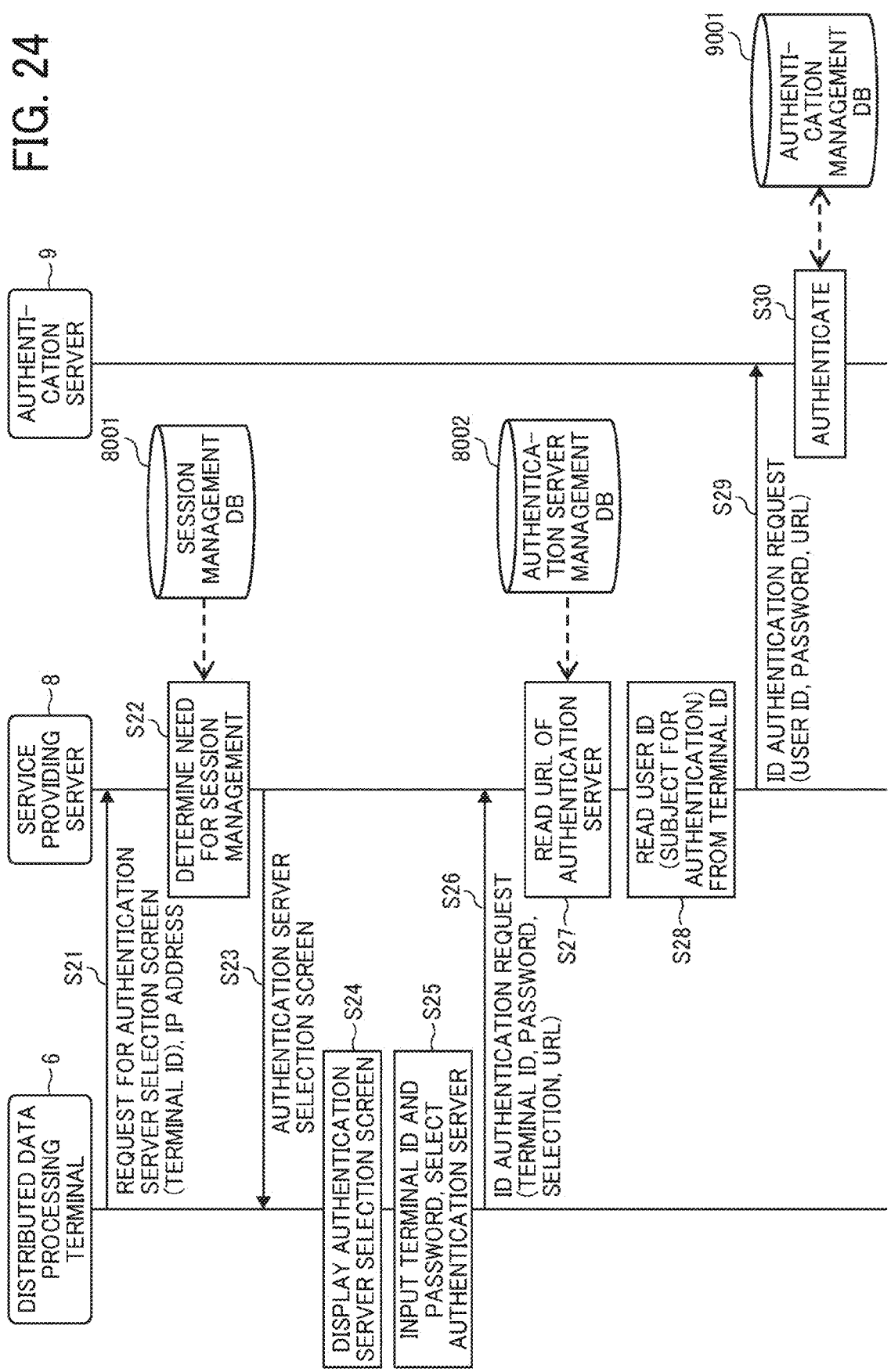

APPARATUS, IMAGE PROCESSING SYSTEM, COMMUNICATION SYSTEM, METHOD FOR SETTING, IMAGE PROCESSING METHOD, AND RECORDING MEDIUM

CROSS-REFERENCE TO RELATED APPLICATIONS

This application is a national phase under 35 U.S.C. § 371 of PCT International Application No. PCT/IB2020/058857 which has an International filing date of Sep. 23, 2020, which claims priority to Japanese Patent Application No. 2020-150329, filed Sep. 8, 2020, Japanese Patent Application No. 2020-150328, filed Sep. 8, 2020, Japanese Patent Application No. 2020-038773, filed Mar. 6, 2020 and Japanese Patent Application No. 2019- 177611 filed Sep. 27, 2019, the entire contents of each of which are hereby incorporated by reference.

TECHNICAL FIELD

The present disclosure relates to an apparatus, image processing system, communication system, method for setting, image processing method, and recording medium.

BACKGROUND ART

In a flow line analysis, movement of a person can be visualized by detecting an object in a captured image having been captured with a camera. For example, PTL 1 discloses a communication terminal that determines degree of similarities between a detected object in the captured image and a registered image to check if there is any unknown person. PTL 2 discloses a marketing information providing system, which generates information to track activity of an object, such as a person, in the captured image.

CITATION LIST

Patent Literature

[PTL 1] Japanese Unexamined Patent Application Publication No. 2019-49978
[PTL 2] Japanese Unexamined Patent Application Publication No. 2006-113711

SUMMARY OF INVENTION

Technical Problem

In the background art, it has been difficult to easily set an area in the captured image, as a detectable area in which an object, such as a person, can be detected.

For example, a user may want to select a specific area in the captured image, as the detectable area to detect any object in that specific area. In another example, a user may want to divide the area in the captured image into a plurality of detectable areas to track activity, such as movement, of any object from one area to other area.

Solution to Problem

In view of the above, an apparatus is provided, which includes: display controlling means for displaying, on a display, a viewable-area image representing a viewable area of a captured image having been captured; and accepting means for receiving an instruction to set the viewable-area image as a detectable area in which an object can be detected.

Advantageous Effects of Invention

According to one aspect of the present invention, one or more areas in the captured image can be easily set as a detectable area.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 5A and FIG. 5B are views respectively illustrating the image in equirectangular projection covering a surface of a sphere, and a spherical image, according to an embodiment.

FIG. 13 is another schematic diagram illustrating a functional configuration of the communication system of FIG. 1, according to the embodiment.

FIG. 14A is a conceptual diagram illustrating an example of image element data management table; FIG. 14B is a conceptual diagram illustrating an example of cycle value management table.

FIG. 15A is a conceptual diagram illustrating an example of image acquisition program management table; FIG. 15B is a conceptual diagram illustrating an example of image composition program management table; FIG. 15C is a conceptual diagram illustrating an example of distortion correction program management table; FIG. 15D is a conceptual diagram illustrating an example of service program management table.

FIG. 16 is a conceptual diagram of an object information management table, according to an embodiment.

FIG. 17 is a conceptual diagram illustrating an example of object displacement management table.

FIG. 18A is a conceptual diagram illustrating an example of object presence management table; FIG. 18B is a conceptual diagram illustrating an example of display area management table.

FIG. 19A is a conceptual diagram illustrating an object management table, according to an embodiment; FIG. 19B is a conceptual diagram illustrating an object position management table, according to an embodiment; FIG. 19C is a conceptual diagram illustrating a count management table, according to an embodiment.

FIG. 20 is a conceptual diagram of an example session management table.

FIG. 22 is a conceptual diagram illustrating an example of authentication server management table.

FIGS. 23A, 23B, and 23C are each a conceptual diagram illustrating an example of authentication management table.

FIG. 24 is a sequence diagram illustrating authentication processing according to an embodiment.

DESCRIPTION OF EMBODIMENTS

Figure 1:
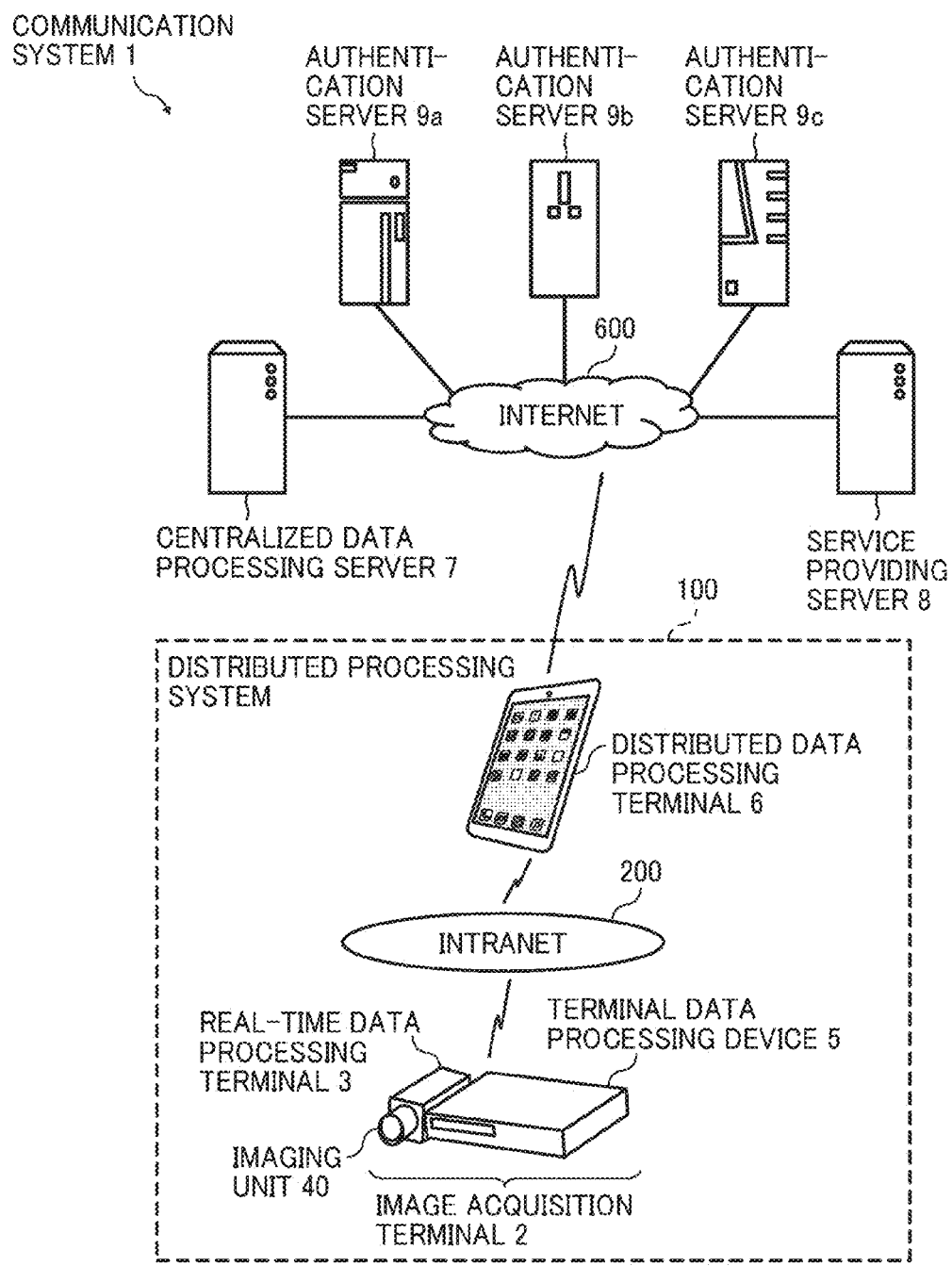
FIG. 1 is a schematic diagram illustrating a configuration of a communication system according to an embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview:

Referring to the drawings, one or more embodiments of the present invention are described. The following describes a communication system for edge computing. As described below, the image acquisition terminal 2 and the service providing server 8 operate in cooperation with each other to provide various types of services. Specifically, the image acquisition terminal 2, as an edge device, performs operation according to various types of services provided by the service providing server 8.

System Configuration:

FIG. 1 is a schematic diagram illustrating a configuration of a communication system 1 according to an embodiment. As illustrated in FIG. 1, the communication system 1 of this embodiment includes a real-time data processing terminal 3, a terminal data processing device 5, a distributed data processing terminal 6, the centralized data processing server 7, a service providing server 8, and a plurality of authentication servers 9a, 9b, and 9c. The real-time data processing terminal 3, the terminal data processing device 5, and the distributed data processing terminal 6 together operate as a distributed processing system 100.

The terminal data processing device 5 is communicably connected to the distributed data processing terminal 6 via the intranet 200. The distributed data processing terminal 6 is communicably connected to the centralized data processing server 7, the service providing server 8, and the authentication servers 9a, 9b, and 9c via the Internet 600. In this disclosure, the authentication servers 9a, 9b, and 9c are collectively referred to as the authentication server 9.

The real-time data processing terminal 3 is a terminal that captures images in real-time to obtain real-time captured image data. This processing to capture images in real-time may be referred to as real-time processing. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. The real-time data processing terminal 3 digitizes the captured image, which is input from the imaging unit 40, into captured image data, and detects a specific object (here, an image of a human face) in the captured image in real-time (for example, every 1/60 seconds). The real-time data processing terminal 3 transmits, to the terminal data processing device 5, data of a partial image of the captured image having the detected object ("partial image data").

The terminal data processing device 5, which is located closely to the real-time data processing terminal 3, is connected to the real-time data processing terminal 3 in a one-to-one correspondence, for example, by a data bus, a Universal Serial Bus (USB), or the like. The terminal data processing device 5 encodes the partial image data received from the real-time data processing terminal 3 into encoded partial image data in a general-purpose format such as Joint Photographic Experts Group (JPEG). The terminal data processing device 5 further transmits the encoded partial image data to the distributed data processing terminal 6 via the intranet 200, as data to be verified in processing of facial image verification. The real-time data processing terminal 3 and the terminal data processing device 5 are connected with each other so as to together function as the image acquisition terminal 2.

The distributed data processing terminal 6 is a computer that accepts various operations from a user, and is disposed at a location relatively close to the terminal data processing device 5, compared to a location of the centralized data processing server 7 with respect to the distributed data processing terminal 6. The distributed data processing terminal 6 previously registers verification data for facial image verification. The distributed data processing terminal 6 transmits a request, via the Internet 600, for requesting the centralized data processing server 7 to verify the data to be verified, using the verification data. In such case, the distributed data processing terminal 6 also transmits, to the centralized data processing server 7, the data to be verified that is received from the terminal data processing device 5 and the pre-registered verification data. In response, the distributed data processing terminal 6 receives, from the centralized data processing server 7, verification result information indicating the verification result. Further, the distributed data processing terminal 6 displays the received verification result via a graphical interface.

The centralized data processing server 7 is disposed at a location relatively far from the terminal data processing device 5, compared to a location of the terminal data processing device 5 to the distributed data processing terminal 6. The centralized data processing server 7 communicates with the distributed data processing terminal 6 via a communication network such as the Internet 600. In response to reception of the verification request, the verification data, and the data to be verified, the centralized data processing server 7 compares between the verification data and the data to be verified to calculate the degree of similarity. The centralized data processing server 7 transmits verification result information indicating the verification result that includes the calculated similarity to the distributed data processing terminal 6.

The service providing server 8 provides the image acquisition terminal 2 with various services.

The authentication server 9a authenticates the image acquisition terminal 2, to determine whether or not the image acquisition terminal 2 has authorized authority to receive various services from the service providing server 8. This also applies to the authentication servers 9b and 9c.

Hardware Configuration:

Referring now to FIGS. 2 to 10, a hardware configuration of the communication system 1 is described according to the embodiment.

Figure 2:
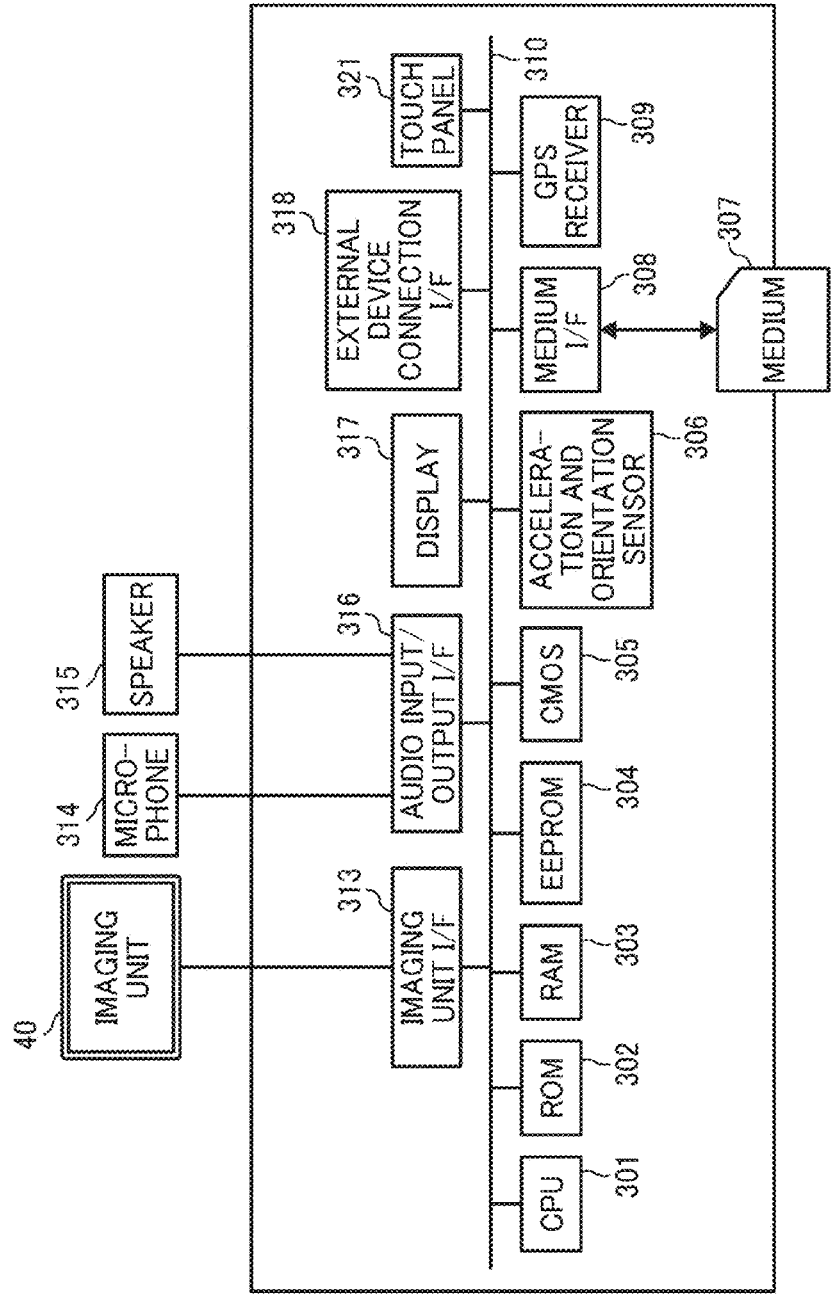
FIG. 2 is a schematic diagram illustrating a hardware configuration of a real-time data processing terminal, according to an embodiment.

Hardware Configuration of Real-Time Data Processing Terminal:

FIG. 2 is a schematic diagram illustrating a hardware configuration of the real-time data processing terminal 3, according to the embodiment. The real-time data processing terminal 3 includes a central processing unit (CPU) 301, a read only memory (ROM) 302, a random access memory (RAM) 303, an Electrically Erasable Programmable Read-Only Memory (EEPROM) 304, a CMOS sensor 305, an acceleration and orientation sensor 306, a medium interface (I/F) 308, and a GPS receiver 309.

The CPU 301 controls entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal 3 under control of the CPU 301. Under control of the CPU 301, the CMOS sensor 305 captures an image of a target (mainly a blind spot of the imaging unit 40) to obtain captured image data. The acceleration and orientation sensor 306 includes various sensors such as an electromagnetic compass or gyrocompass for detecting geomagnetism, and an acceleration sensor. The medium I/F 308 controls reading or writing of data with respect to a recording medium 307 such as a flash memory. The GPS receiver 309 receives a GPS signal from a GPS satellite.

The real-time data processing terminal 3 further includes an imaging unit I/F 313, a microphone 314, a speaker 315, an audio input/output (I/O) I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of audio collecting device, which is a built-in type, capable of inputting audio under control of the CPU 401. The audio I/O I/F 316 is a circuit for inputting or outputting an audio signal to the microphone 314 or from the speaker 315 under control of the CPU 301. The display 317 may be a liquid crystal or organic electro luminescence (EL) display that displays an image of a target, an operation icon, or the like. The external device connection I/F 318 is an interface circuit that connects the real-time data processing terminal 3 to various external devices. The touch panel 321 is an example of input device that enables the user to input a user instruction to the real-time data processing terminal 3 through touching a screen of the display 317.

The real-time data processing terminal 3 further includes a bus line 310. The bus line 310 is an address bus or a data bus, which electrically connects the elements in FIG. 2 such as the CPU 301.

Figure 3A:
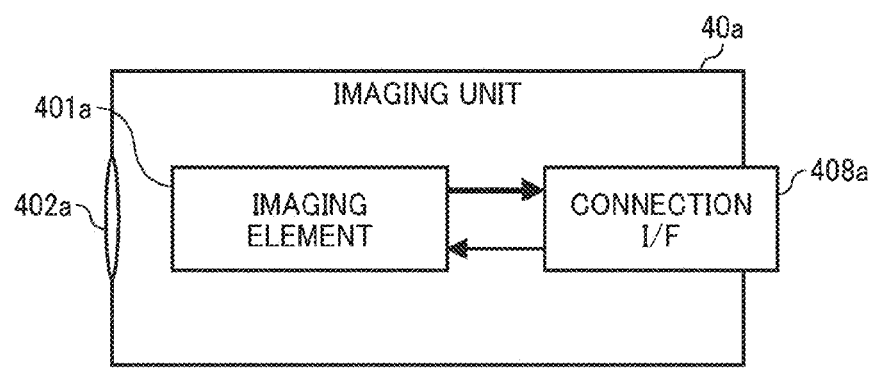
FIGS. 3A and 3B (FIG. 3) are schematic diagrams each illustrating a hardware configuration of an imaging unit, according to an embodiment.
Figure 3B:
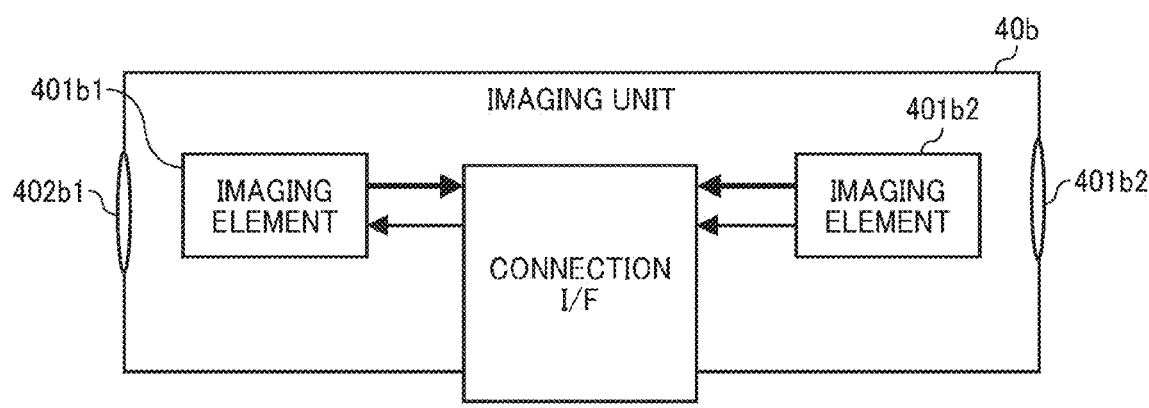

Hardware Configuration of Imaging Unit:

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fish-eye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data.

Figure 4A:
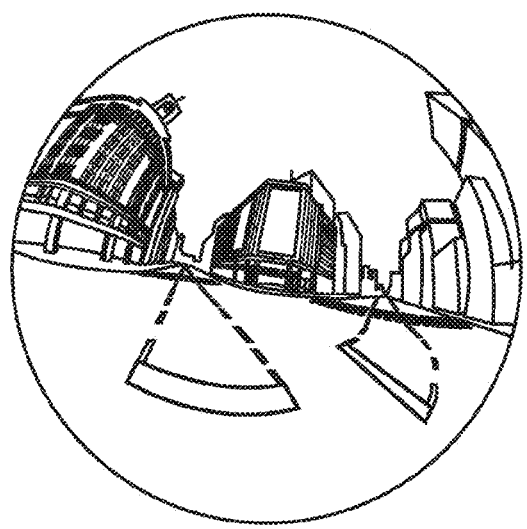
FIG. 4A is a view illustrating an example of hemispherical image (front side) captured by the imaging unit of FIG. 3A.
Figure 4B:
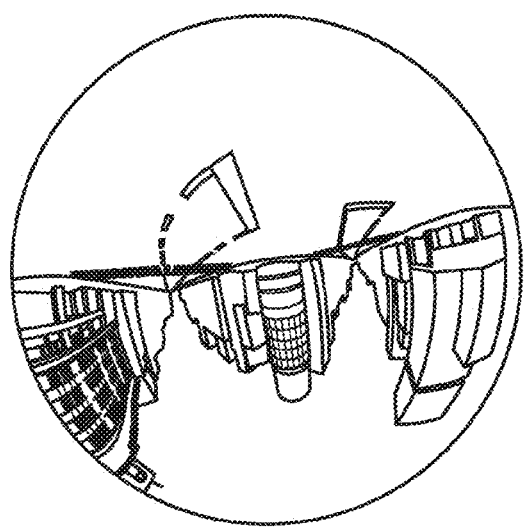
FIG. 4B is a view illustrating an example of hemispherical image (back side) captured by the imaging unit of FIG. 3B.
Figure 4C:
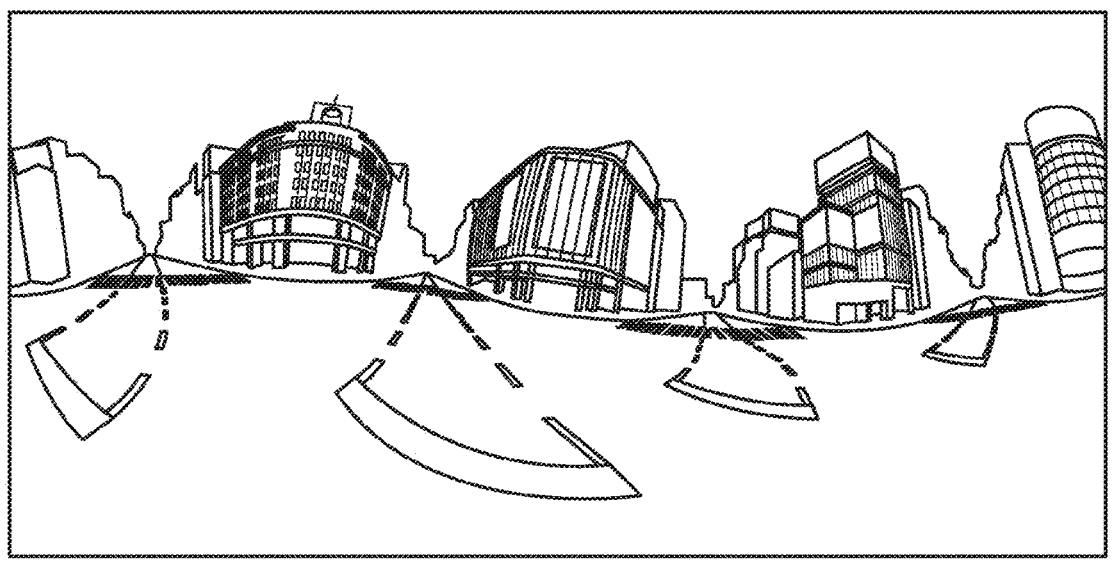
FIG. 4C is a view illustrating an example image in equirectangular projection, which is referred to as an "equirectangular projection image" (or equidistant cylindrical projection image).

The imaging unit 40b illustrated in FIG. 3B obtains a spherical image, which may be referred to as an equirectangular projection image as described below. Next, referring to FIG. 4A to FIG. 8, a description is given of an overview of operation of generating an equirectangular projection image EC and a spherical image CE from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC. FIG. 5A is a conceptual diagram illustrating an example of how the equirectangular projection image maps to a surface of a sphere. FIG. 5B is a view illustrating the spherical image.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in generation of the equirectangular projection image EC as illustrated in FIG. 4C.

The equirectangular projection image is mapped on the sphere surface using Open Graphics Library for Embedded Systems (OpenGL ES) as illustrated in FIG. 5A. This results in generation of the spherical image CE as illustrated in FIG. 5B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 5B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "viewable-area image" Q. While the predetermined area can be set by default at least initially, the predetermined area may be changed according to a user operation. Hereinafter, a description is given of displaying the viewable-area image Q with reference to FIG. 6 and FIGS. 7A and 7B.

Figure 6:
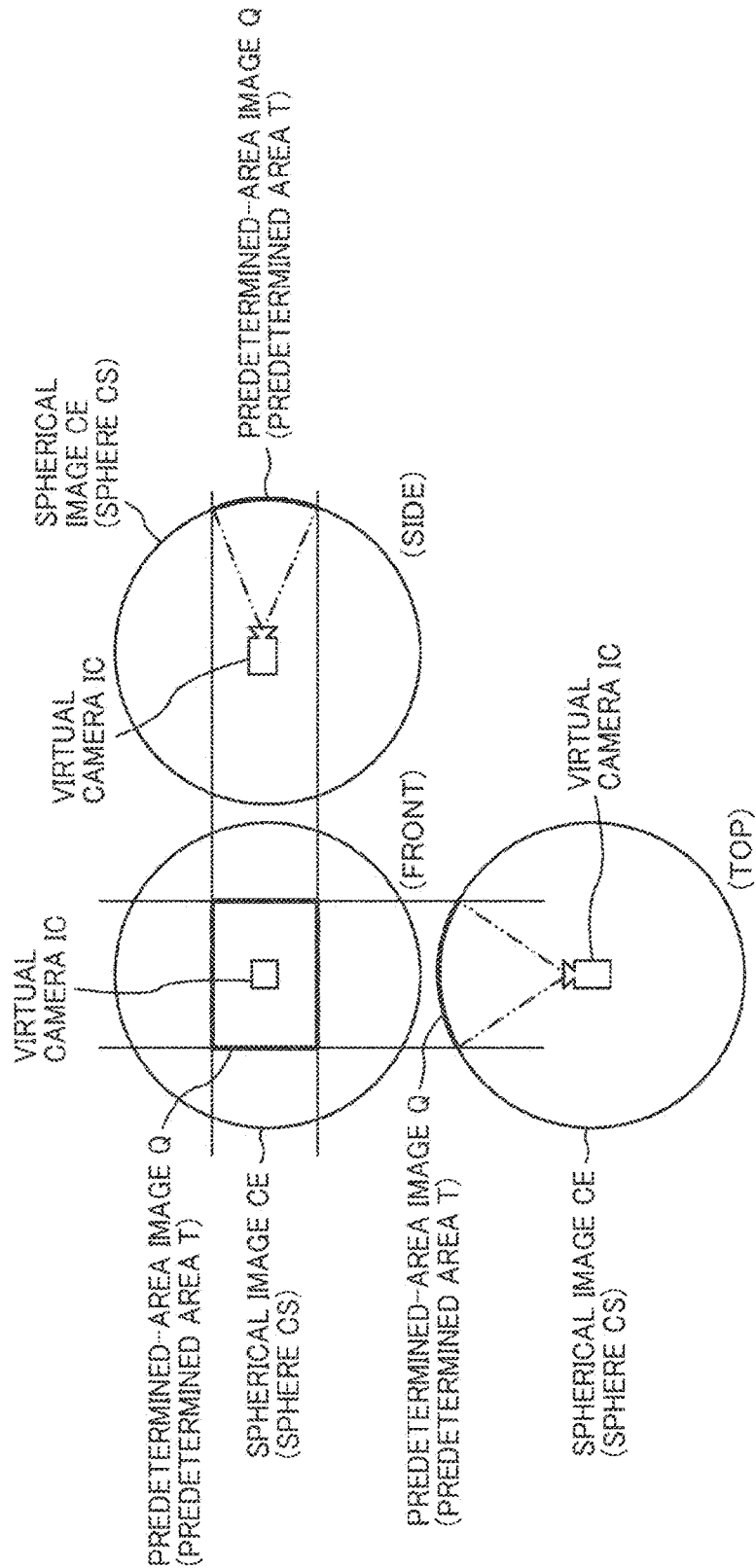
FIG. 6 is a view illustrating positions of a virtual camera and a viewable area in a case in which the spherical image is represented as a three-dimensional solid sphere according to an embodiment.
Figure 7A:
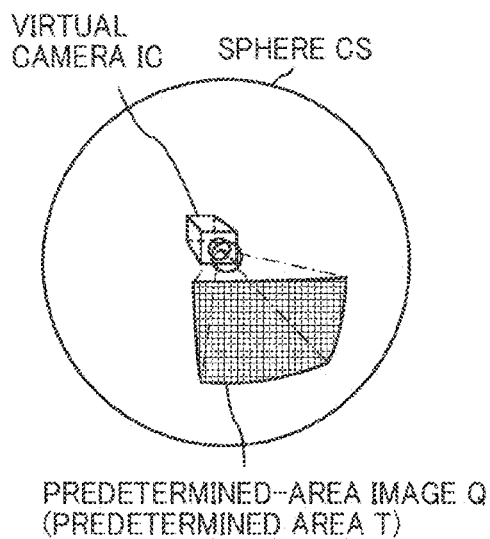
FIGS. 7A and 7B are respectively a perspective view of FIGS. 5A and 5B, and a view illustrating an image of the viewable area on a display, according to an embodiment.
Figure 7B:
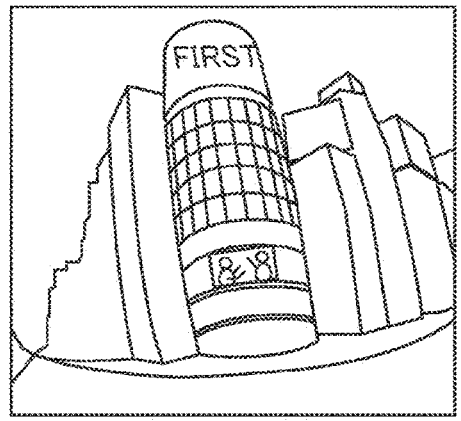

FIG. 6 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 7A is a perspective view of the spherical image CE illustrated in FIG. 6. FIG. 7B is a view illustrating the viewable-area image Q when displayed on a display. In FIG. 7A, the spherical image CE illustrated in FIG. 5B is represented as a surface area of the three-dimensional solid sphere CS. Assuming that the spherical image CE is a surface area of the solid sphere CS, the virtual camera IC is inside of the spherical image CE as illustrated in FIG. 6. The predetermined area T in the spherical image CE is an imaging area of the virtual camera IC. Specifically, the predetermined area T is specified by viewable-area information indicating an imaging direction and an angle of view of the virtual camera IC in a three-dimensional virtual space containing the spherical image CE.

The viewable-area image Q, which is an image of the viewable area T illustrated in FIG. 7A, is displayed on a display as an image of an imaging area of the virtual camera IC, as illustrated in FIG. 7B. FIG. 7B illustrates the viewable-area image Q represented by the viewable-area information that is set by default. The following explains the position of the virtual camera IC, using an imaging direction (ea, aa) and an angle of view α of the virtual camera IC.

Figure 8:
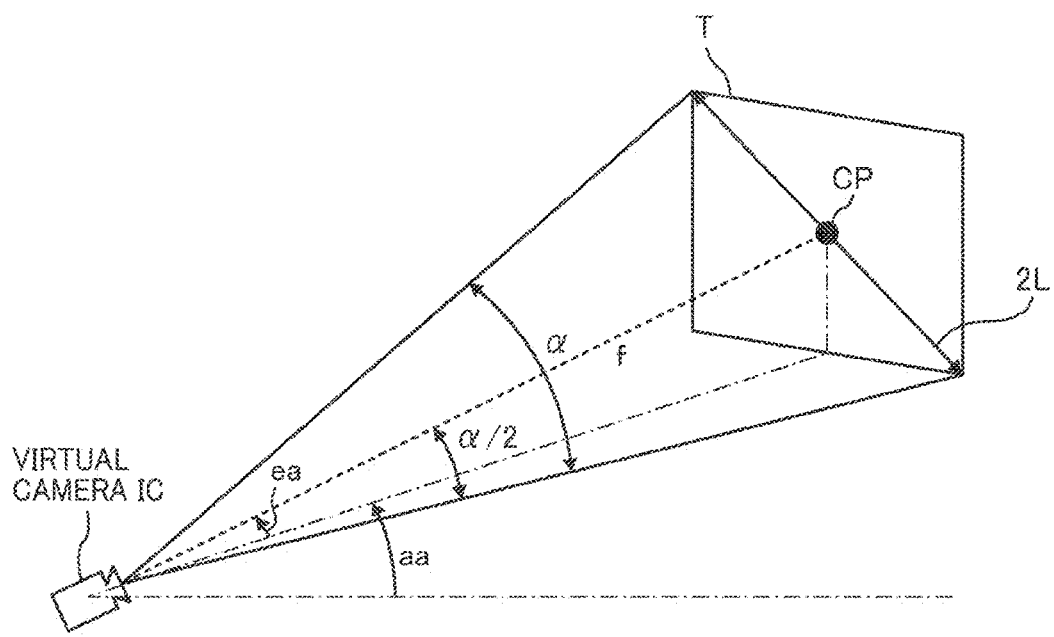
FIG. 8 is a view illustrating a relation between the viewable-area information and the image of the viewable area according to an embodiment.

Referring to FIG. 8, a relation between the viewable-area information and the image of the viewable area T is described according to the embodiment. FIG. 8 is a view illustrating a relation between the viewable-area information and the image of the viewable area T. As illustrated in FIG. 8, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the viewable area T as the imaging area of the virtual camera IC. The viewable-area image Q is an image of the viewable area T, in the spherical image CE. "f" denotes a distance from the virtual camera IC to the central point CP of the viewable area T. L is a distance between the center point CP and a given vertex of the viewable area T (2L is a diagonal line). In FIG. 8, a trigonometric function equation generally expressed by the equation 1: $L/f=\tan(\alpha/2)$ is satisfied. Since the center point CP can be specified by the imaging direction (ea, aa) and the distance f, the viewable area information can be represented by the center point CP and the angle of view α.

Figure 9:
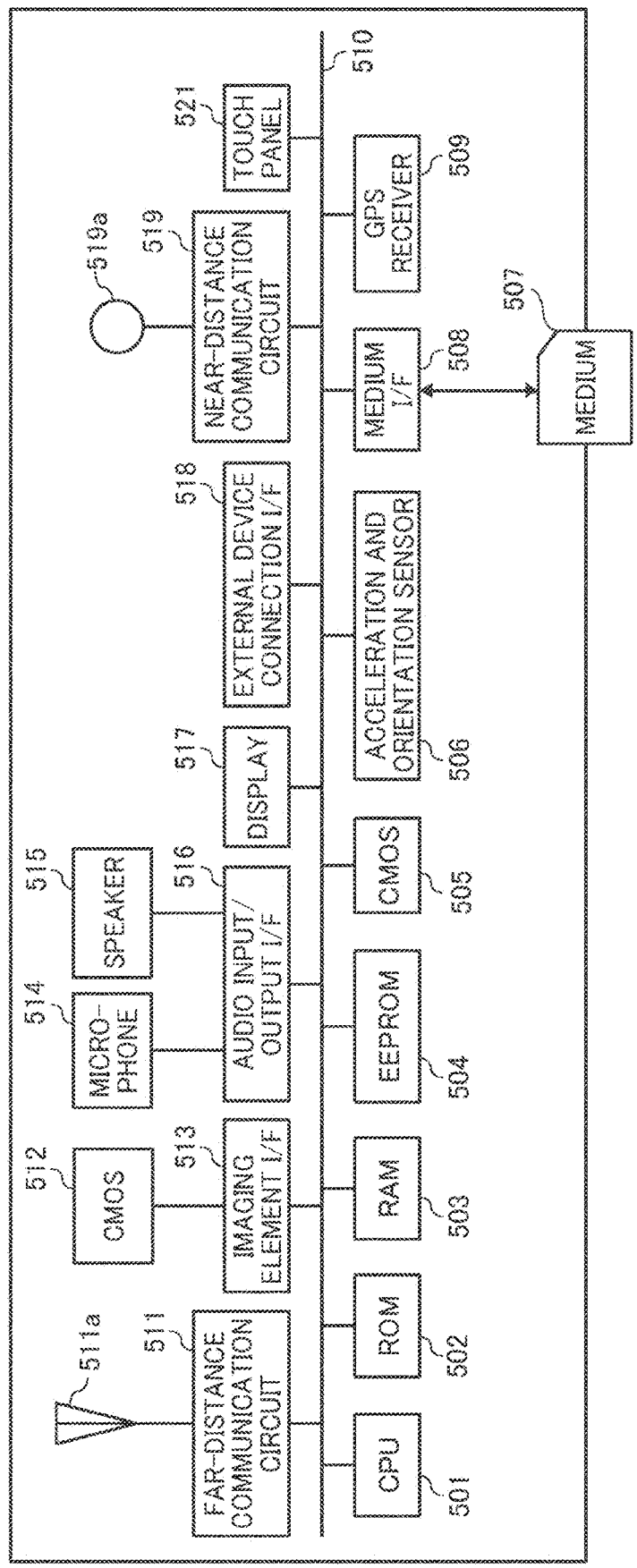
FIG. 9 is a schematic diagram illustrating a hardware configuration of each one of a terminal data processing device and a distributed data processing terminal, according to an embodiment.

Hardware Configuration of Terminal Data Processing Device and Distributed Data Processing Terminal:

FIG. 9 is a schematic diagram illustrating a hardware configuration of each one of the terminal data processing device 5 and the distributed data processing terminal 6, according to the embodiment. Since the terminal data processing device 5 and the distributed data processing terminal 6 are substantially the same in hardware configuration, an example case of the terminal data processing device 5 is described below, while omitting the description of the distributed data processing terminal 6.

As illustrated in FIG. 9, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass or gyrocompass for detecting geomagnetism, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a long-range communication circuit 511, an antenna 511a for the long-range communication circuit 511, a camera 512, an imaging element I/F 513, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with another device through the intranet 200, for example. The camera 512 is an example of built-in imaging device capable of capturing a target under control of the CPU 501 to obtain captured image data. The imaging element I/F 513 is a circuit that controls driving of the camera 512. The microphone 514 is an example of audio collecting device, which is a built-in type, capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the terminal data processing device 5 to various external devices. The short-range communication circuit 519 is a communication circuit that communicates in compliance with the near field communication (NFC), the Bluetooth (Registered Trademark), and the like. The touch panel 521 is an example of input device that enables the user to input a user instruction to the terminal data processing device 5 through touching a screen of the display 517.

The terminal data processing device 5 further includes a bus line 510. The bus line 510 may be an address bus or a data bus, which electrically connects various elements such as the CPU 501 of FIG. 9.

Figure 10:
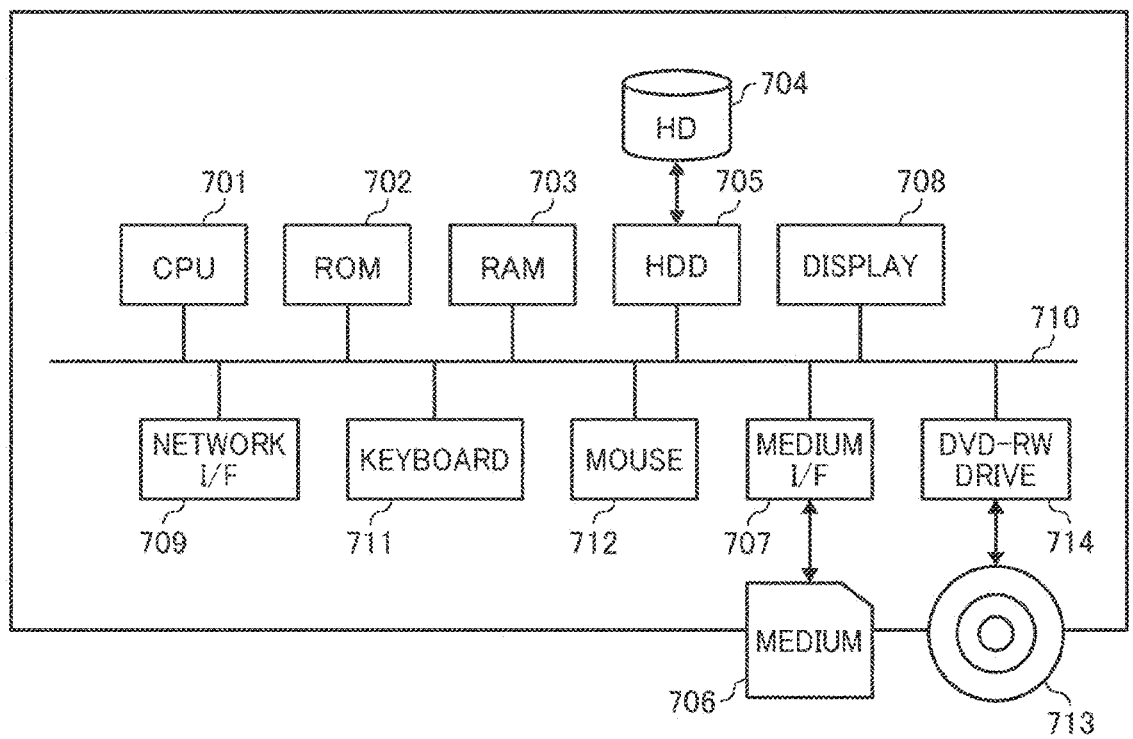
FIG. 10 is a schematic diagram illustrating a hardware configuration of a centralized data processing server, according to an embodiment.

Hardware Configuration of Centralized Data Processing Server, Service Providing Server, and Authentication Server:

FIG. 10 is a schematic diagram illustrating a hardware configuration of any one of the centralized data processing server 7, the service providing server 8, and the authentication server 9, according to the embodiment. Since the centralized data processing server 7, the service providing server 8, and the authentication server 9 are substantially the same in hardware configuration, an example case of the centralized data processing server 7 is described below, while omitting the description of the service providing server 8 and the authentication server 9.

FIG. 10 is a schematic diagram illustrating a hardware configuration of the centralized data processing server 7, according to the embodiment. Referring to FIG. 10, the centralized data processing server 7, which is implemented by the general-purpose computer, includes a CPU 701, a ROM 702, a RAM 703, a HD 704, a hard disk drive (HDD) 705, a medium I/F 707, a display 708, a network I/F 709, a keyboard 711, a mouse 712, a DVD-RW drive 714, and a bus line 710. Since the centralized data processing server 7 operates as a server, an input device such as the keyboard 711 and the mouse 712, or an output device such as the display 708 does not have to be provided.

The CPU 701 controls entire operation of the centralized data processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the Internet 600. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The DVD-RW drive 714 reads or writes various data with respect to a Digital Versatile Disc-ReWritable (DVD-RW) 713, which is one example of removable recording medium.

The centralized data processing server 7 further includes a bus line 710. The bus line 710 may be an address bus or a data bus, which electrically connects various elements such as the CPU 701 of FIG. 10.

Figure 11:
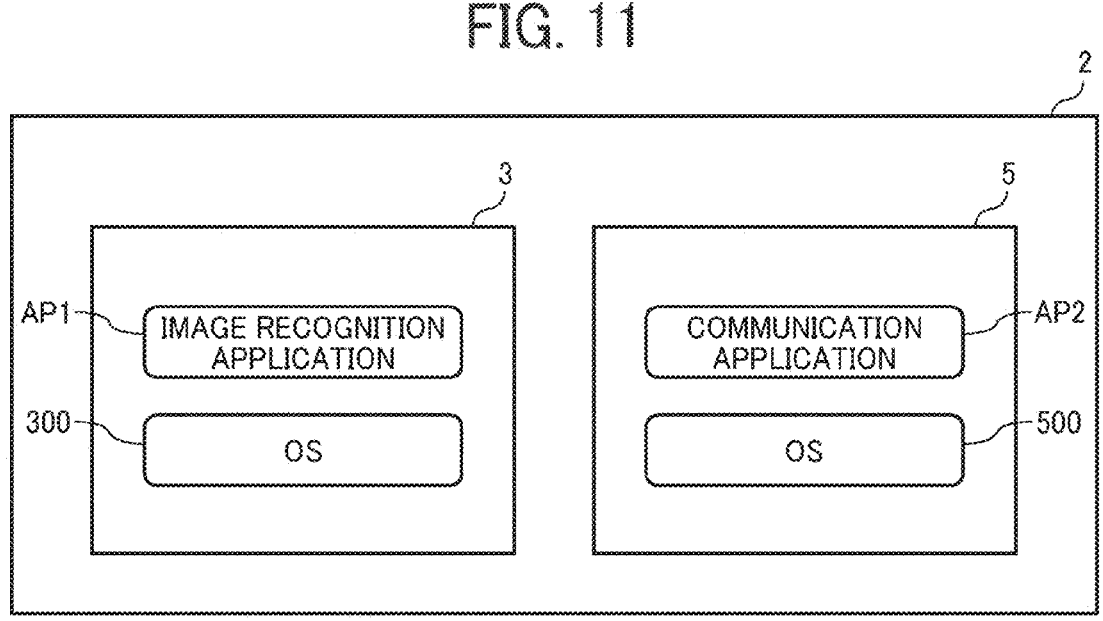
FIG. 11 is a schematic diagram illustrating a software configuration of the real-time data processing terminal and the terminal data processing device, according to an embodiment.

Software Configuration:

FIG. 11 is a schematic diagram illustrating a software configuration of the real-time data processing terminal 3 and the terminal data processing device 5, which together operate as the image acquisition terminal 2, according to the embodiment.

As illustrated in FIG. 11, the real-time data processing terminal 3 includes OS 300, and image recognition application AP1. The image recognition application AP1 is deployed in a work area, such as the RAM 303 of the real-time data processing terminal 3. The OS 300 is basic software that controls entire operation of the real-time data processing terminal 3 through providing basic functions. The image recognition application AP1 is an application for recognizing faces of people, animals, etc. from the captured images.

The terminal data processing device 5 includes OS 500 and communication application AP2. The communication application AP2 is deployed in a work area, such as the RAM 503 of the terminal data processing device 5. The OS 500 is basic software that controls entire operation of the terminal data processing device 5 through providing basic functions. The communication application AP2 is an application for communicating with another terminal (device) such as the distributed data processing terminal 6.

In the image acquisition terminal 2, while the real-time data processing terminal 3 performs image recognition, the terminal data processing device 5 communicates with the distributed data processing terminal 6 via the intranet 200 to perform distributed processing to transmit the partial image data as data to be verified, or receive a verification result. The distributed processing system 100 including the image acquisition terminal 2 and the distributed data processing terminal 6, which are communicable over the intranet 200, is an example of an image processing system.

Note that the real-time data processing terminal 3 and the terminal data processing device 5 are each installed with not only the OS but also a driver, a software development kit (SDK), or an application programming interface (API) that may be different between the real-time data processing terminal 3 and the terminal data processing device 5.

Referring to the drawings, a functional configuration of the communication system 1, and operations to be performed by the communication system 1, are described according to one or more embodiments.

Figure 12:
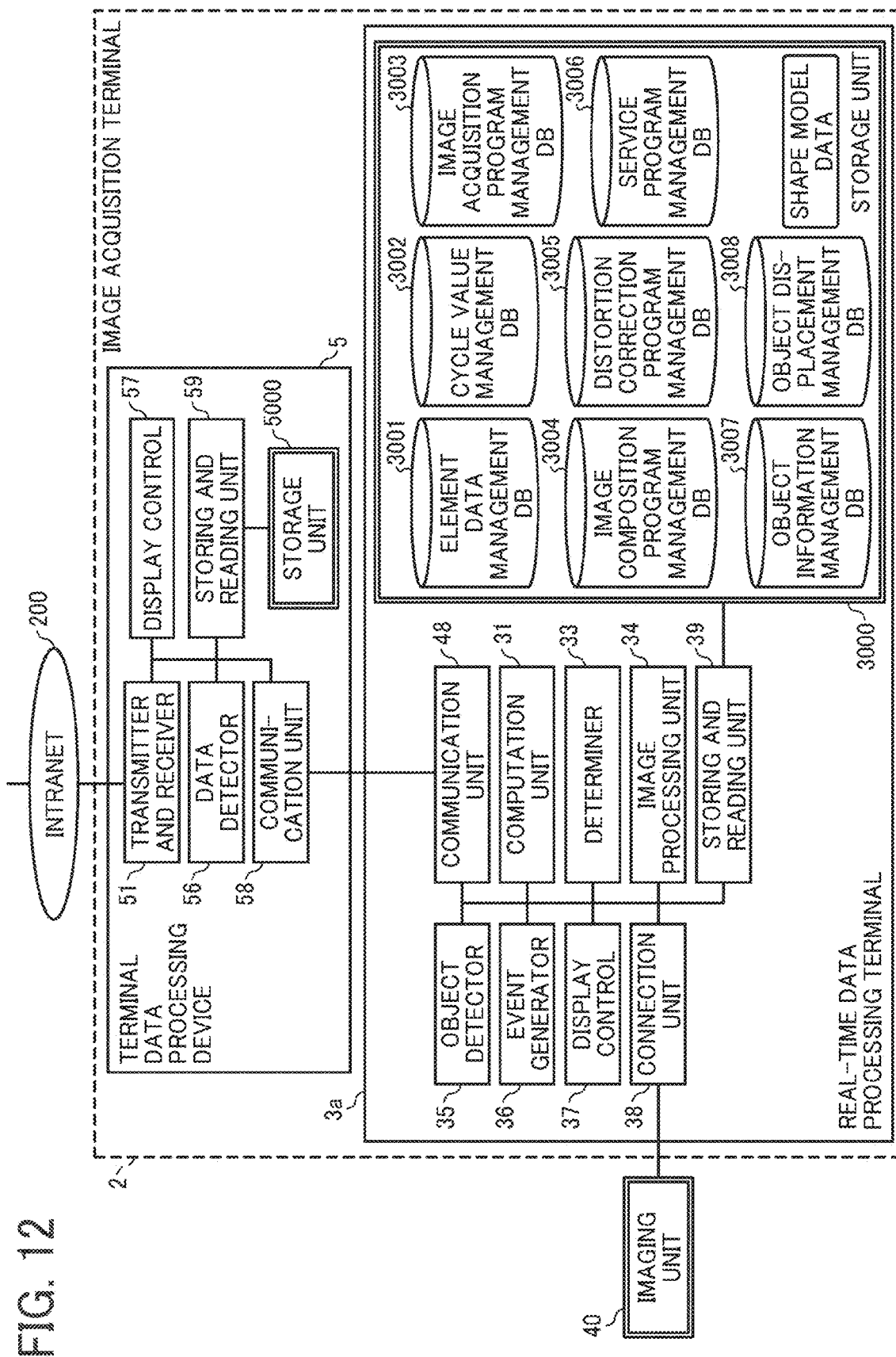
FIG. 12 is a schematic diagram illustrating a functional configuration of the communication system of FIG. 1, according to an embodiment.

Functional Configuration:

First, referring to FIG. 12 to FIG. 23, functional configurations of terminals, apparatuses, and servers in the communication system 1 are described, according to the embodiment. FIG. 12 is a schematic block diagram illustrating a functional configuration of the communication system 1 according to the embodiment. FIG. 12 specifically illustrates a functional configuration of the image acquisition terminal 2 in the communication system 1.

Functional Configuration of Real-Time Data Processing Terminal:

Referring to FIG. 12, the real-time data processing terminal 3 includes a computation unit 31, a determiner 33, an image processing unit 34, an object detector 35, an event generator 36, a display control 37, a connection unit 38, a storing and reading unit 39, and a communication unit 48.

These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3 further includes a storage unit 3000, which is implemented by the ROM 302, the RAM 303, and/or the EEPROM 304 illustrated in FIG. 2. The storage unit 3000 stores therein shape model data, which is described below. The storage unit 3000 further stores an imaging element data management DB 3001, a cycle value management DB 3002, an image acquisition program management DB 3003, an image composition program management DB 3004, a distortion correction program management DB 3005, a service program management DB 3006, an object information management DB 3007, and an object displacement management DB 3008.

The imaging element data management DB 3001 is implemented by an imaging element data management table, which is described below referring to FIG. 14A. The cycle value management DB 3002 is implemented by a cycle value management table, which is described below referring to FIG. 14B. The image acquisition program management DB 3003 is implemented by an image acquisition program management table, which is described below referring to FIG. 15A. The image composition program management DB 3004 is implemented by an image composition program management table, which is described below referring to FIG. 15B. The distortion correction program management DB 3005 is implemented by a distortion correction program management table, which is described below referring to FIG. 15C. The service program management DB 3006 is implemented by a service program management table, which is described below referring to FIG. 15D.

The object information management DB 3007 is implemented by an object information management table, which is described below referring to FIG. 16. The object displacement management DB 3008 is implemented by an object displacement management table, which is described below referring to FIG. 17.

(Imaging Element Data Management Table)

FIG. 14A is a conceptual diagram of an example of imaging element data management table. The imaging element data management table stores, for each one or more types of imaging unit 40, a model number of the imaging unit 40, the number of imaging elements included in the imaging unit 40, and a type of one or more lenses in the imaging unit 40, in association with one another. The model type is an example of type information indicating a type of the imaging unit 40 that is determined by the difference in number of imaging elements or type of lenses. In alternative to the model type, an identifier of the imaging device 40 such as a product number may be used.

(Cycle Value Management Table)

FIG. 14B is a conceptual diagram illustrating an example of cycle value management table. The cycle value management table stores a number of imaging elements in the imaging unit 40 and a cycle value (frames per second) indicating a cycle time of the object recognition process, which will be described later, in association.

The tables of FIGS. 15A to 15D are each used for managing whether or not an appropriate program is installed in the real-time data processing terminal 3, depending on a model number of the real-time data processing terminal 3.

(Image Acquisition Program Management Table)

FIG. 15A is a conceptual diagram of an example of image acquisition program management table. The image acquisition program management table stores a number of imaging elements in the imaging unit 40 and an identifier of an image acquisition program (such as a name) to be installed in the image acquisition terminal 2 for the imaging unit 40 having a specific number of imaging elements, in association. For example, in case an image acquisition program is installed in the real-time data processing terminal 3 for processing data of the imaging unit 40 having one imaging element, the program name "ProgC01 (1 system)" is stored in association with the number of imaging elements "1". Similarly, in case an image acquisition program is installed in the real-time data processing terminal 3 for processing data of the imaging unit 40 having two imaging elements, the program name "ProgC02 (2 systems)" is stored in association with the number of imaging elements "2".

(Image Composition Program Management Table)

FIG. 15B is a conceptual diagram illustrating an example of image composition program management table. The image composition program management table stores a number of imaging elements in the imaging unit 40 and an identifier of an image composition program (such as a name) to be installed in the real-time data processing terminal 3 to process data of the imaging unit 40 having a specific number of imaging elements, in association. For example, in case an image composition program is installed in the real-time data processing terminal 3 for processing data of the imaging unit having two imaging elements, the program name "ProgS02 (image composition)" is stored in association with the number of imaging elements "2". Since composition (combining) of images is not necessary for the imaging unit 40 with one imaging element, no program name is stored indicating that no image composition program is stored.

(Distortion Correction Program Management Table)

FIG. 15C is a conceptual diagram illustrating an example of distortion correction program management table. The distortion correction program management table stores a type of the lens in the imaging unit 40 and an identifier of the distortion correction program (such as the name) to be installed in the real-time data processing terminal 3 to process data of the imaging unit 40 having a specific lens type, in association. For example, in case a distortion correction program is installed in the real-time data processing terminal 3 for processing data of the imaging unit 40 having the wide-angle lens, the program name "ProgW01 (wide-angle correction)" is stored in association with the lens type "wide-angle lens". Similarly, in case a distortion correction program is installed in the real-time data processing terminal 3 for processing data of the imaging unit 40 having the fish-eye lens, the program name "ProgW02 (fish-eye correction)" is stored in association with the lens type "fish-eye lens".

(Service Program Management Table)

FIG. 15D is a conceptual diagram illustrating an example of service program management table. The table of FIG. 15D is used for determining whether a specific program is installed at the image acquisition terminal 2 (in this case, the real-time data processing terminal 3) to perform a specific service, based on authentication of the image acquisition terminal 2 (or the user operating the image acquisition terminal 2) by the authentication server 9. The service program management table stores an authentication server ID for identifying an authentication server and an identifier (such as a name of the program) of a service program for providing a specific service to the image acquisition terminal 2, in association. For example, to identify an object detection program to be installed in the real-time data processing terminal 3, which is authenticated by the authentication server for providing an object detection service, the program name "Prog D01 (object detection)" is stored in association with the authentication server ID "a01" of the authentication server providing the object detection service. Similarly, to identify an object counting program to be installed in the real-time data processing terminal 3, which is authenticated by the authentication server for providing an object counting service, the program name "Prog D02 (object counting)" is stored in association with the authentication server ID "a02" of the authentication server providing the object counting service.

(Object Information Management Table)

FIG. 16 is a conceptual diagram illustrating an example of object information management table. The object information management table includes a sequential number, a position of the rectangular partial image in the detectable area P to be described later, a width of the partial image, a height of the partial image, and a MATCH flag ("*") in association. The position of the partial image is expressed by the coordinates of the upper left corner of the rectangular partial image.

(Object Displacement Management Table)

FIG. 17 is a conceptual diagram illustrating an example of object displacement management table. The object displacement management table includes an image ID for identifying the partial image (partial image ID), the position (coordinates) of the partial image in the verification area C, a width of the partial image, a height of the partial image, a verification status indicating the progress in verification processing of the partial image at the centralized data processing server 7, an object ID for identifying an object (for example, a human) indicated by the partial image, and a MATCH flag ("*"), in association. The position of the partial image in the detectable area P, the width of the partial image, and the height of the partial image can be obtained from object specific information transferred from the object information management table (FIG. 16). Specifically, information (position, width, height) in the object information management table is partial image specific information for specifying the current partial image. The information (position, width, height) in the object displacement management table is partial image specific information for specifying the previous partial image.

The object ID is an example of object identification information for identifying an object. Other examples of object identification information include, but not limited to, an employee number, a student number, a driver license number, and an individual number called "My Number" under the Japan's Social Security and Tax Number System.

The MATCH flag in the object information management table (FIG. 16) is added to indicate whether determination of whether the current position of the object in the object information management table is within a predetermined distance (threshold) from the previous position of the object in each record of the object displacement management table (FIG. 17). The MATCH flag in the object displacement management table is added to a record for a particular partial image, if partial image specific information is transferred from the object information management table for that particular partial image.

Functional Configuration of Real-Time Data Processing Terminal:

Referring to FIG. 12, a functional configuration of the real-time data processing terminal 3 is described according to the embodiment.

The computation unit 31 of the real-time data processing terminal 3, which is implemented by instructions of the CPU 301, calculates a distance between a current position of the object and a previous position of the object.

The determiner 33, which is implemented by instructions of the CPU 301, performs various determinations. For example, the determiner 33 refers to the imaging element data management DB 3001 to determine a number of imaging elements or a lens type of the imaging unit 40 having the model type sent from the imaging unit 40.

The image processing unit 34, which is implemented by the instructions of the CPU 301, performs various types of image processing according to one or more programs (image acquisition program, image composition program, distortion correction program, and service program), which are managed using the tables described above referring to FIGS. 15A to 15D. More specifically, the image processing unit 34 executes a first program (for example, an image acquisition program, an image composition program, and a distortion correction program) that does not require authentication for obtaining, to apply first image processing (for example, image acquisition, image composition, and distortion correction) to image data such as captured image data. The image processing unit 34 further executes a second program (for example, a service program) that requires authentication for obtaining, to apply second image processing (for example, an object detection, an object counting) to image data such as captured image data.

The object detector 35, which is implemented by the instructions of the CPU 301, detects feature points, as candidates of a specific object such as a human face, in the captured image data acquired by the image processing unit 34. Specifically, the object detector 35 refers to the shape model data indicating a shape model of the specific object (such as the human face) to detect the coordinates of the specific object in the captured image.

The event generator 36, which is implemented by the instructions of the CPU 301, generates detection data (event data) indicating detection of a specific object, such that the coordinates of a specific object are specified by the object detector 35.

The display control 37, which is implemented by the instructions of the CPU 301, controls the display 317 to display various screens.

The connection unit 38, which is implemented by the imaging unit I/F 313 and the instructions of the CPU 301, is an interface for mechanically and electrically connecting the imaging unit 40 to the real-time data processing terminal 3.

The storing and reading unit 39, which is implemented by instructions of the CPU 301, stores various data or information in the storage unit 3000 or reads out various data or information from the storage unit 3000.

The communication unit 48, which is implemented by the external device connection I/F 318 and the instructions of the CPU 301, transmits or receives various data (or information) to or from the communication unit 58 of the terminal data processing device 5. The one-to-one communication between the communication unit 48 and the communication unit 58 may be performed via a wired network or a wireless network.

Functional Configuration of Terminal Data Processing Device:

As illustrated in FIG. 12, the terminal data processing device 5 includes a transmitter and receiver 51, a data detector 56, a display control 57, a communication unit 58, and a storing and reading unit 59. These units are functions that are implemented by or that are caused to function by operating any of the elements illustrated in FIG. 9 in cooperation with the instructions of the CPU 501 according to the control program expanded from the EEPROM 504 to the RAM 503 at the terminal data processing device 5.

The terminal data processing device 5 further includes a storage unit 5000, which is implemented by the ROM 502, RAM 503 and EEPROM 504 illustrated in FIG. 9.

Functional Configuration of Terminal Data Processing Device:

Referring to FIG. 12, a functional configuration of the terminal data processing device 5 is described according to the embodiment.

The transmitter and receiver 51 of the terminal data processing device 5, which is implemented by the long-range communication circuit 511, the antenna 511a, and the instructions of the CPU 501, transmits or receives various data (or information) to or from the distributed data processing terminal 6 via a communication network (the intranet 200).

The data detector 56, which is implemented by the instructions of the CPU 501, detects whether or not an event has occurred that triggers reception of data from the real-time data processing terminal 3, and whether or not the reception of data is completed.

The display control 57, which is implemented by the instructions of the CPU 501, controls the display 517 to display various screens.

The communication unit 58, which may be implemented by the instructions of the CPU 501 and the external device connection I/F 518, transmits or receives various data (or information) to or from the communication unit 48 of the real-time data processing terminal 3. The one-to-one communication between the communication unit 58 and the communication unit 48 may be performed via a wired network or a wireless network.

The storing and reading unit 59, which is implemented by instructions of the CPU 501, stores various data or information in the storage unit 5000 or reads out various data or information from the storage unit 5000.

Functional Configuration of Distributed Data Processing Terminal:

As illustrated in FIG. 13, the distributed data processing terminal 6 includes a transmitter and receiver 61, an acceptance unit 62, a determiner 63, a computation unit 65, a display control 67, and a storing and reading unit 69. These units are functions that are implemented by or that are caused to function by operating any of the elements illustrated in FIG. 9 in cooperation with the instructions of the CPU 501 according to the control program expanded from the EEPROM 504 to the RAM 503 in the distributed data processing terminal 6.

The distributed data processing terminal 6 further includes a storage unit 6000, which is implemented by the ROM 502, RAM 503 and EEPROM 504 illustrated in FIG. 9. The storage unit 6000 stores an object presence management DB 6001 and a display area management DB 6002.

The object presence management DB 6001 is implemented by an object presence management table, which is described below referring to FIG. 18A. The display area management DB 6002 is implemented by a display area management table, which is described below referring to FIG. 18B.

(Object Presence Management Table)

FIG. 18A is a conceptual diagram of an example object presence management table in the object presence management DB 6001. The object presence management table includes a plurality of object IDs each for identifying an object such as a human. With this table, it is possible to know that an object identified with a particular object ID is present in a particular area in a store (for example, areas a1 to a4 illustrated in FIG. 31).

(Display Area Management Table)

FIG. 18B is a conceptual diagram of an example display area management table in the display area management DB 6002. With the display area management table, areas in the store can be managed, such as areas displayed in detection area fields d11 to d14 of FIG. 30, to be described later.

Functional Configuration of Distributed Data Processing Terminal:

The transmitter and receiver 61 of the distributed data processing terminal 6, which is implemented by the long-range communication circuit 511, the antenna 511a, and the instructions of the CPU 501, transmits or receives various data (or information) to or from the centralized data processing server 7 via a communication network (the Internet 600). For example, the transmitter and receiver 61 transmits a verification request for verifying the data to be verified using the verification data, to the centralized data processing server 7, or performs processing on the verification result sent from the centralized data processing server 7.

The acceptance unit 62 is implemented by the touch panel 521 of the distributed data processing terminal 6, which operates under control of the CPU 501, to receive various selections or inputs from the user.

The determiner 63, which is implemented by instructions of the CPU 501 of the distributed data processing terminal 6, performs various determinations.

The computation unit 65, which is implemented by instructions of the CPU 501 of the distributed data processing terminal 6, performs various calculations.

The display control 67, which is implemented by the instructions of the CPU 501 of the distributed data processing terminal 6, controls the display 517 to display various screens.

The storing and reading unit 69, which is implemented by instructions of the CPU 501 of the distributed data processing terminal 6, stores various data or information in the storage unit 6000 or reads out various data or information from the storage unit 6000. For example, the storing and reading unit 69 stores the verification data (in this case, the facial image data) in the storage unit 6000 according to a registration request received at the acceptance unit 62.

Functional Configuration of Centralized Data Processing Server:

As illustrated in FIG. 13, the centralized data processing server 7 includes a transmitter and receiver 71, an acceptance unit 72, a determiner 73, a feature value generator 74, a verification unit 75, a counting unit 76, and a storing and reading unit 79. These units are functions that are implemented by or that are caused to function by operating any of the elements illustrated in FIG. 10 in cooperation with the instructions of the CPU 701 according to the control program expanded from the HD 704 to the RAM 703 at the distributed data processing terminal 6.

The centralized data processing server 7 further includes a storage unit 7000, which is implemented by the ROM 702, the RAM 703 and the HD 704 illustrated in FIG. 10. The storage unit 7000 stores feature value data to be used for verification, which will be described below. The storage unit 7000 stores verification data. The storage unit 7000 further stores various databases 7001, 7002, and 7003. The verification data management DB 7001 is implemented by a verification data management table, which is described below referring to FIG. 19A. The verification data may be stored in a memory of any data management server other than the centralized data processing server 7. The storage unit 7000 stores an object position management DB 7002. The object position management DB 7002 is implemented by an object position management table, which is described below referring to FIG. 19B. The storage unit 7000 further includes a count management DB 7003. The count management DB 7003 is implemented by a count management table, which is described below referring to FIG. 19C.

(Verification Data Management Table)

FIG. 19A is a conceptual diagram illustrating an example of verification data management table in the verification data management DB 7001. The verification data management table stores, for each one of a plurality of persons to be verified, a file name of an image file of verification data (that is, a file name of an object image) and an object ID of an object such as a person identified with the image file of verification data.

(Object Position Management Table)

FIG. 19B is a conceptual diagram of an example object position management table stored in the object position management DB 7002. The object position management table stores reception date and time, an area number, and an object ID in association with each other. The reception date and time indicates the date and time when the centralized data processing server 7 receives a movement information storage request from the distributed data processing terminal 6 (See S304). The area number is information indicating an area in the store where the object as a person is detected as being present. For example, the area number "1" indicates that the object as a person is present (positioned) in the area a1 in the store illustrated in FIG. 31. The object ID is the same as the object ID in the verification data management table.

(Count Management Table)

FIG. 19C is a conceptual diagram of an example count management table in the count management DB 7003. The count management table stores a number of objects such as persons who have moved to other area (left, upper, right, lower) in association with that other area (referred to as a destination area), for each time slot expressed by date and time (for example, one hour), during when the store is open.

Functional Configuration of Centralized Data Processing Server:

The transmitter and receiver 71 of the centralized data processing server 7, which is implemented by the network I/F 709 and the instructions of the CPU 701, transmits or receives various data (or information) to or from the distributed data processing terminal 6 via a communication network (the Internet 600). For example, the transmitter and receiver 71 receives a verification request for verifying the data to be verified using the verification data, from the distributed data processing terminal 6, or sends the verification result to the distributed data processing terminal 6.

The acceptance unit 72 is implemented by the keyboard 711 or mouse 712, which operates under control of the CPU 701, to receive various selections or inputs from the user.

The determiner 73, which is implemented by instructions of the CPU 501 of the centralized data processing server 7, performs various determinations.

The feature value generator 74, which is implemented by the instructions of the CPU 701, generates parameters of feature values from the data to be verified (partial image data) and the verification data that are received at the transmitter and receiver 71.

The verification unit 75, which is implemented by the instructions of the CPU 701, compares the feature values between the verification data and the data to be verified, using the feature values obtained at the feature value generator 74, to calculate a score (in points) indicating the similarity in feature values The counting unit 76, which is implemented by the instructions of the CPU 701, counts the number of records, for each combination of the area number (indicating a direction of movement) and object ID per unit time (every hour in this embodiment), referring to the movement information stored in the object position management DB 7002.

The storing and reading unit 79, which is implemented by the instructions of the CPU 701, stores various data or information in the storage unit 7000 or reads out various data or information from the storage unit 7000.

Functional Configuration of Service Providing Server:

Next, referring to FIG. 13, and FIGS. 20 to 22, each functional unit of the service providing server 8 is described in detail. As illustrated in FIG. 13, the service providing server 8 includes a transmitter and receiver 81, a determiner 82, an extractor 87, and a storing and reading unit 89. These units are functions that are implemented by or that are caused to function by operating any of the elements illustrated in FIG. 10 in cooperation with the instructions of the CPU 701 according to the service providing program expanded from the HD 704 to the RAM 703.

The service providing server 8 further includes a storage unit 8000, which is implemented by the RAM 703 and the HD 704 illustrated in FIG. 10. The storage unit 8000 stores various data transmitted from the distributed data processing terminal 6 or the authentication server 9. The storage unit 8000 stores all of the programs, which is determined according to the tables referring to FIGS. 15A to 15D. In response to a request from the real-time data processing terminal 3, the service providing server 8 transmits the requested program for installation to the real-time data processing terminal 3.

The storage unit 8000 further includes a session management DB 8001 and an authentication server management DB 8002. The session management DB 8001 is implemented by a session management table, which is described below referring to FIG. 20. The authentication server management DB 8002 is implemented by an authentication server management table, which is described below referring to FIG. 22. Each table will be described in detail below.

(Session Management Table)

FIG. 20 is a conceptual diagram illustrating an example of session management table in the session management DB 8001. To provide a service to the distributed data processing terminal 6, the session management table stores a session ID for identifying a communication session established with the distributed data processing terminal 6, a terminal ID for identifying a user of the distributed data processing terminal 6, and an IP address of the distributed data processing terminal 6 of the user identified with the terminal ID, in association.

Figure 21A:
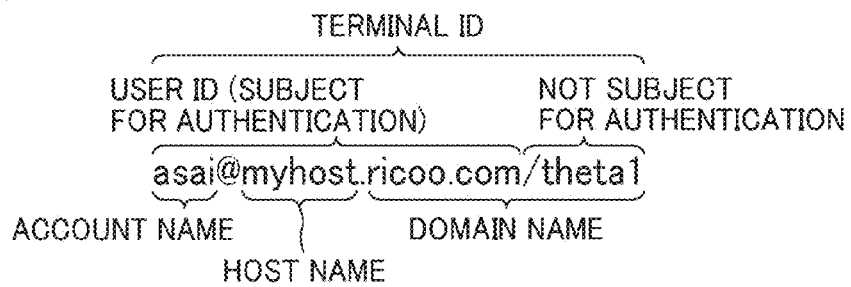
FIGS. 21A, 21B, and 21C are each a conceptual diagram illustrating an example of terminal identifier.
Figure 21B:
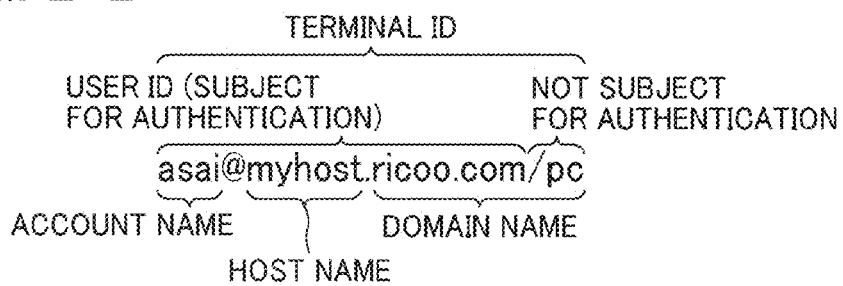
Figure 21C:
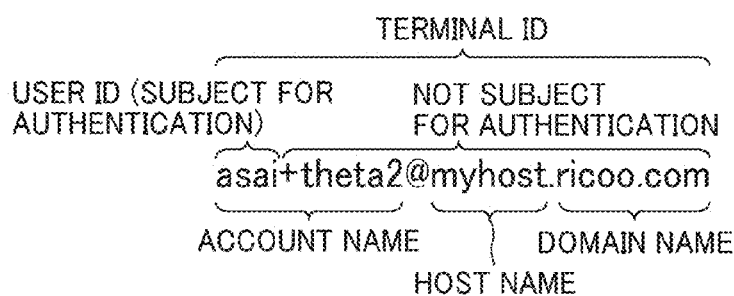

FIGS. 21A, 21B, and 21C each illustrate an email address as an example of the terminal ID, which can be classified into a part to be authenticated (subject for authentication) and a part not to be authenticated (not subject for authentication). More specifically, in the following examples, the email address, as an example of the terminal ID, includes a user ID. A part or entire user ID is used for authentication. The part subject for authentication is a user ID to be used for authentication by the authentication server 9. The part not subject for authentication is any part other than the user ID, which is not to be used for authentication by the authentication server 9.

Referring to a first example case of FIG. 21A, the part subject for authentication includes an account name "asai", a host name "myhost" and a domain name "ricoo.com". The part not subject or authentication includes "theta1", which is any remaining part of the email address. In such case, the extractor 87 distinguishes between the part subject for authentication and the part not subject for authentication by "/".

The email address of FIG. 21B can be classified into the part subject for authentication and the part not subject for authentication, similar to that of FIG. 21A, except that the part not subject for authentication differs. Specifically, the authentication server 9 recognizes that the terminal ID of FIG. 21B is the same as that of FIG. 21A, as the part subject for authentication is the same, even when the part not subject for authentication differs.

Alternatively, the terminal ID may be authenticated according to a second example case illustrated in FIG. 21C. Referring to the second example case of FIG. 21C, the part subject for authentication includes a front part of an account name, that is, "asai". The part not subject for authentication includes "theta2", which is any remaining part of the account name, and a host name "myhost", and a domain name "ricoo.com". In such case, the extractor 87 distinguishes between the part subject for authentication and the part not subject for authentication by "+".

(Authentication Server Management Table)

FIG. 22 is a conceptual diagram of an example of authentication server management table. The authentication server management table stores, for each authentication server 9, an authentication server ID identifying the authentication server 9 and a URL (Uniform Resource Locator) for accessing the authentication server 9 in association.

Functional Unit of Service Providing Server:

Next, referring to FIG. 13, a functional unit of the service providing server 8 is described in detail.

The transmitter and receiver 81 of the service providing server 8, which is implemented by the instructions from the CPU 701 and the network I/F 709 illustrated in FIG. 10, transmits or receives various data (or information) to or from the distributed data processing terminal 6 and the authentication server 9 via the communication network (the Internet 600).

The determiner 82, which is implemented by instructions from the CPU 701 illustrated in FIG. 10, determines, for example, whether or not a communication session for providing a service to the distributed data processing terminal 6 has already been established.

The extractor 87, which is implemented by instructions from the CPU 701 illustrated in FIG. 10, extracts a user ID (part subject for authentication) from the terminal ID as illustrated in FIGS. 21A to 21C.

The storing and reading unit 89, which is implemented by instructions from the CPU 701 and the HDD 705, illustrated in FIG. 10, stores various data or information in the storage unit 8000 or reads out various data or information from the storage unit 8000.

Functional Configuration of Authentication Server:

Next, referring to FIGS. 13 and 23, each functional unit of the authentication server 9 is described in detail. The authentication server 9 includes a transmitter and receiver 91, an authentication unit 92, and a storing and reading unit 99. These units are functions that are implemented by or that are caused to function by operating any of the elements illustrated in FIG. 10 in cooperation with the instructions of the CPU 701 according to the authentication server program expanded from the HD 704 to the RAM 703.

The authentication server 9 further includes a storage unit 9000, which is implemented by the RAM 703 and the HD 704 illustrated in FIG. 10. The storage unit 9000 stores various data transmitted from the distributed data processing terminal 6 or the service providing server 8.

The storage unit 9000 further stores an authentication management DB 9001. The authentication management DB 9001 is implemented by an authentication management table, which is described below. The authentication management table will be described in detail below.

(Authentication Management Table)

FIG. 23A is a conceptual diagram of an example of authentication management table stored in the authentication server 9a. FIG. 23B is a conceptual diagram of an example of authentication management table stored in the authentication server 9b. FIG. 23C is a conceptual diagram of an example of authentication management table stored in the authentication server 9c.

The authentication management table stores, for each user being managed, a user ID (the part subject for authentication) for identifying the user, and a password, in association.

Functional Unit of Authentication Server:

Next, referring to FIG. 13, a functional unit of the authentication server 9 is described in detail.

The transmitter and receiver 91 of the authentication server 9, which is implemented by the instructions from the CPU 701 and the network I/F 709 illustrated in FIG. 10, transmits or receives various data (or information) to or from the distributed data processing terminal 6 and the service providing server 8 via the communication network (the Internet 600).

The authentication unit 92, which is implemented by the instructions from the CPU 701 illustrated in FIG. 10, authenticates the ID of the distributed data processing terminal 6, based on a determination of whether or not the image acquisition terminal 2 that has transmitted the authentication request has an authority to receive a service.

The storing and reading unit 99, which is implemented by the instructions of the CPU 701 and the HDD 705, illustrated in FIG. 10, stores various data or information in the storage unit 9000 or reads out various data or information from the storage unit 9000.

Operation:

Referring to FIGS. 24 to 48, various types of operation, performed by the communication system 1, are described according to the embodiment.

Figure 25:
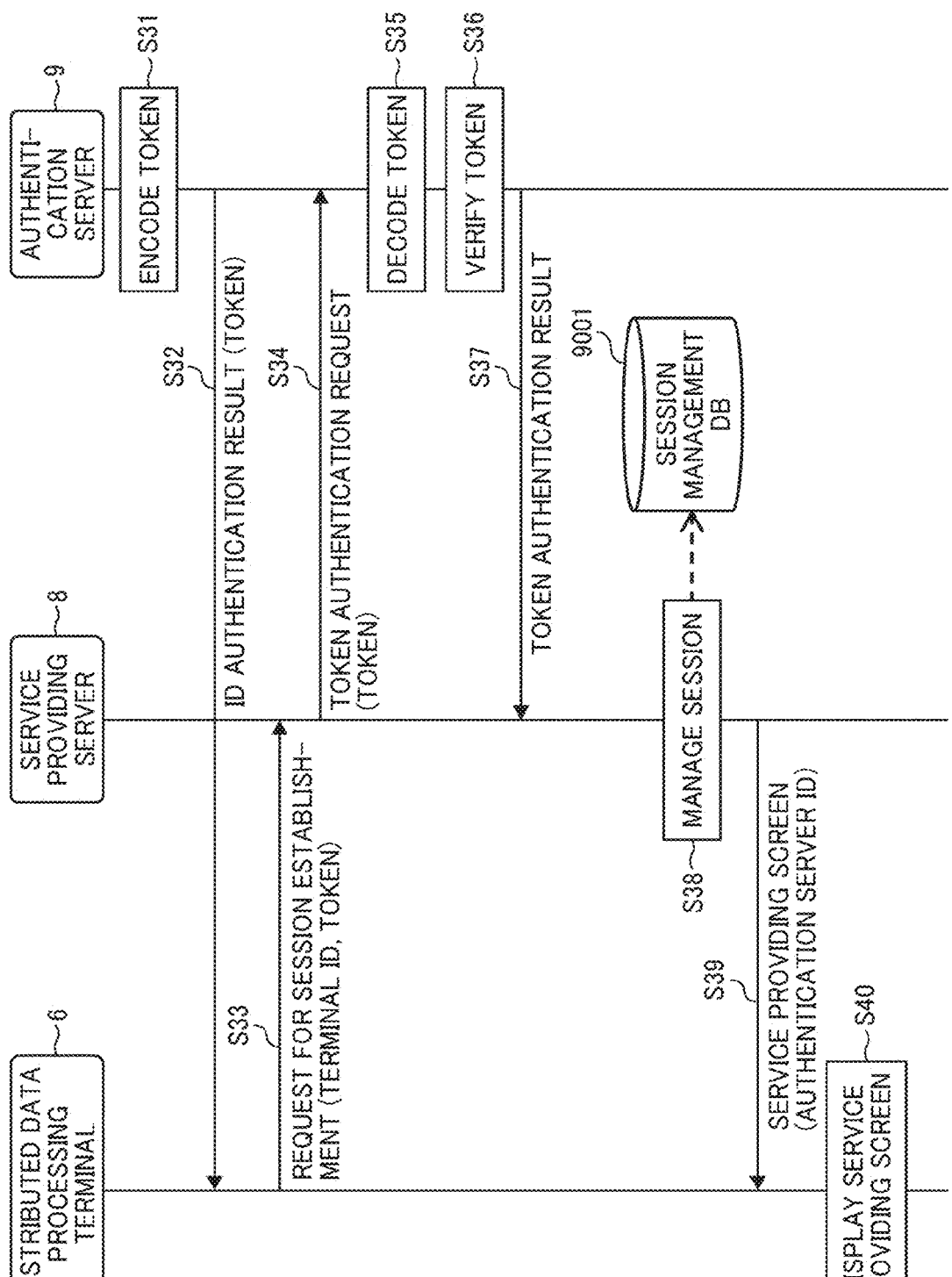
FIG. 25 is another sequence diagram illustrating authentication processing according to the embodiment.
Figure 26:
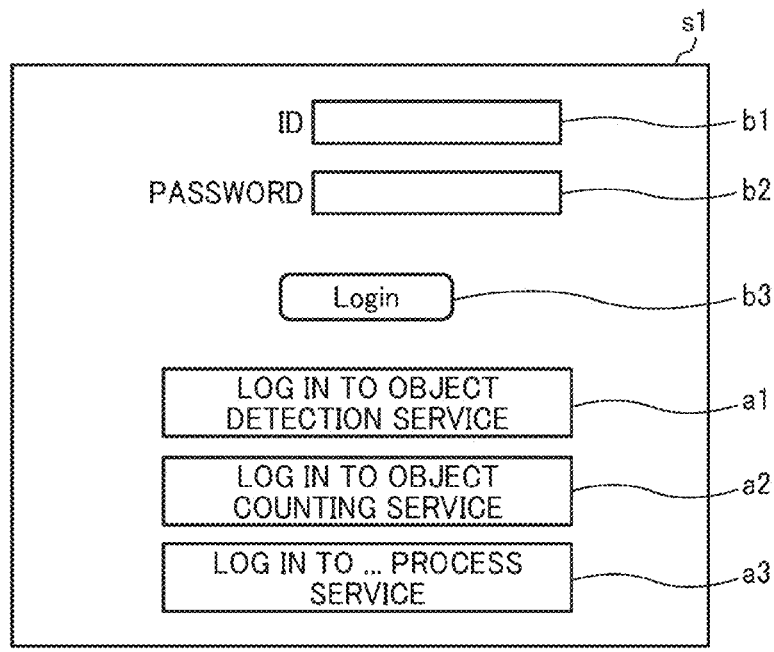
FIG. 26 is a diagram illustrating an example screen displayed at the distributed data processing terminal.
Figure 27:
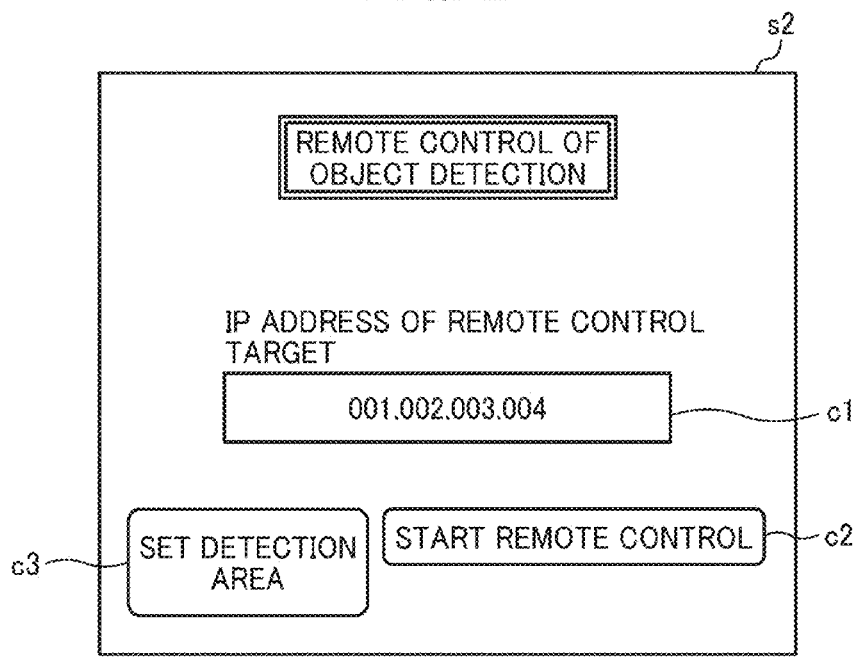
FIG. 27 is a diagram illustrating another example screen displayed at the distributed data processing terminal.

Authentication Processing:

First, referring to FIGS. 24 to 27, authentication process is described according to an embodiment. FIGS. 24 and 25 are a sequence diagram illustrating example authentication processing. FIGS. 26 and 27 are diagrams illustrating examples of screen displayed at the distributed data processing terminal.

As illustrated in FIG. 24, the transmitter and receiver 61 of the distributed data processing terminal 6 transmits a request for an authentication server selection screen to the service providing server 8 (S21). This authentication server selection screen request includes the terminal ID of the distributed data processing terminal 6. The transmitter and receiver 61 further transmits the IP address of the distributed data processing terminal 6, with the authentication server selection screen request. The transmitter and receiver 81 of the service providing server 8 receives the request for the authentication server selection screen and the IP address of the distributed data processing terminal 6.

Next, the determiner 82 of the service providing server 8 determines whether or not the terminal ID of the distributed data processing terminal 6 received at S21 is stored in association with a predetermined session ID in the session management table (FIG. 20) (S22). Hereinafter, the case where the terminal ID of the distributed data processing terminal 6 is not stored will be described.

The transmitter and receiver 81 of the service providing server 8 transmits data of an authentication server selection screen to the distributed data processing terminal 6 (S23). The transmitter and receiver 61 of the distributed data processing terminal 6 receives the data of the authentication server selection screen.

Next, the display control 67 of the distributed data processing terminal 6 controls the display 517 to display an authentication server selection screen s1 as illustrated in FIG. 26 (S24). FIG. 26 illustrates an example of the authentication server selection screen s1, displayed at the distributed data processing terminal 6. The authentication server selection screen s1 includes an ID entry field b1, a password entry field b2, and a login button b3 for accepting a login request (authentication request). The authentication server selection screen s1 further includes a plurality of authentication server selection buttons a1, a2, and a3 for selecting the authentication servers 9a, 9b, and 9c, respectively. For example, the authentication server selection button a1 provides, when selected, a user with a service of object detection using the object detection program. The authentication server selection button a2 provides, when selected, a user with a service of object counting using the object counting program.

Here, the user inputs the terminal ID of the distributed data processing terminal 6 operated by the user in the ID entry field b1, and a password in the password entry field b2, as information to be used for authentication. As described above referring to FIGS. 21A to 21C, in this example, the email address of the user is used as the terminal ID. After entering the terminal ID and the password, the user presses a desired button from among the authentication server selection buttons a1, a2, and a3, and further presses the login button b3. The acceptance unit 62 accepts a selection of a specific service, indicated by the selected authentication server selection button (S25). The following describes an example case in which, in response to selection of the authentication server selection button a1, the service providing server 8 provides the object detection service according to the object detection program ProgD01.

The transmitter and receiver 61 of the distributed data processing terminal 6 transmits a request for authenticating ID (in this example, terminal ID or user ID) to the service providing server 8 (S26). The ID authentication request includes the terminal ID and the password, received at S25, the selection result of the authentication server 9, and the URL of the distributed data processing terminal 6. The selection result of the authentication server 9 indicates an authentication server ID for identifying the selected authentication server 9. The transmitter and receiver 81 of the service providing server 8 receives the ID authentication request.

Next, the storing and reading unit 89 of the service providing server 8 searches the authentication server management table (FIG. 22) using the authentication server ID, which is received at S26 as the selection result, as a search key, to read out the URL of the authentication server associated with the received authentication server ID (S27).

The extractor 87 extracts only the user ID (the part subject for authentication) out of the terminal ID received at S26 (S28). Then, the transmitter and receiver 81 transmits an ID authentication request to the authentication server 9 indicated by the URL read out at S27 (S29). The ID authentication request includes the user ID (the part subject for authentication) extracted at S28, the password received at S26, and the URL of the distributed data processing terminal 6 received at S26. Accordingly, the transmitter and receiver 71 of the authentication server 9 receives the ID authentication request, which is a request for authenticating the user of the distributed data processing terminal 6.

Next, the storing and reading unit 99 of the authentication server 9 searches the authentication management table (FIG. 23), using a pair of the user ID (the part subject for authentication) and the password received at S29 as a search key, to output a search result. Based on this search result indicating whether the same pair has been stored, the authentication unit 92 authenticates the ID of the distributed data processing terminal 6 (S30). When the same pair is stored, the authentication unit 92 determines that the distributed data processing terminal 6 is an authorized terminal allowed to receive a requested service from the service providing server 8. When the same pair is not stored, the authentication unit 92 determines that the distributed data processing terminal 6 is not an authorized terminal for receiving a requested service from the service providing server 8.

At S28, the extractor 87 extracts the part subject for authentication from the terminal ID, but it is not limited thereto. For example, the service providing server 8 does not have to be provided with the extractor 87. In such case, at S29, the transmitter and receiver 81 may transmit only the user ID (the part subjected for authentication) out of the terminal ID, in addition to the password and the URL.

Subsequently, as illustrated in FIG. 25, the authentication unit 92 of the authentication server 9 encodes a token (transmission right) (S31). The transmitter and receiver 91 of the authentication server 9 transmits an ID authentication result to the distributed data processing terminal 6, using the URL of the distributed data processing terminal 6 received at S29 (S32). The ID authentication result indicates whether or not the distributed data processing terminal 6 is an authorized terminal, and further includes the token encoded at S31. Accordingly, the transmitter and receiver 61 of the distributed data processing terminal 6 receives the ID authentication result indicating whether the user is authorized to use the requested service. The following describes an example case in which the user is determined to be the authorized user.

The transmitter and receiver 61 of the distributed data processing terminal 6 transmits a request for establishing a session to the service providing server 8 (S33). This session establishment request includes the terminal ID, which is authenticated, and the encoded token received at S32. Accordingly, the transmitter and receiver 81 of the service providing server 8 receives the session establishment request.

Next, to confirm that the distributed data processing terminal 6 that transmitted the session establishment request has been determined to be a terminal operated by the authorized user at S30, the transmitter and receiver 81 of the service providing server 8 transmits a token authentication request to the authentication server 9 (S34). The token authentication request includes the encoded token received at S33. Accordingly, the transmitter and receiver 91 of the authentication server 9 receives the token authentication request.

Next, the authentication unit 92 decodes the encoded token received at S34 (S35). The authentication unit 92 authenticates the token by comparing the token before encoding at S31 with the token after decoding at S35 (S36).

Then, the transmitter and receiver 91 of the authentication server 9 transmits the token authentication result of S36 to the service providing server 8 (S37). Accordingly, the transmitter and receiver 81 of the service providing server 8 receives the token authentication result. The following illustrates the example case in which the token is authenticated at S36.

Next, the storing and reading unit 89 of the service providing server 8 newly assigns a session ID to a session being established, and stores in the session management table (FIG. 20) the terminal ID and the IP address of the distributed data processing terminal 6, received at S26, in association with the newly-assigned session ID (S38). The transmitter and receiver 81 transmits data of a service providing screen to the distributed data processing terminal 6 (S39). Accordingly, the transmitter and receiver 61 of the distributed data processing terminal 6 receives the data of the service providing screen.

Next, the display control 67 of the distributed data processing terminal 6 controls the display 517 to display the service providing screen s2 as illustrated in FIG. 27 (S40). FIG. 27 illustrates an example of the service providing screen s2 displayed at the distributed data processing terminal 6. The following describes an example case in which a remote operation service is provided as an example server, which remotely controls the image acquisition terminal 2 from the distributed data processing terminal 6. The service providing screen s2 illustrated in FIG. 27 includes an entry field c1 for an IP address (or terminal ID) for identifying a remote control target, a "START REMOTE CONTROL" button c2, and a "SET DETECTION AREA" button c3.

Figure 28:
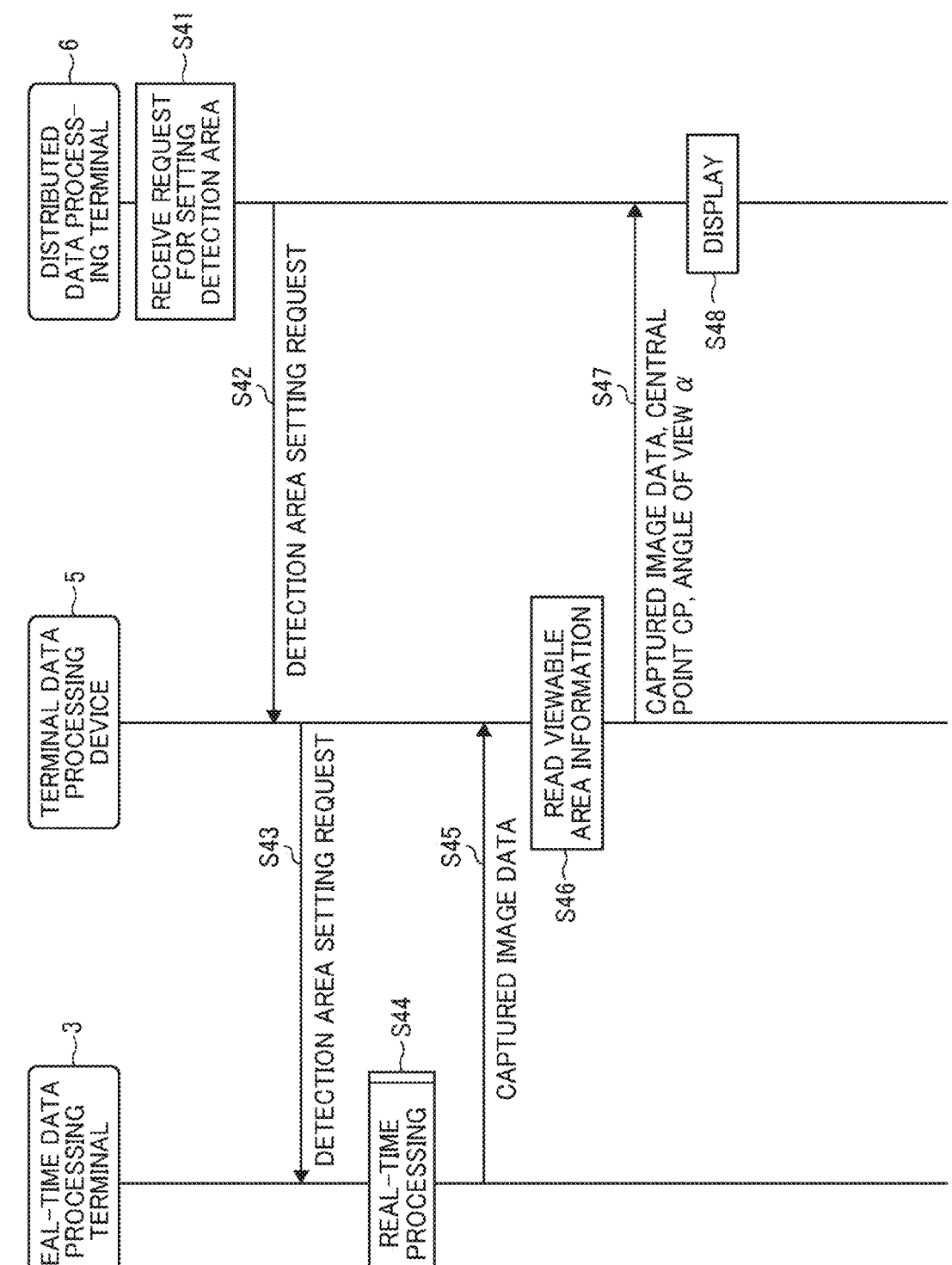
FIG. 28 is a sequence diagram illustrating processing to set a detection area according to an embodiment.
Figure 29:
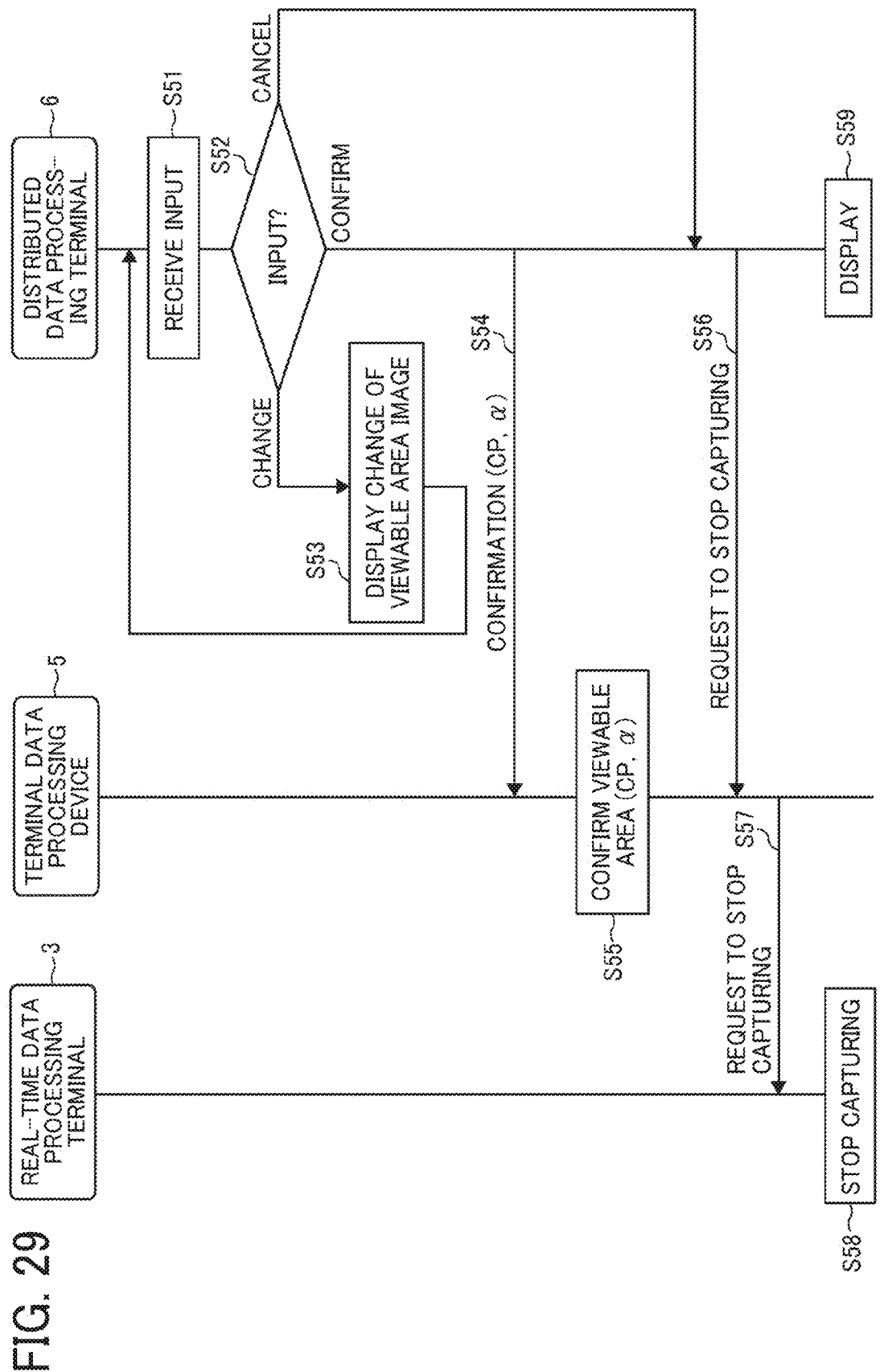
FIG. 29 is another sequence diagram illustrating processing to set a detection area according to the embodiment.

Setting of Detection Area:

Subsequently, referring to FIGS. 28 to 32, and FIG. 38A, processing to set a detection area is described according to the embodiment. FIGS. 28 and 29 are a sequence diagram illustrating processing to set a detection area according to the embodiment.

First, as illustrated in FIG. 28, the acceptance unit 62 of the distributed data processing terminal 6 receives a request for setting a detection area from a user, as the user presses the "SET DETECTION AREA" button c3 of FIG. 27 (S41). The transmitter and receiver 61 transmits a detection area setting request to the terminal data processing device 5 (S42). The transmitter and receiver 51 of the terminal data processing device 5 receives the detection area setting request.

Next, the communication unit 58 of the terminal data processing device 5 transfers the detection area setting request received at S42 to the communication unit 48 of the real-time data processing terminal 3 (S43). The communication unit 48 of the real-time data processing terminal 3 receives the detection area setting request.

Next, real-time data processing terminal 3 performs the object detection processing on the detection area being set, as a part of the real-time processing (S44).

Figure 38B:
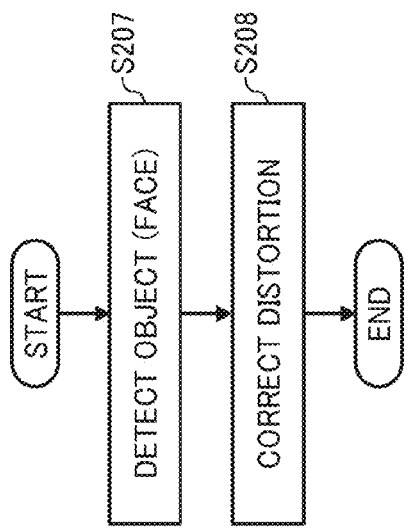
FIGS. 38A and 38B are a flowchart illustrating an example of object detection processing, performed in the real-time processing of FIG. 37.
Figure 38A:
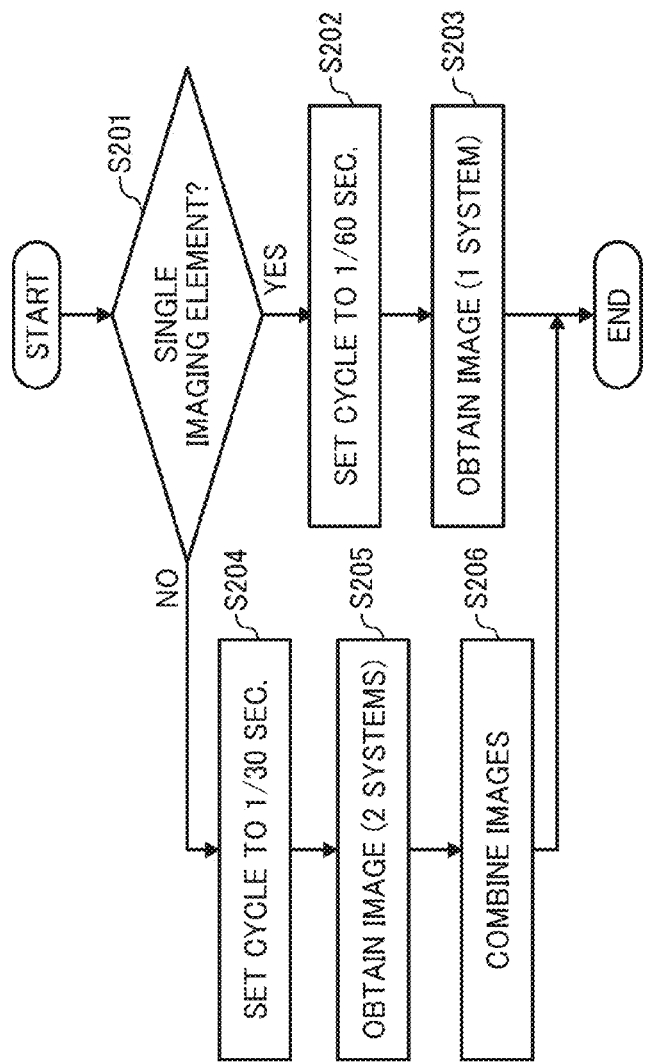

Object Detection Processing:

Referring to FIG. 38A, processing to detect an area, performed in real-time processing, is described according to an embodiment. FIG. 38A is a flowchart illustrating an example of processing to detect an object in a display area, performed in the real-time processing.

First, the determiner 33 determines whether or not a number of imaging elements in the imaging unit 40, connected to the real-time data processing terminal 3, is one (S201).

In this case, the determiner 33 determines the number of imaging elements, based on the number of imaging elements read out at S72. If the number of imaging elements is one (S201: YES), the image processing unit 34 sets a cycle value, which defines a time interval for repeating the real-time processing, to 1/60 seconds (S202). Specifically, the image processing unit 34 sets the cycle time to be the cycle value read out at S73.

Next, the connection unit 38 acquires captured image data, from the imaging unit 40 having one imaging system (here, the imaging unit 40a) (S203). The captured image data is digital image data, and is, for example, data of 4K image (3840 image pixel width×2160 image pixel height). In this case, the connection unit 38 executes processing according to the image acquisition program (ProgC01 (1 system)) as described referring to FIG. 15A.

On the other hand, when the number of imaging elements is not one (S201: NO), the image processing unit 34 sets a cycle value indicating a cycle time for repeating the real-time processing, to 1/30 seconds (S204). Specifically, the image processing unit 34 sets the cycle time to be the cycle value read out at S73. The cycle time is set to 1/30 seconds, which is longer than a time it requires for one input, thus preventing the later-described image composition processing from delaying.

Next, the connection unit 38 acquires two items of captured image data from the imaging unit 40 having two imaging systems (the imaging unit 40b) (S205). The two items of captured image data are data of hemispherical images as illustrated in FIGS. 4A and 4B, respectively. In this case, the connection unit 38 executes processing according to the image acquisition program (ProgC02 (2 systems)) as described referring to FIG. 15A.

Then, the image processing unit 34 combines the two items of captured image data to create an equirectangular projection image EC as illustrated in FIG. 4C (S206). In this case, the image processing unit 34 executes the processing according to the image composition program (ProgS02 (image composition)) described referring to FIG. 15B.

With the above-described processing, the processing to detect an object ends.

Referring back to FIG. 28, the communication unit 48 of the real-time data processing terminal 3 transmits captured image data to the communication unit 58 of the terminal data processing device 5 (S45). The communication unit 58 of the terminal data processing device 5 receives the captured image data. The storing and reading unit 59 of the terminal data processing device 5 reads out the viewable area information (central point CP and angle of view α) from the storage unit 5000 (S46).

Next, the transmitter and receiver 51 of the terminal data processing device 5 transmits, to the distributed data processing terminal 6, the captured image data received at S45, and information on the central point CP and the angle of view α that is read at S46 (S47). Accordingly, the transmitter and receiver 61 of the distributed data processing terminal 6 receives the captured image data, and the information on the central point CP and the angle of view α.

Figure 30:
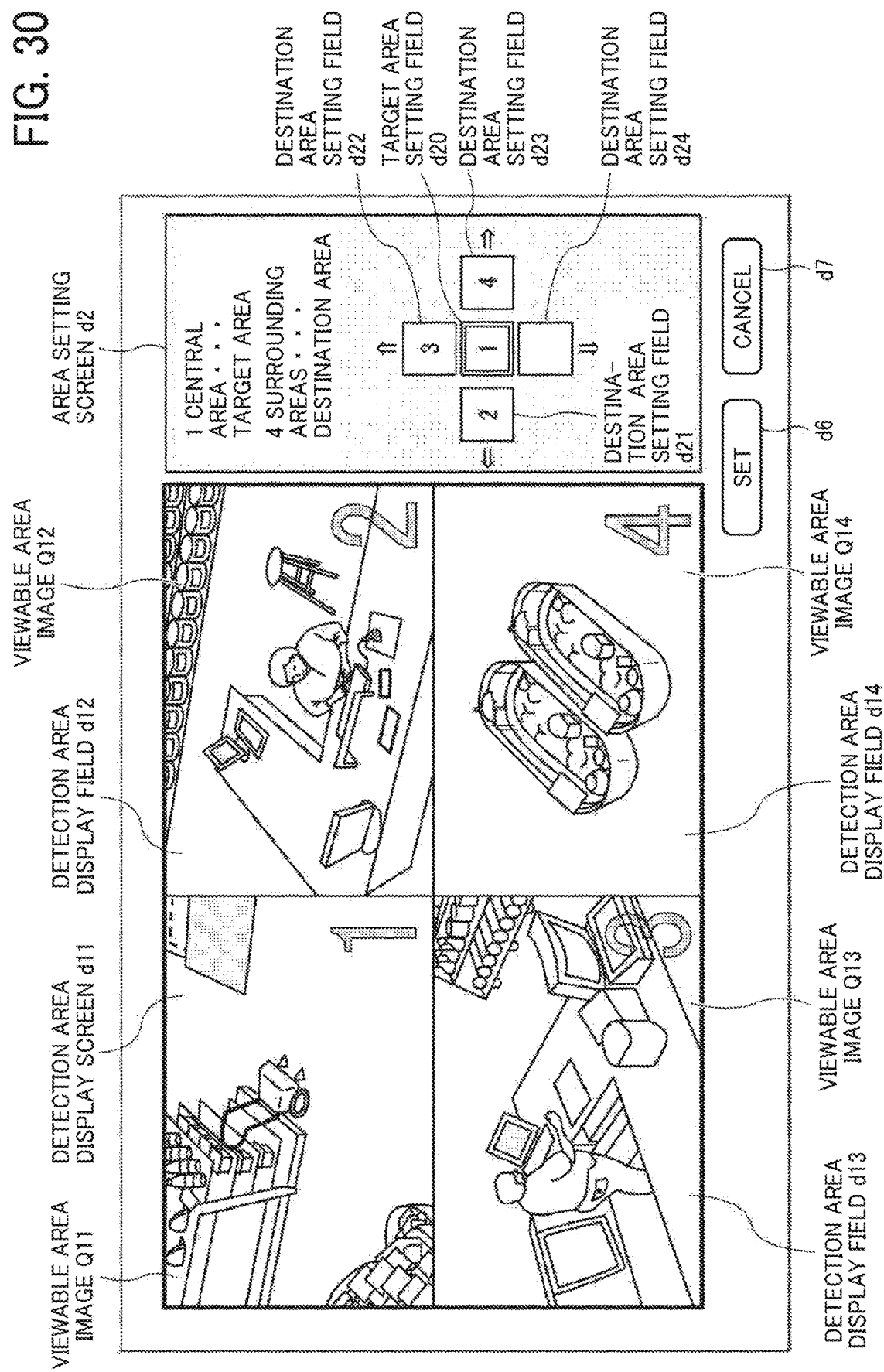
FIG. 30 is a diagram illustrating an example of display area setting screen.
Figure 31A:
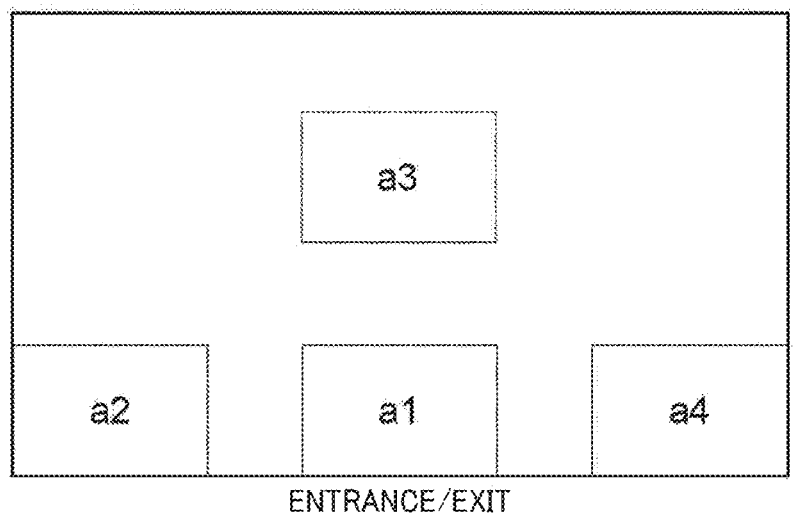
FIG. 31A is a diagram illustrating a plurality of detection areas at a store according to an embodiment.
Figure 31B:
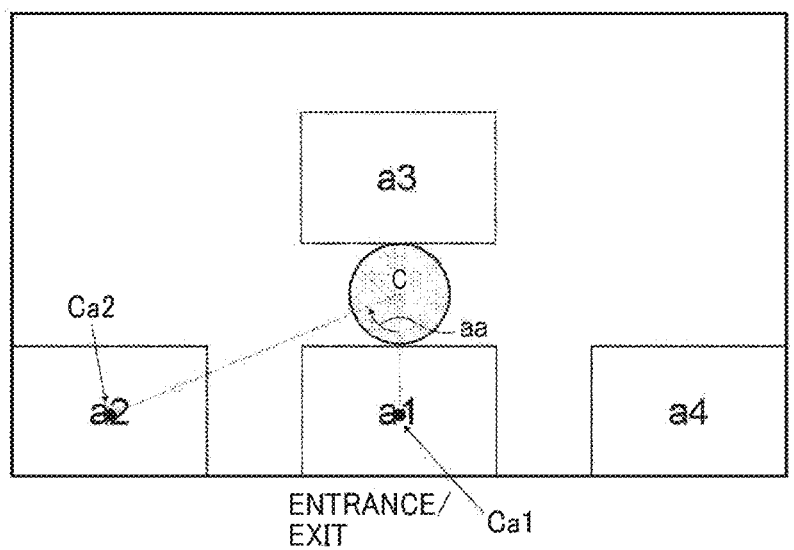
FIG. 31B is a diagram illustrating the relationship between the detection area at the store illustrated in FIG. 31A and the viewable-area information, according to the embodiment.

Next, the display control 67 of the distributed data processing terminal 6 controls the display 517 to display a display area setting screen as illustrated in FIG. 30, based on the captured image data received at S47 (S48). FIG. 30 is a diagram illustrating an example of display area setting screen. As illustrated in FIG. 30, the display area setting screen includes a detection area display screen d1 at left, and an area setting screen d2 at right. Here, the display 517 is an example of a displaying unit. The display control 67 is an example of a display control unit for displaying a screen including a plurality of areas on the display 517. FIG. 31A is a diagram illustrating a plurality of detection areas at the store. FIG. 31B is a diagram illustrating the relationship between the detection area at the store and the viewable area information.

Further, the detection area display screen d1 of FIG. 30 includes a plurality (here, four) of detection area display fields d11 to d14. The detection area display fields d11 to d14 respectively have viewable-area images Q11 to Q14, representing corresponding viewable areas T1 to T4 of one spherical image (an example of a captured image) obtained by capturing the inside of the store. Specifically, the spherical image is the image, such as the image illustrated in FIG. 5B, obtained by the imaging unit 40b as described above.

The area setting screen d2 includes a target area setting field d20 at its center. At left side, upper side, right side, and lower side of the target area setting field d20, destination area setting fields d21 to d24 are provided, respectively. The user inputs one of the numbers "1" to "4" displayed at lower right of the detection area display fields d11 to d14, into corresponding one of the fields d20 to d24, to determine association between each detection area display field and each destination area setting field. As the acceptance unit 62 receives the input, the display control 67 sets the display position of each destination area with respect to the target area. In this example, the detection area display field d11 is set to the target area setting field d20. Further, the detection area display fields d12, d13, and d14 are set to the destination area setting fields d21, d22, and d23, respectively. Accordingly, with reference to the viewable-area image Q11 displayed in the detection area display filed d11, the display control 67 causes the viewable-area image Q12, which corresponds to the area a2 located at left of the area a1 in the store (See FIG. 31), to be displayed in the detection area display field d12. Further, with reference to the viewable-area image Q11 displayed in the detection area display filed d11, the display control 67 causes the viewable-area image Q13, which corresponds to the area a3 located back of the area a1 in the store (See FIG. 31), to be displayed in the detection area display field d13. Further, with reference to the viewable-area image Q11 displayed in the detection area display filed d11, the display control 67 causes the viewable-area image Q14, which corresponds to the area a4 located at right of the area a1 in the store (See FIG. 31), to be displayed in the detection area display field d14.

Figure 32:
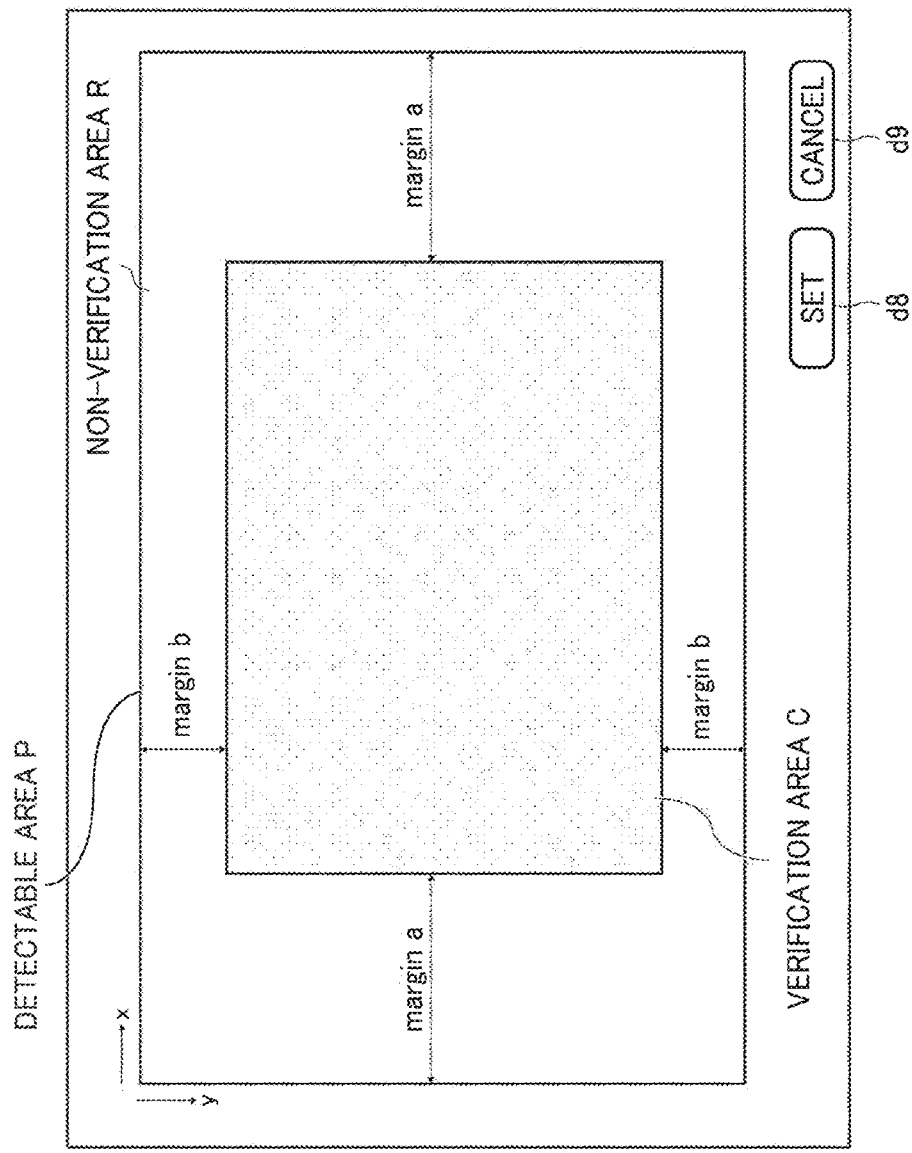
FIG. 32 is an illustration of an example detection area setting screen.

Referring to FIG. 32, operation of changing an area of the store to be displayed in the detection area display field is described according to an embodiment. FIG. 32 is an illustration of an example detection area setting screen. As the user selects the viewable-area image Q11 displayed in one of the detection area display fields (such as the detection area display field d11) illustrated in FIG. 30, for example, by tapping the image Q11, the acceptance unit 62 receives the selection of the detection area display field (or the viewable-area image). Next, the display control 67 of the distributed data processing terminal 6 controls the display 517 to display a display area setting screen as illustrated in FIG. 32.

As illustrated in FIG. 32, the display area setting screen includes a detectable area P, a "SET" button d8, and a "CANCEL" button d9. The detectable area P displays the viewable-area image Q11 of the selected detection area display field d11.

The detectable area P is a range of the image capturing area in which the imaging unit 40 can detect an object (such as a face). The detectable area P includes a verification area C in which an image of the object (i.e., face) can be verified, and a non-verification range R other than the verification area C in which an image of the object cannot be verified.

Still referring to FIG. 32, the verification area C can be defined by margins a and b of the detectable area P. The margin a is arbitrarily set for each of right and left sides in X direction, and the margin b is arbitrarily set for each of upper and lower sides in Y direction.

As described above, the detectable area P is previously determined based on an image capturing area of the imaging element 401a (or the imaging elements 401b1 and 401b2), such that it is usually fixed. The verification area C can be freely set, for example, by changing the margin a or the margin b, so as to match a size or a range of a room or an area where object detection and verification processing is applied. Even after a certain object is detected in the detectable area P, unless the object is not detected in the verification area C, the real-time data processing terminal 3 does not send data to be verified to the centralized data processing server 7, via the terminal data processing device 5 and the distributed data processing terminal 6. This can greatly reduce communication costs.

The "Set" button d8 is a button, when pressed by the user, confirms the detection area. The "Cancel" button d9 is a button, when pressed by the user, cancels setting of the detection area.

Further, the detectable area P is a same range as defined by the viewable area T (see FIG. 7). Therefore, setting the detectable area P means setting the viewable area T. If the detectable area P and the viewable area T have different aspect ratios, the display control 67 displays the image (such as the viewable-area image) so as to match a size of the detectable area P by enlarging or reducing the image while maintaining the aspect ratio of the viewable area T. For example, when the aspect ratio of the detectable area P is 9:16 and the aspect ratio of the viewable area T is 3:4, the display control 67 determines the width of the viewable area T to be the maximum within the detectable area P. The detectable area P can be changed by the user at the distributed data processing terminal 6. The processing of changing and setting will be described with reference to FIG. 29.

The acceptance unit 62 of the distributed data processing terminal 6 receives an input from the user through such as the touch panel 521 (S51). Example types of input via the detection area setting screen illustrated in FIG. 32 include: instructing to change the viewable-area image in the detectable area P by swiping, pinching in, or pinching out; pressing the "SET" button d8; and pressing the "CANCEL" button d9. Examples of the instruction to change the detectable area P include, instruction to display other portion of the spherical image (solid sphere CS as illustrated in FIG. 7A) as a viewable area by swipe (movement), instruction to display a wider area including the viewable area T by pinching in (zoom out), and instruction to display a narrower area of the viewable area T by pinching out (zoom in).

Figure 33A:
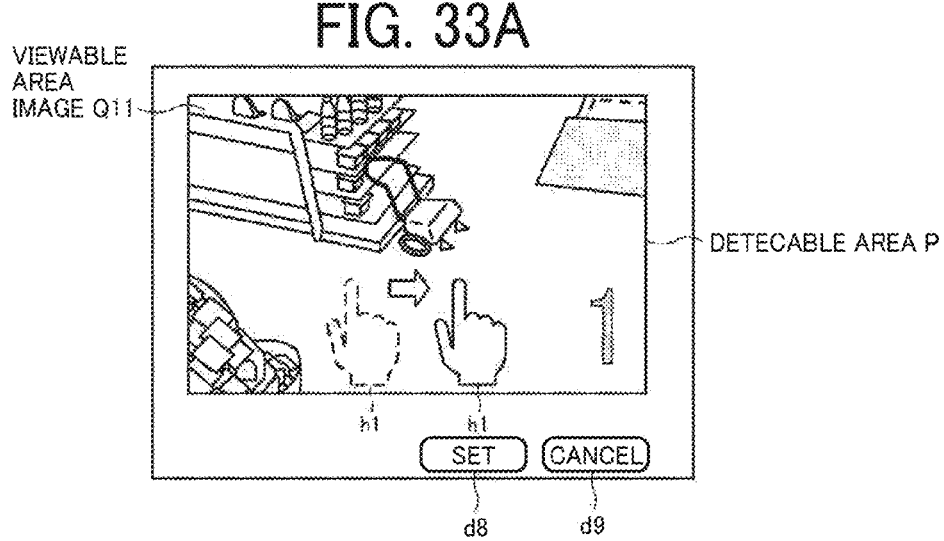
FIG. 33A is a diagram illustrating an example of viewable-area image displayed in a detectable area, before receiving an instruction to change.
Figure 33B:
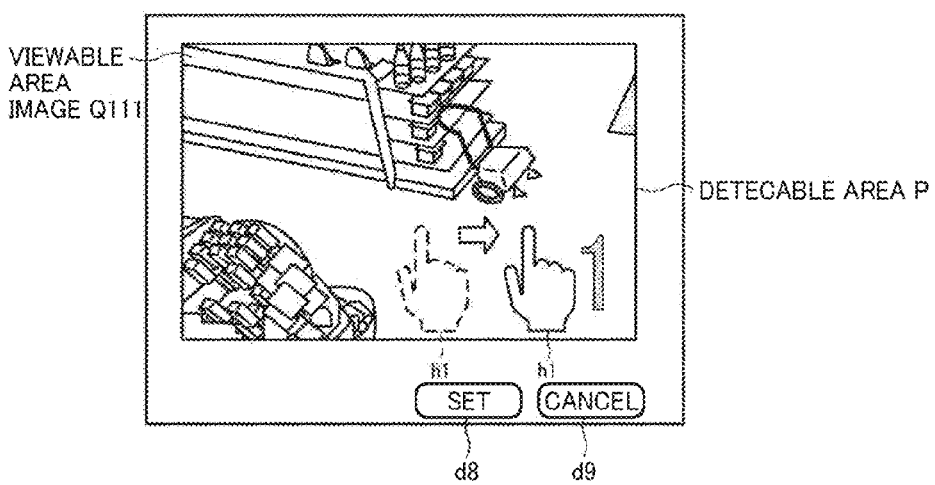
FIG. 33B is a diagram illustrating an example of viewable-area image displayed in the detectable area, switched from the image of FIG. 33A, in response to receiving the instruction to change.
Figure 33C:
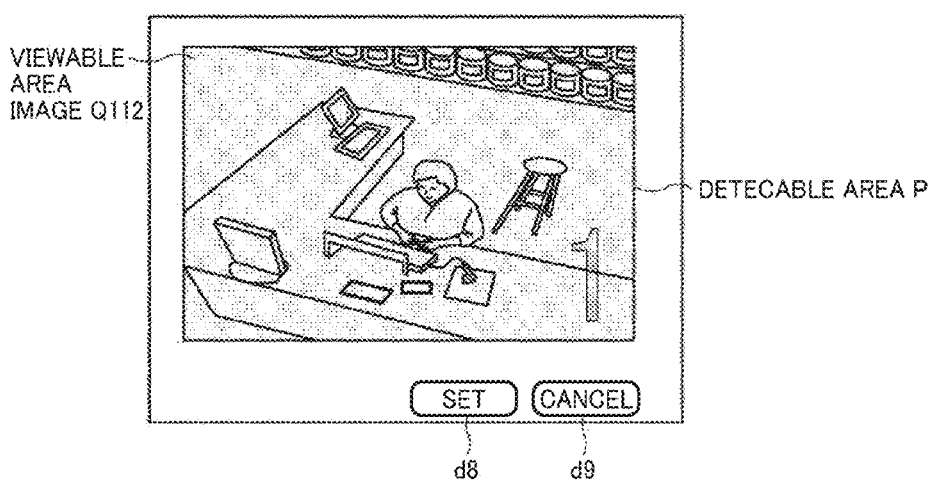
FIG. 33C is a diagram illustrating an example of viewable-area image displayed in the detectable area, switched from the image of FIG. 33B, with warning, in response to receiving the instruction to change.

Referring to FIGS. 33A, 33B, and 33C, an example of changing the viewable-area image displayed in the detectable area P is described. FIG. 33A is a diagram illustrating an example of viewable-area image Q11 displayed in the detectable area P, before receiving the instruction to change. FIG. 33B is a diagram illustrating an example of viewable-area image Q111 displayed in the detectable area P, after receiving the instruction to change. FIG. 33C is a diagram illustrating an example of viewable-area image Q112 displayed in the detectable area P, with warning, after receiving the instruction to change.

As illustrated in FIG. 33A, as the user swipes the viewable-area image Q11 with hand h1 to the right, the acceptance unit 62 receives the instruction to change the detectable area P. Specifically, the display control 67 switches from the viewable-area image Q11 to the viewable-area image Q111 for display in detection area display field d11. As the user presses the "SET" button d8, the acceptance unit 62 receives the setting. The display control 67 then displays the display area setting screen illustrated in FIG. 30. In this case, the viewable-area image Q111 illustrated in FIG. 33B is displayed in the detection area display field d11.

If the user continues to swipe the viewable-area image Q111 illustrated in FIG. 33B with hand h1 to the right, the display control 67 displays the same image as the viewable-area image Q12 (the viewable-area image Q112) in the detectable area P. In such case, the positional relationship between the viewable-area images Q11 to Q14 on the detection area display screen d1, and the area numbers "1" to "4" on the area setting screen d2, illustrated in FIG. 30, does not match. As illustrated in FIG. 33C, the display control 67 displays a warning, for example, by superimposing a mask image (for example, a semitransparent red background color image) on the viewable-area image Q112.

Here, processing to display warning, performed by the display control 67 is described in more detail. FIG. 31B is a diagram illustrating the relationship between the position of the detection area in the store and the viewable-area information. If the virtual camera IC illustrated in FIG. 8 is disposed at the center of the circle C and the elevation angle "ea" of FIG. 8 is fixed, the central point CP of each area can be defined by the horizontal angle (azimuth angle)"aa", as illustrated in FIG. 31B. In FIG. 31B, for the descriptive purposes, the central points for the areas a1 and a2 in the store are indicated by Ca1 and Ca2, respectively.

In the present embodiment, it is assumed that the display control 67, having a function of displaying warning, compares between an azimuth angle of the target area a1 and each one of azimuth angles of the destination areas a2, a3, and a4, and determines whether arrangement of each area satisfies conditions set by the user using the display area setting screen illustrated in FIG. 30. For example, it is assumed that the azimuth angle "aa1" of the area a1 in the store illustrated in FIG. 31B is used as a starting point (0 degree), and the value of azimuth angle increases counterclockwise. FIG. 31B illustrates the arrangement relationship of the areas a1, a2, a3, and a4 in the store, which is set by the user. If the azimuth angles of the areas a2, a3, and a4 in the store are expressed as aa2, aa3, and aa4, respectively, the condition for satisfying this arrangement is aa1<aa2<aa3<aa4. As in the case of FIG. 31B, when the above-described condition is not satisfied, for example, as the viewable-area image of any one of the destination areas a2, a3, or a4 is changed, the display control 67 displays warning as illustrated in FIG. 33C.

The display control 67 may determine to give warning in various other ways. For example, instead of setting the condition satisfying the arrangement as aa1<aa2<aa3<aa4, a threshold may be set for each of the areas a1, a2, a3, and a4 with respect to the horizontal angle aa. The display control 67 may display warning based on a determination of whether the azimuth angle of any one of the areas a1, a2, a3, and a4 exceeds the threshold. The above-described threshold may be set to a value common to the areas a1, a2, a3, and a4, to be used for determining whether to display warning.

Referring back to FIG. 29, when the type of input is instruction to change the detectable area P (S52: change), the display control 67 changes the detectable area P according to an operation indicated by pinching in or pinching out, and displays the viewable image in the detectable area P (S53). Then, operation returns to S51.

When the type of input is pressing of the "SET" button d8 to confirm the detectable area (S52: confirm), the transmitter and receiver 61 transmits a confirmation request to the terminal data processing device 5. (S54). The confirmation request includes viewable area information on the central point CP and the angle of view α for defining the detectable area P (viewable area T) confirmed at S51 and S52. When the detectable area P (viewable area T) is determined after the change accepted at S51 and S52, the confirmation request includes the viewable area information on the central point CP and the angle of view α that are updated. The transmitter and receiver 51 of the terminal data processing device 5 receives the confirmation request.

Next, at the terminal data processing device 5, the storing and reading unit 59 stores the viewable area information in the storage unit 5000 (S55). After S55, the display control 67 causes the display 517 to display the display area setting screen of FIG. 30 (S59).

When the type of input is pressing of the "Cancel" button d9 to cancel setting of the detectable area (S52: Cancel), the transmitter and receiver 61 transmits a request to stop capturing (shooting), to the terminal data processing device 5 (S56). The transmitter and receiver 51 of the terminal data processing device 5 receives the request to stop capturing. Then, the communication unit 58 of the terminal data processing device 5 outputs a request to stop capturing to the communication unit 48 of the real-time data processing terminal 3 (S57). The communication unit 48 of the real-time data processing terminal 3 receives the request to stop capturing. Then, at the real-time data processing terminal 3, the connection unit 38 causes the imaging unit 40 to stop capturing (S58). As described above, processing to set the detection area is completed.

Figure 34:
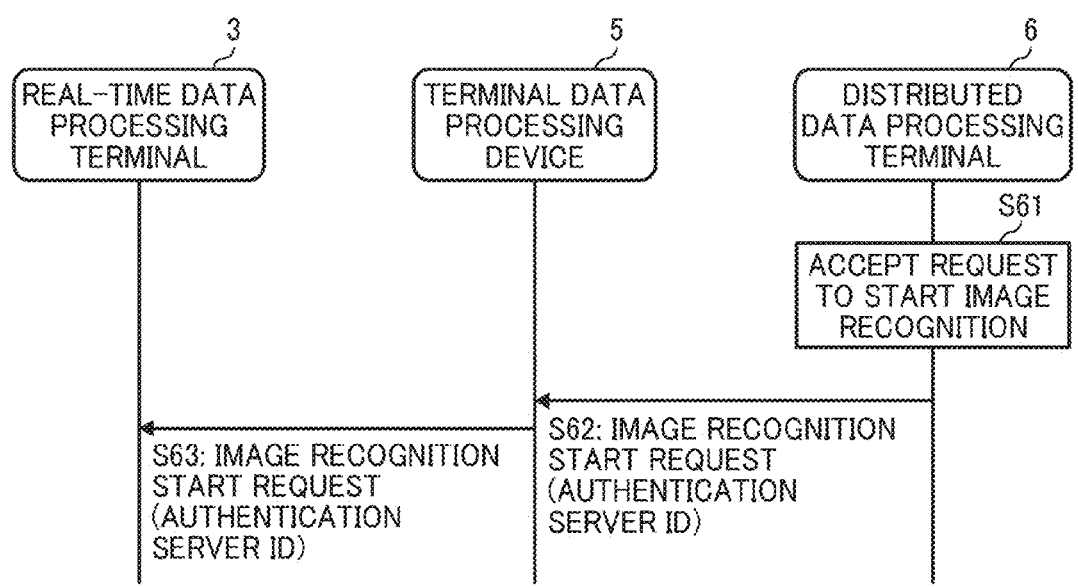
FIG. 34 is a sequence diagram illustrating operation of processing an image recognition start request, performed by the communication system 1, according to an embodiment.
Figure 35:
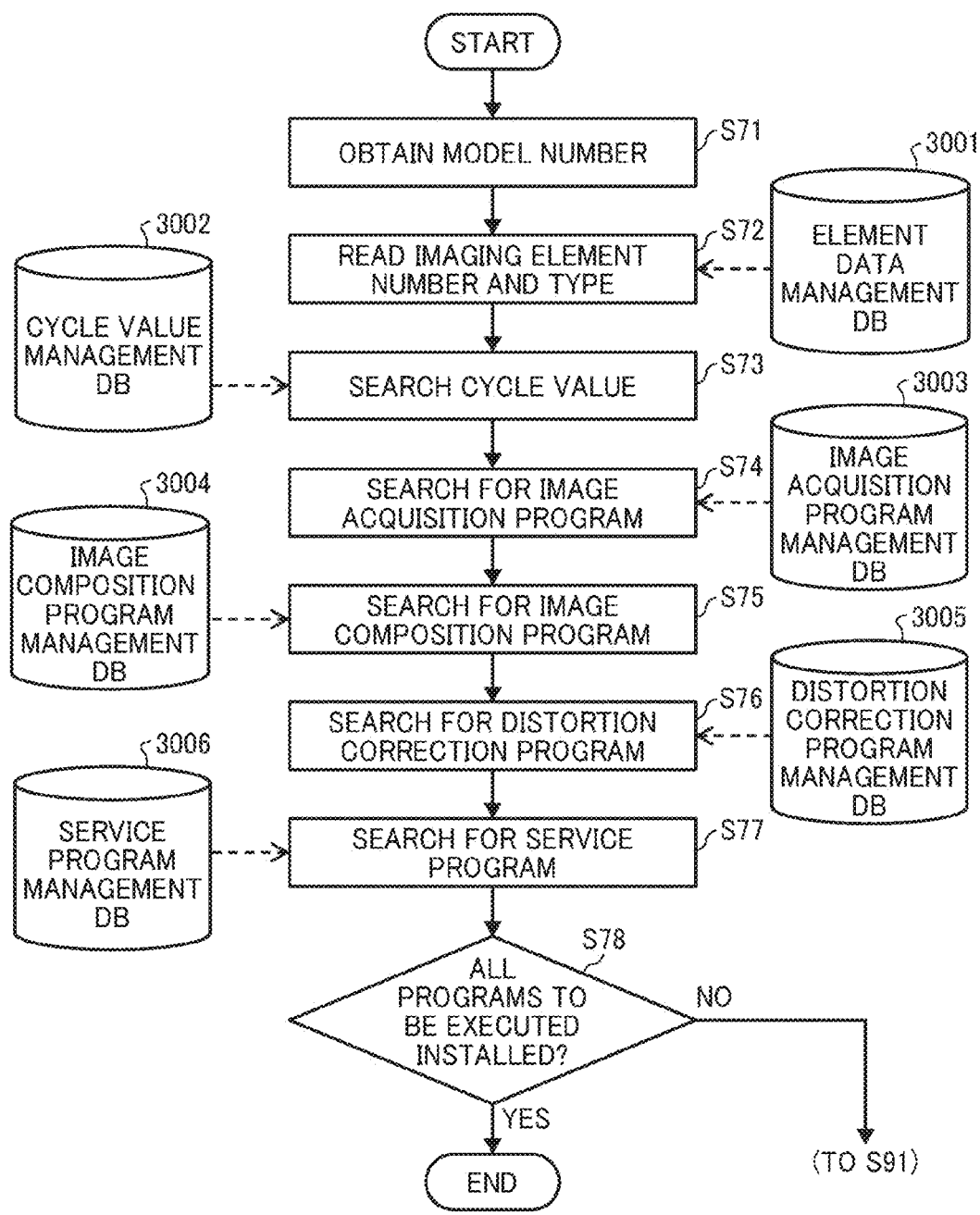
FIG. 35 is a sequence diagram illustrating operation of preparing for real-time processing to be performed by the real-time data processing terminal, according to an embodiment.
Figure 36:
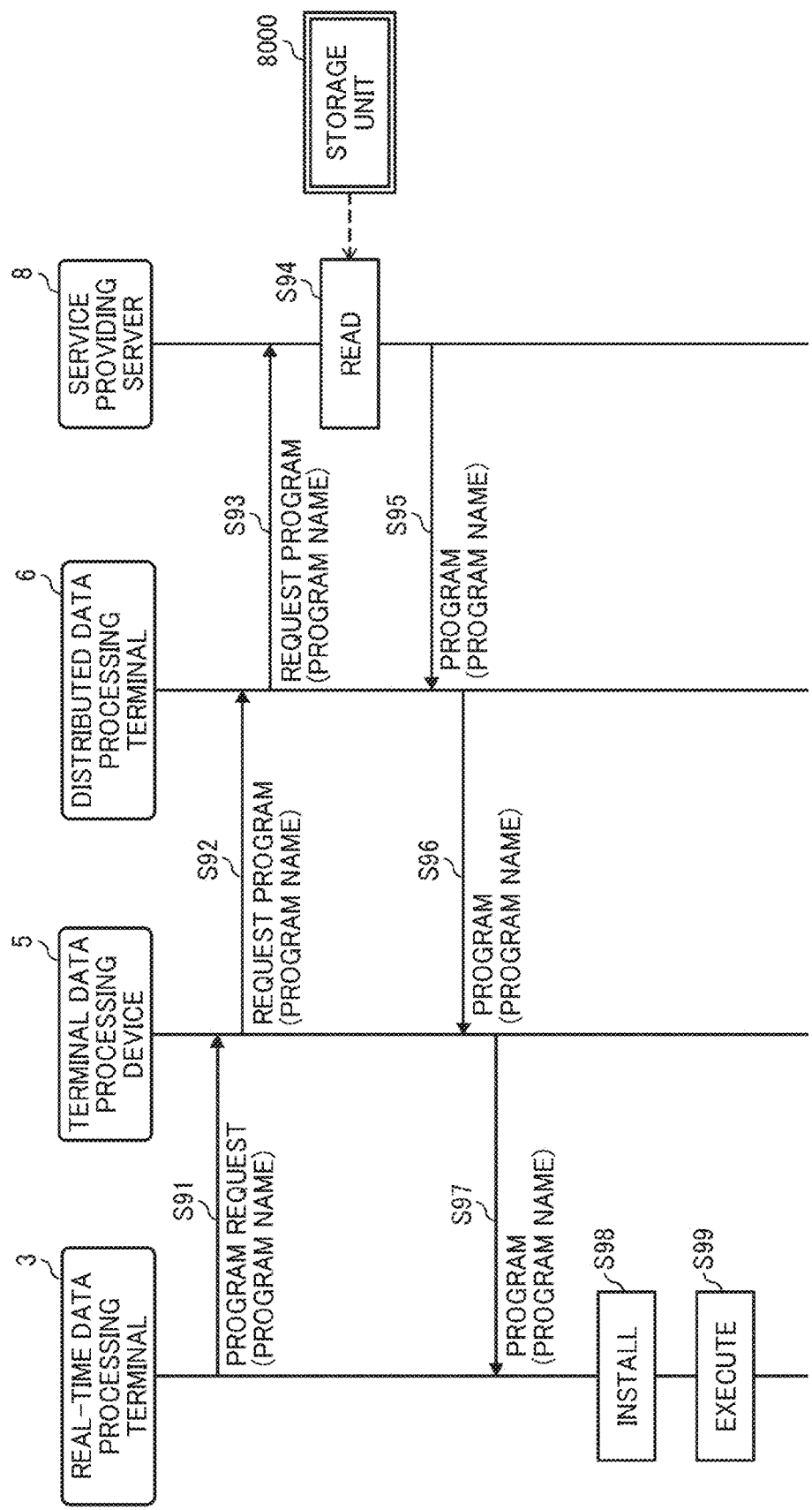
FIG. 36 is a sequence diagram illustrating processing to acquire a program, performed by the communication system of FIG. 1, according to an embodiment.

Image Recognition Preparation Processing:

Referring now to FIGS. 34 to 36, image recognition preparation processing is described according to the embodiment. FIG. 34 is a sequence diagram illustrating operation of processing an image recognition start request, performed by the communication system 1, according to an embodiment.

As illustrated in FIG. 34, at the distributed data processing terminal 6, the acceptance unit 62 accepts a request to start image recognition from the user (S61). In this example, the distributed data processing terminal 6 displays a screen to the user using a GUI (Graphical User Interface), which allows the user to input an instruction. In response to a user instruction, the transmitter and receiver 61 of the distributed data processing terminal 6 transmits a request to start image recognition to the terminal data processing device 5 (S62). The start request includes an authentication server ID for identifying the authentication server 9 that has performed the above-described authentication processing (FIGS. 24 and 25). The transmitter and receiver 51 of the terminal data processing device 5 receives the image recognition start request. The communication unit 58 of the terminal data processing device 5 transmits the image recognition start request to the real-time data processing terminal 3 (S63). The communication unit 48 of the real-time data processing terminal 3 receives the image recognition start request. As described above, since the user interface is separate from the real-time data processing terminal 3, remote control of the real-time data processing terminal 3 is made possible from the distributed data processing terminal 6 that provides a user interface for the real-time data processing terminal 3.

FIG. 35 is a sequence diagram illustrating operation of preparing for real-time processing to be performed by the real-time data processing terminal 3, according to the embodiment. As illustrated in FIG. 35, the connection unit 38 of the real-time data processing terminal 3 acquires the model number of the imaging unit 40 from the imaging unit 40 (S71). In this case, in response to a request for model number from the connection unit 38, the imaging unit 40 transmits the model number of its own imaging unit 40 to the connection unit 38.

More specifically, the storing and reading unit 39 searches the imaging element data management DB 3001 (FIG. 14A) using the model number of the imaging unit 40, acquired from the imaging unit 40 at S71, as a search key, to read the number of imaging elements and the lens type that are associated with the acquired model number (S72). Furthermore, the storing and reading unit 39 searches the cycle value management DB 3002 (FIG. 14B) using the number of imaging elements, which is read at S72, as a search key to obtain the cycle value associated with the number of imaging elements that is read (S73).

Next, the storing and reading unit 39 searches the image acquisition program management DB 3003 (FIG. 15A) for the image acquisition program, using the number of imaging elements read out at S72 as a search key (S74). Similarly, the storing and reading unit 39 searches the image composition program management DB 3004 (FIG. 15B) for the image composition program using the number of imaging elements read out at S72 as a search key (S75). Similarly, the storing and reading unit 39 searches the distortion correction program management DB 3005 (FIG. 15C) for the distortion correction program using the lens type read out at S72 as a search key (S76). Similarly, the storing and reading unit 39 searches the service program management DB 3006 (FIG. 15D) for the service program using the lens type read out at S72 as a search key (S77).

Next, the determiner 33 determines whether or not all the programs to be executed are installed (S78), based on the search results at S74 to S77, each indicating whether or not the program to be executed is managed in the DB. For example, when the search result by the storing and reading unit 39 indicates that the image acquisition program is managed in the DB at S74, the determiner 33 determines that the image acquisition program has been installed. In contrary, when the search result indicates that the image acquisition program is not managed, the determiner 33 determines that the image acquisition program is not installed.

When the determiner 33 determines that all four programs are managed (S78: YES), the operation of FIG. 35 ends. On the other hand, when the determiner 33 determines that at least one program among the four programs is not installed (S78: NO), the operation proceeds to S91 described below.

FIG. 36 is a sequence diagram illustrating processing to acquire a program, performed by the communication system 1, according to the embodiment. In this example, the real-time data processing terminal 3 acquires a program that is determined as not installed through the operation of FIG. 35, from the service providing server 8.

First, as illustrated in FIG. 36, the communication unit 48 of the real-time data processing terminal 3 transmits, to the communication unit 58 of the terminal data processing device 5, a request for a program not installed (S91). This request for program includes a name of the requested program.

Next, the transmitter and receiver 51 of the terminal data processing device 5 transmits the program request received at the communication unit 58 to the transmitter and receiver 61 of the distributed data processing terminal 6 (S92). Then, the transmitter and receiver 61 of the distributed data processing terminal 6 transmits the program request to the transmitter and receiver 81 of the service providing server 8 (S93).

Next, in the service providing server 8, the storing and reading unit 89 reads out a program indicated by the program name included in the program request (S94). Then, the transmitter and receiver 81 transmits the read program to the transmitter and receiver 61 of the distributed data processing terminal 6 (S95). With the read program, a name of the requested program is also transmitted.

Next, the transmitter and receiver 61 of the distributed data processing terminal 6 transmits a program identified with the program name to the transmitter and receiver 51 of the terminal data processing device 5 (S96). The communication unit 58 of the terminal data processing device 5 transmits the program identified with the program name to the communication unit 48 of the real-time data processing terminal 3 (S97).

Next, the storing and reading unit 39 of the real-time data processing terminal 3 installs the program acquired by the communication unit 48. The storing and reading unit 39 further registers, in the tables illustrated in FIGS. 15A to 15D, the program name of the program being installed and the authentication server ID in association (S98).

Next, the storing and reading unit 39 activates all the programs necessary for image recognition processing (S99). Accordingly, the real-time data processing terminal 3 starts the real-time processing as described below, by executing the activated programs.

Figure 37:
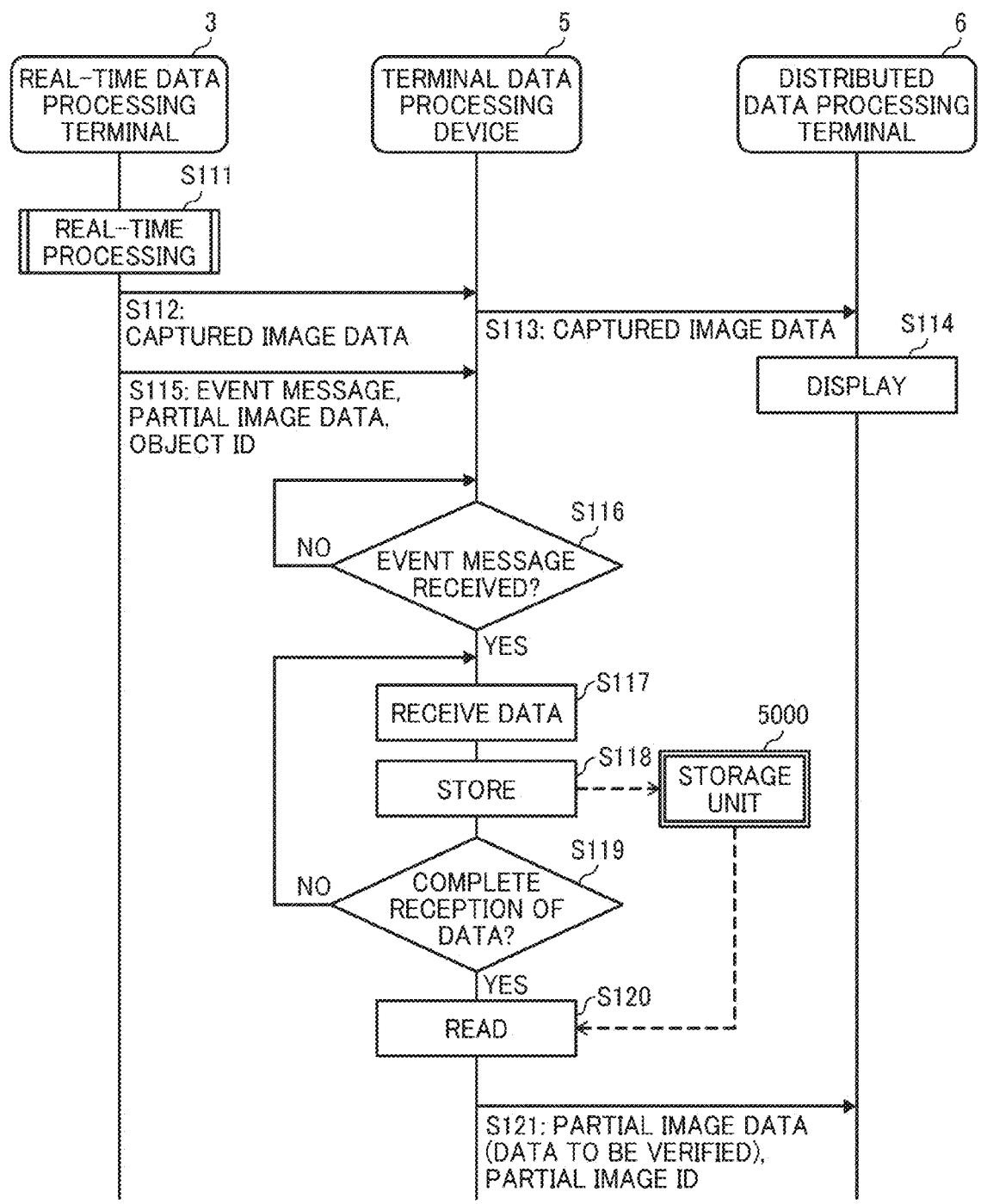
FIG. 37 is a sequence diagram illustrating an example of image recognition processing, performed by the communication system of FIG. 1, according to an embodiment.

Image Recognition Processing:

The following describes the example case in which the "log in to object detection service" button b1 illustrated in FIG. 26 is pressed and the service providing server 8 controls to execute the object detection service from among the image recognition services. FIG. 37 is a sequence diagram illustrating image recognition processing, performed by the communication system 1 of FIG. 1, according to the embodiment. The real-time data processing terminal 3 performs real-time processing (S111).

Object Detection Processing:

Referring to FIGS. 38A and 38B, processing to detect an area, performed in real-time processing, is described according to an embodiment. In the following, processing of FIG. 38B is performed after processing of FIG. 38A. Since processing of FIG. 38A has already been described above, processing of FIG. 38B is described below.

After S203, the object detector 35 searches for feature points in the captured image data, as a candidate of a specific object, to detect the specific object (S207). In this case, the image processing unit 34 executes the processing according to the object detection program (ProgS01 (object detection) described referring to FIG. 15D. Specifically, the image processing unit 34 picks up a rectangular section, one by one, starting from the edge of the captured image, to search for features points that match the shape model data of the object that is previously stored in the storage unit 3000, and specifies a position (coordinates) of the feature points that match the shape model data. The processing of S207 may be performed using any desired known method, such as the method described in, for example, Hitoshi IMAOKA, et. al., "Face recognition technology and its application: features on elemental technologies and solutions supporting public safety", Biometrics authentication, NEC Technical Journal, Vol. 63, no. 3, pp. 26-30, September 2010.

Next, the image processing unit 34 corrects the distortion in the image including the detected object (S208). In this case, the image processing unit 34 executes processing according to the image processing program (ProgW01 (wide-angle correction)) as described above referring to FIG. 15C.

After S206, the operation then proceeds to S207, and the object detector 35 detects the feature points of the object in data of the equirectangular projection image EC, to detect the object. Next, at 5208, the image processing unit 34 corrects the distortion in the image of the detected object. In this case, the image processing unit 34 executes processing according to the image processing program (ProgW02 (fisheye correction)) as described above referring to FIG. 15C.

Figure 45:
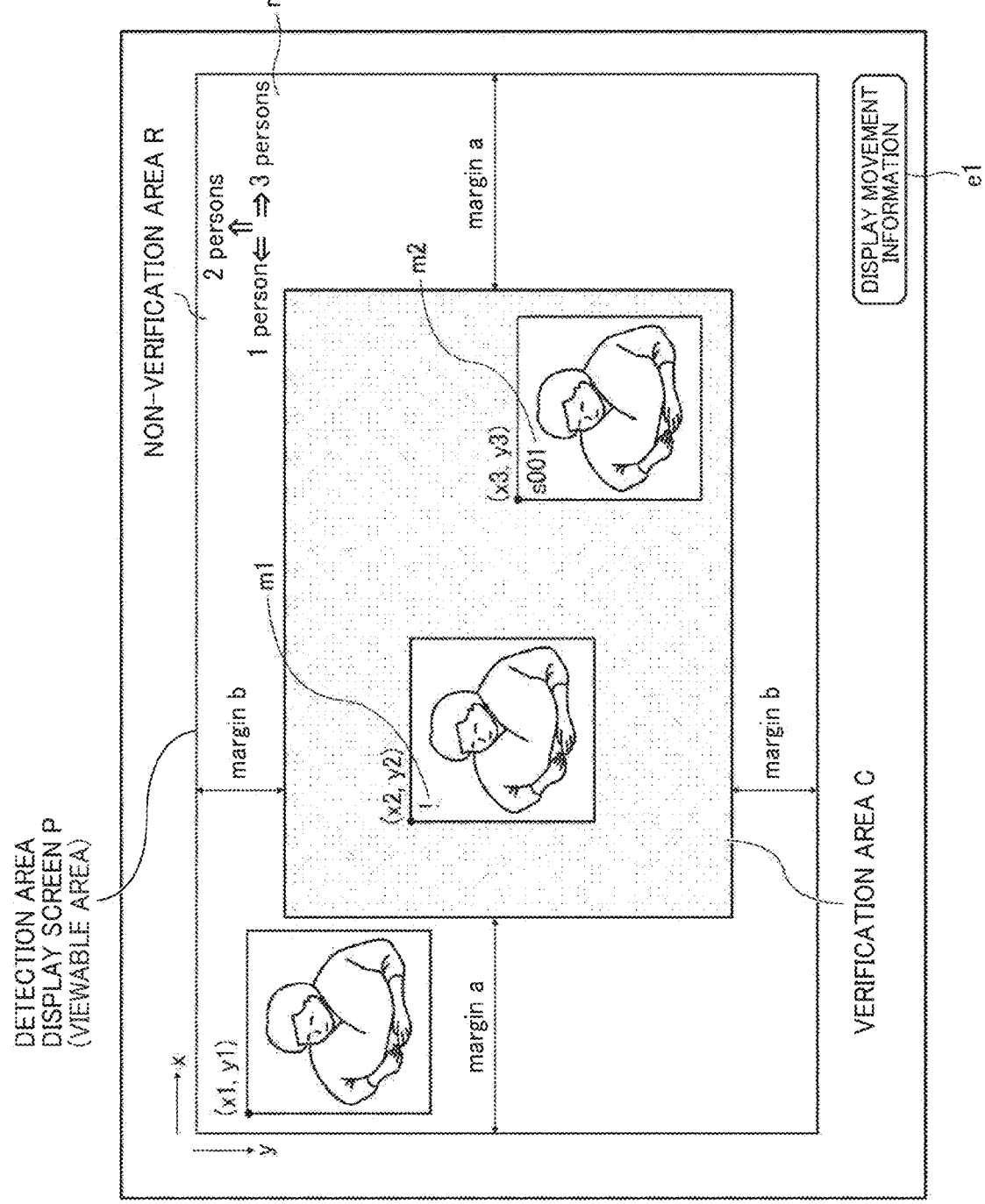
FIG. 45 is a diagram illustrating an example of verification result display screen.

As illustrated in FIG. 37, the communication unit 48 of the real-time data processing terminal 3 transmits captured image data to the communication unit 58 of the terminal data processing device 5 (S112). The transmitter and receiver 51 of the terminal data processing device 5 transmits the captured image data received at S112 to the transmitter and receiver 61 of the distributed data processing terminal 6 (S113). Accordingly, the display control 67 of the distributed data processing terminal 6 causes the display 517 to display a captured image as illustrated in FIG. 45 in real time (S114). FIG. 45 is an illustration of an example captured image, displayed at the distributed data processing terminal 6. The captured image is displayed with a frame that indicates a rectangle having a detected object (in this case, a detected human face). The above-described S112 to S114 correspond to process to stream data.

Figure 39:
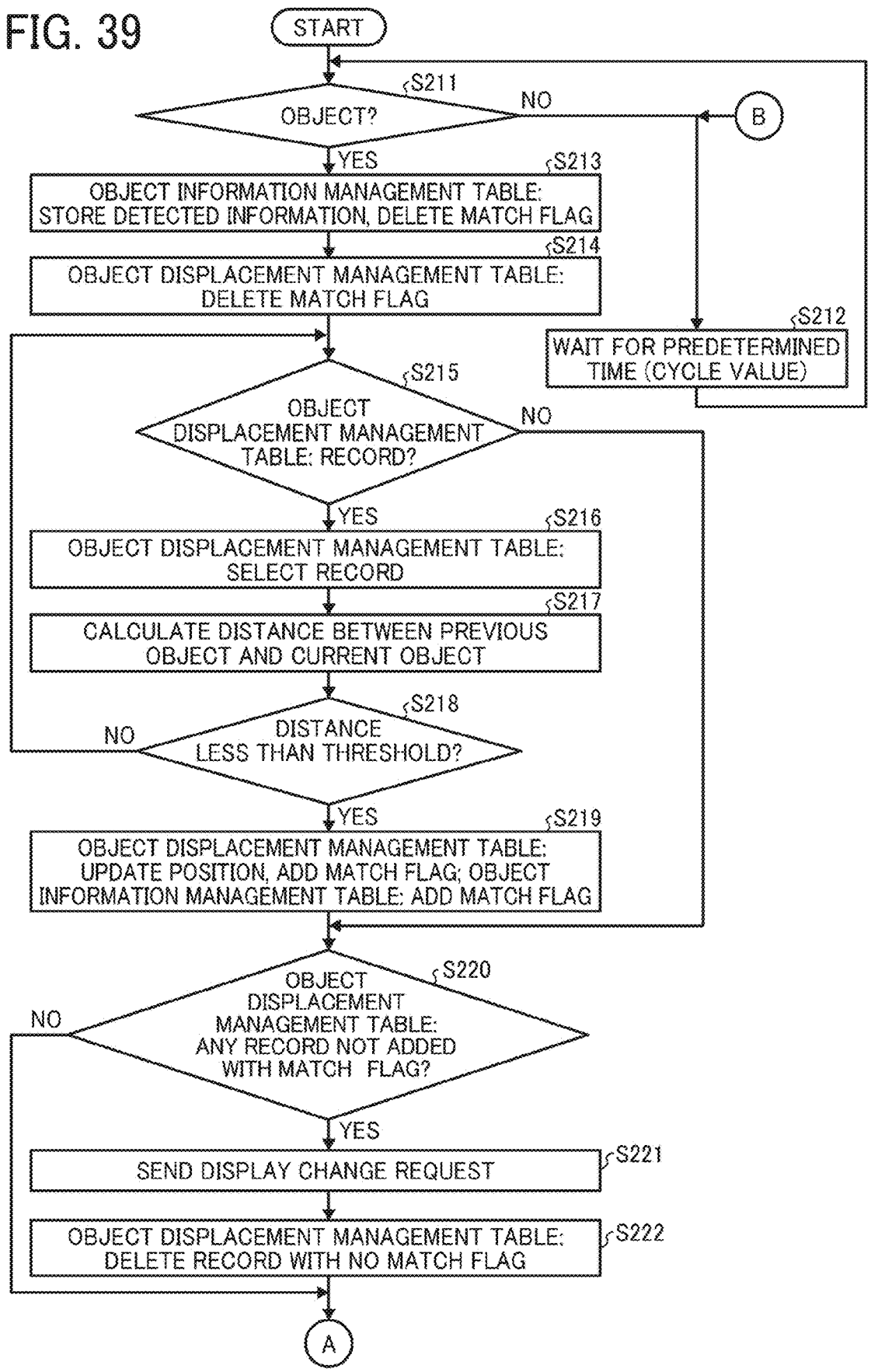
FIG. 39 is a flowchart illustrating an example of event generation processing, performed in the real-time processing of FIG. 37.
Figure 40:
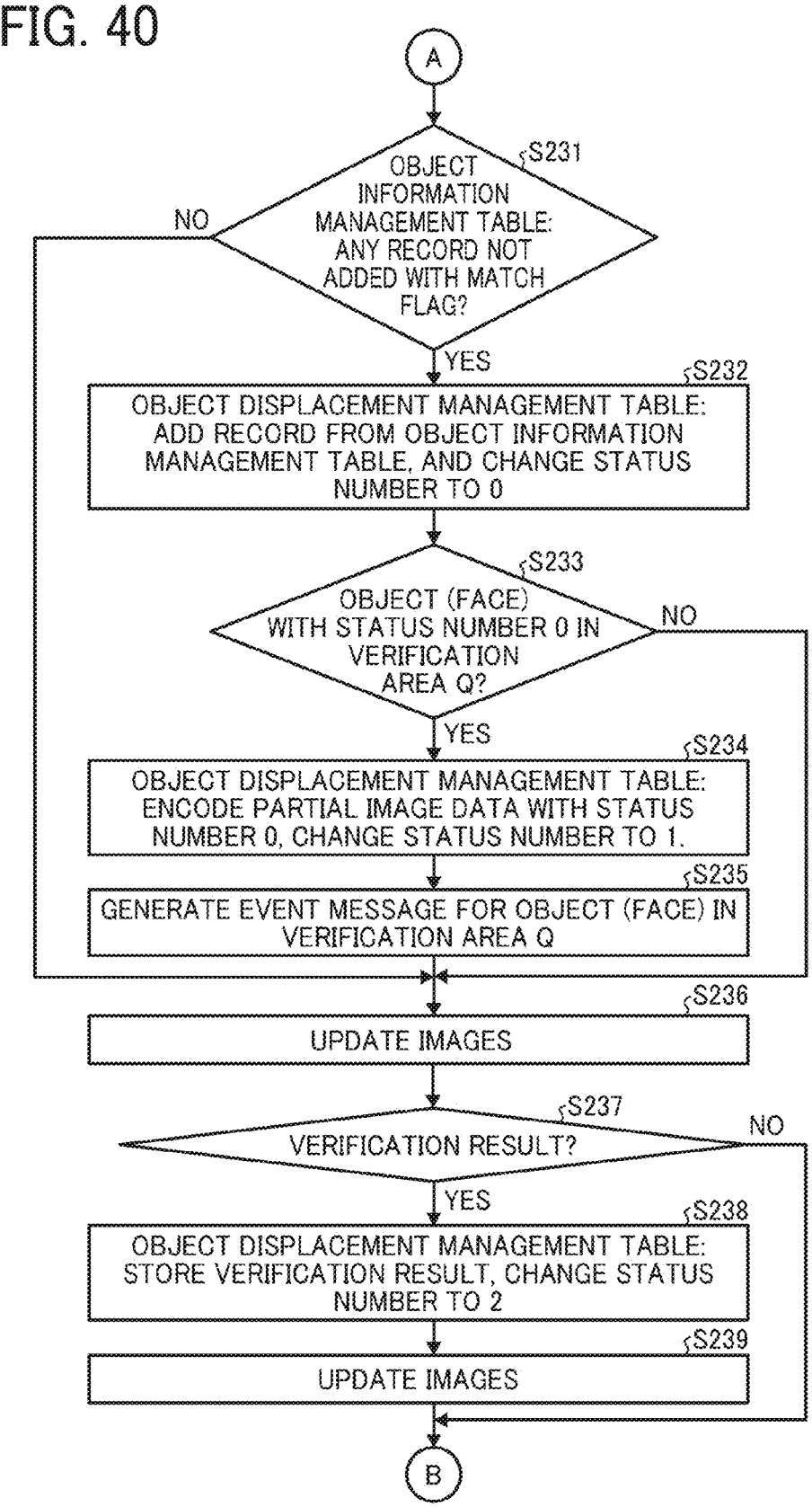
FIG. 40 is another flowchart illustrating an example of event generation processing, performed in the real-time processing of FIG. 37.

Processing to Generate Event:

Next, referring to FIGS. 39 and 40, processing of event generation, performed in the real-time processing, is described according to the embodiment. FIGS. 39 and 40 are a flowchart illustrating an example of event generation processing, performed in the real-time processing.

When the object detector 35 does not detect any object (in this example, a face) at S207 of FIG. 38B (S211: NO), the operation proceeds to S212 to wait for a predetermined time period (preset cycle value), and returns to S211. For example, the preset cycle value is set to 30 times per second, such that detection is performed 30 times a second.

On the other hand, when the object detector 35 detects an object (in this case, a face) at S207 (S211: YES), the operation proceeds to S213. In this case, when the determiner 33 determines that the detected position of object is out of the verification area C, it is determined that no object is detected (S211: NO), and the operation proceeds to S212, and further to S211.

At S213, the storing and reading unit 39 stores object information on the object detected at S207 as a new record in the object information management table (see FIG. 16). The storing and reading unit 39 resets a value of the MATCH flag for all records that have been stored in the object information management table, for example, by deleting the value of the MATCH flag.

The storing and reading unit 39 resets a value of the MATCH flag for all records that have been stored in the object displacement management table (FIG. 17), for example, by deleting the value of the MATCH flag (S214). The MATCH flag has been added at S216 to be described below.

When there is any record in the object displacement management table that can be compared with a particular record in the object information management table (S215: YES), the storing and reading unit 39 selects one record to be read out from the object displacement management table (S216). When there is no more record (S215: NO), the operation proceeds to S220.

The computation unit 31 calculates, for the record that is selected, a distance between the position of the currently-detected object, which is stored in the object information management table at S213, and the position of the previously-detected object, which is stored in the object displacement management table at S216 (S217). The position of the object is indicated by X and Y coordinates. The determiner 33 determines whether the distance calculated at S217 is less than a threshold (S218). In this embodiment, the distance is calculated using Squared Euclidean Distance (SED), as described in $(X-Xn)^2+(Y-Yn)^2$. Alternatively, the determiner 33 may determine whether the calculated distance is equal to or less than the threshold.

Since the SED puts a higher weight on an object with a greater distance, two objects that are near in distance can be easily identified. In alternative to the SED, any desired computation method may be used to calculate a distance. For example, a city block distance may be used. In another example, a number of pixels of the object that are shifted in a specific direction (X direction or Y direction) may be counted to obtain a distance.

Next, when the distance calculated at S217 is less than the threshold (S218: YES), the determiner 33 determines that the currently-detected object and the previously-detected object are the same object, and the operation proceeds to S219. In such case, S215 to S218 are not performed for any other record that may remain in the object displacement management table as a subject for comparison with the particular record in the object information management table. When the distance calculated at S217 is not less than (that is, equal to or greater than) the threshold (S218: NO), the currently-detected object and the previously-detected object are not the same object, and the operation returns to S215. In such case, S215 to S218 are performed for any other record in the object displacement management table as a subject for comparison with the particular record in the object information management table.

The storing and reading unit 39 refers to the object displacement management table to update the position of the previously-detected object stored in the object displacement management table at S216, with the position of the currently-detected object stored in the object information management table at 5213 (S219). After updating, the storing and reading unit 39 adds the MATCH flag to each of the record in the object information management table, and the record in the object displacement management table, for that particular object.

Next, the storing and reading unit 39 determines whether there is any record, in the object displacement management table, that is not added with the MATCH flag (S220). When it is determined that there is any record having no MATCH flag (S220: YES), the communication unit 48 of the real-time data processing terminal 3 transmits a display update request that instructs to change display, to the communication unit 58 of the terminal data processing device 5 (S211).

Figure 41:
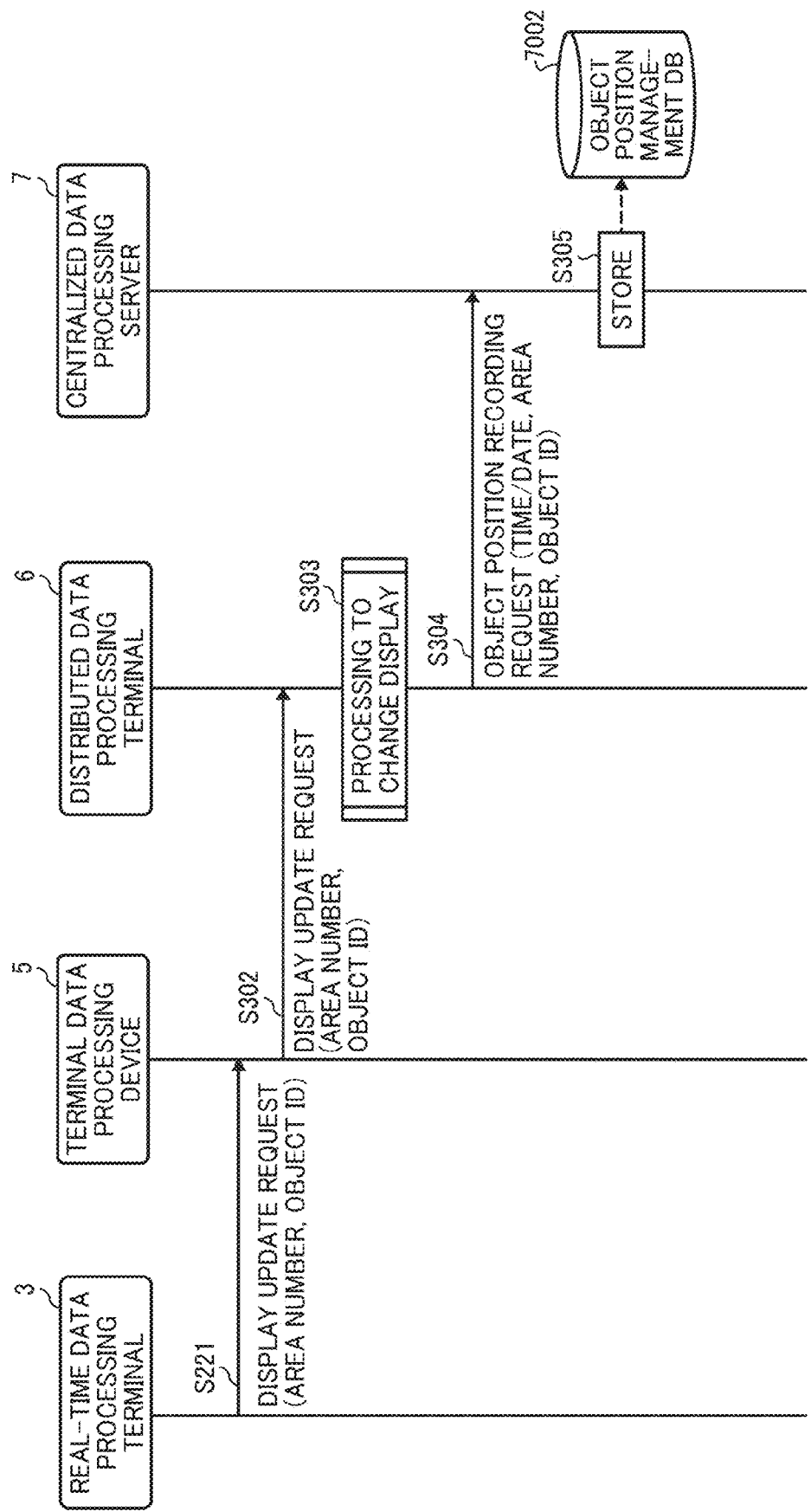
FIG. 41 is a sequence diagram illustrating processing to display a number of counts for entry or exit, and storing movement information, according to an embodiment.

Referring to FIG. 41, processing to display a number of counts of moving objects, and storing movement information is described according to the embodiment. FIG. 41 is a sequence diagram illustrating processing to display a number of counts for entry or exit, and storing movement information, according to an embodiment.

The communication unit 48 of the real-time data processing terminal 3 transmits a display update request that instructs to change display, to the communication unit 58 of the terminal data processing device 5 (S221), as described above. The display update request includes an area number indicating an area, in the store, where an object as a person is detected, and an object ID of the detected object. The communication unit 58 of the terminal data processing device 5 receives the display update request. The transmitter and receiver 51 transmits (transfers) the display update request to the distributed data processing terminal 6 (S302). Accordingly, the transmitter and receiver 61 of the distributed data processing terminal 6 receives the display update request.

Figure 42:
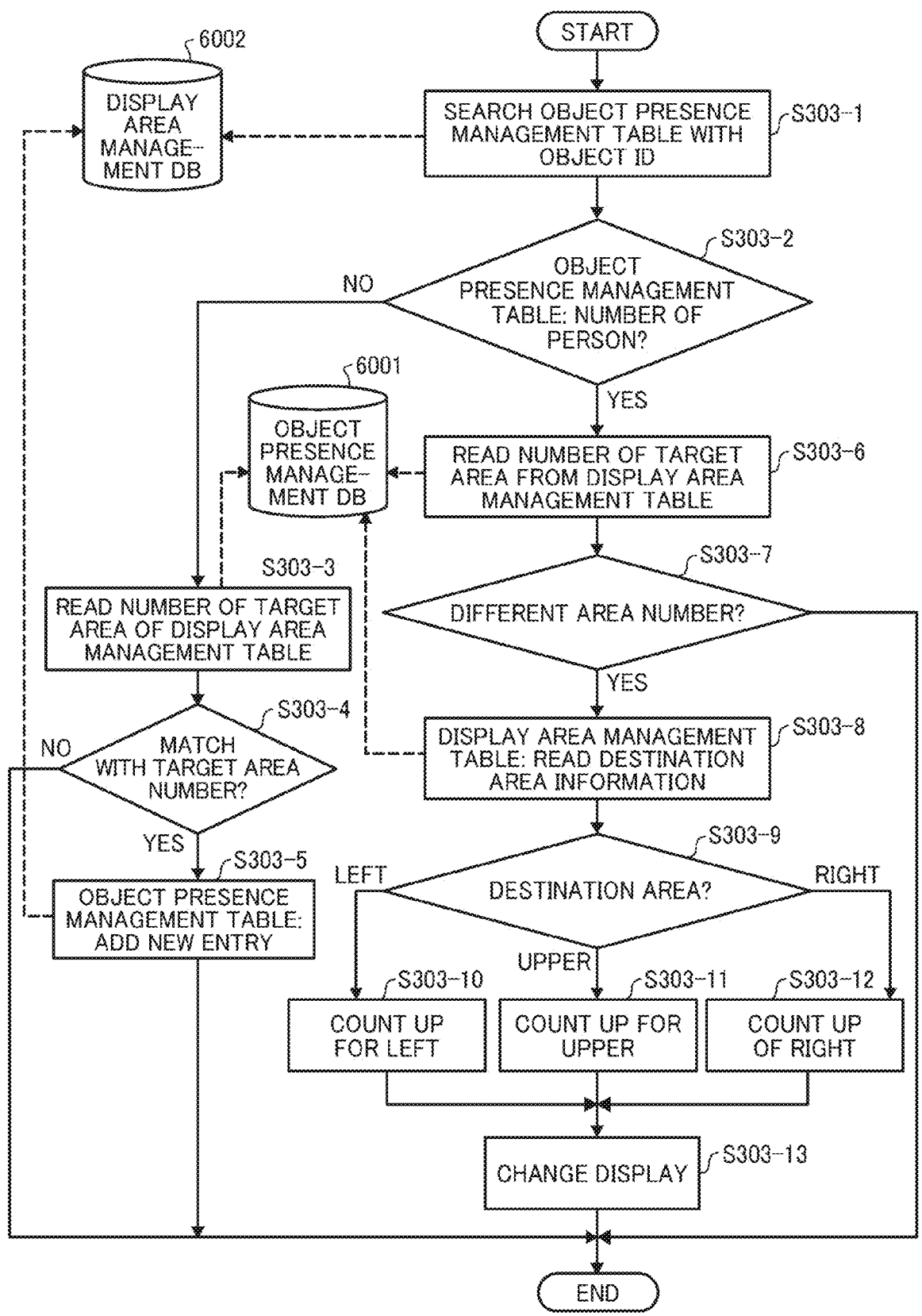
FIG. 42 is a flowchart illustrating processing to change display, at the distributed data processing terminal, according to an embodiment.

Next, the distributed data processing terminal 6 performs processing to update display (S303). Referring to FIG. 42, processing of S303 is described in detail.

The storing and reading unit 69 of the distributed data processing terminal 6 searches the object presence management DB 6001 (the object presence management table of FIG. 18A) using the object ID received at S302 as a search key (S303-1). Then, the determiner 63 determines whether the object ID that matches the object ID of the search key is stored in the object presence management DB 6001 (S303-2).

When the same object ID is not stored in the object presence management table (S303-2: NO), the storing and reading unit 69 further refers to the display area management DB 6002 (the display area management table of FIG. 18B)) to read the target area number (S303-3).

Next, the determiner 63 determines whether or not the area number received at S302 matches the target area number read at S303-3 (S303-4). When the area numbers do not match (S303-4: NO), operation of FIG. 42 ends. On the other hand, when the area numbers match (S303-4: YES), the storing and reading unit 68 adds a new record to the object presence management table of the object presence management DB 6001, and stores in the new record the received object number (S303-5). In this embodiment, the target area is set to an area near the entrance of the store, assigned with the area number "1". Alternatively, any other area with a different area number can be set as the target area, for example, by storing a different display area management table according to layout of the store or an area subject to object counting. After processing of S303-5, operation of FIG. 42 ends.

Subsequently, at S303-2, when the same object ID is stored in the object presence management table (S303-2: YES), the storing and reading unit 69 reads out a target area number from the display area management DB 6002 (S303-6).

Next, the determiner 63 determines whether or not the area number received at S302 differs from the target area number read at S303-6 (S303-7). When the area number does not differ from the target area number (that is, same) (S303-7: NO), operation of FIG. 42 ends. When the area number and the target area number are the same for a detected object (person), it is assumed that the person moves out of the area a1 in the store, with the target area number "1", but returns to the area a1, without moving to other area (such as the area a2) of the store as illustrated in FIG. 31. In this embodiment, the above-described target area "1" is an example of first area identification information for identifying a first area, and any other target area number is an example of second area identification information for identifying a second area.

On the other hand, when the area number is different from the target area number (S303-7: YES), the storing and reading unit 69 searches the display area management DB 6002 by using the area number received at S302 as a search key, to read destination area information (left, upper, right, lower) corresponding to the area number (S303-8). When the destination area is "left" (S303-9: left), the computation unit 65 increases a count for "left" by one (S303-10). When the destination area is "upper" (S303-9: up), the computation unit 65 increases a count for "upper" by one (S303-11). When the destination area is "right" (S303-9: right), the computation unit 65 increases a count for "right" by one (S303-12). In this example, since a destination area that is "lower" than the target area will be outside the store, the computation unit 65 does not count in a case when the destination area is "lower".

Next, as illustrated in FIG. 45, the display control 67 changes display of a count display area m3 at the upper right of the verification result display screen (S303-13). In this example, the count display area m3 indicates that, with reference to the area number 1 (starting area), one person has moved to the left area a2, two people have moved to the upper area a3, and three people have moved to the right area a4. The "DISPLAY MOVEMENT INFORMATION" button e1 at the lower right of the verification result display screen is a button for displaying the number of counts per unit time, which will be described later.

The operation of S303 of FIG. 42 ends.

Referring back to FIG. 41, the transmitter and receiver 61 of the distributed data processing terminal 6 transmits an object position recording request for requesting to store the position of an object such as a person, to the centralized data processing server 7 (S304). The object position recording request includes the area number and the object ID received at S302, and information on the date and time when the distributed data processing terminal 6 transmits the object position recording request. The centralized data processing server 7 receives the object position recording request at the transmitter and receiver 71.

Next, at the centralized data processing server 7, the storing and reading unit 79 stores the date and time, the area number, and the object ID, received at S304, in association, as one record in the object position management DB 7002 (FIG. 19B) (S305).

The record in which the date and time, the area number, and the object ID are associated may be deleted after a certain period (for example, three months) has elapsed from the time of being recorded.

Next, referring back to FIG. 39, after S221, the storing and reading unit 39 deletes any record having no MATCH flag (S222), and operation proceeds to S231 of FIG. 40. Any recording having no MATCH flag value in the object displacement management table, is the object that has been previously detected, but no longer detected as there is no information in the object information management table. In such case, the determiner 33 determines that the object is out of the detectable area P (which means that the object is also out of the verification area C). In such case, the storing and reading unit 39 deletes the record from the object displacement management table, such that the object out of the detectable area P is no longer subject to comparison.

On the other hand, when there is no record having no MATCH flag (S220: NO) in the object displacement management table, the operation proceeds to S231 without performing S221.

Next, the storing and reading unit 39 determines whether there is any record, in the object information management table, that is not added with the MATCH flag (S231). When it is determined that there is any record having no MATCH flag (S231: YES), the storing and reading unit 39 adds that record into the object displacement management table, as a record for a new object (S232). Further, the storing and reading unit 39 enters the value "0 (before verification)", for the verification status of the record that is added. That is, when there is a record having no corresponding record in the object displacement management table, it can be determined that such record corresponds to a new object (in this case, a person) that is newly detected in the detectable area P. In such case, information relating to the newly-detected object is added to the object displacement management table, to be ready for verification when such newly-detected object moves into the verification area C.

Further, the storing and reading unit 39 assigns a new partial image ID to the newly-detected object. For example, the partial image ID has a value that is incremented by one, from the partial image ID that has been assigned to the object previously detected for the last time. Even if the record is deleted at S221, the storing and reading unit 39 does not re-number the partial image ID for each record. That is, each object being detected is assigned with a unique ID, which helps to uniquely identify each object having the verification status "1 (verifying)".

When there is no record with no MATCH flag in the object information management table (S231: NO), the operation proceeds to S236.

Next, after S232, the determiner 33 determines whether the object having the verification status "0 (before verification)" in the object displacement management table, is within the verification area C (S233). This determination is made based on the position information of the object. When it is determined that the object is within the verification area C (S233: YES), the image processing unit 34 refers to the position, width, and height of the object that is within the verification area C, in the object displacement management table. The image processing unit 34 then generates partial image data of the object based on the obtained values, and encodes the partial image data in a standard format such as JPEG (S234). This partial image data is transmitted for verification. The storing and reading unit 39 refers to the object displacement management table to change the verification status of the object, to "1 (verifying)".

When it is determined that the object is not within the verification area C at S233 (S233: NO), the operation proceeds to S236. In such case, the partial image data is not transmitted.

Next, the event generator 36 generates an event message, which indicates transmission of the partial image data and the partial image ID for the partial image data, to the terminal data processing device 5 (S235). Specifically, the event generator 36 generates an event message "Send".

Next, the image processing unit 34 updates the captured image data to be transmitted to the distributed data processing terminal 6. The character image to be combined with the captured image data may also be changed according to the verification status. In particular, for the object with the verification status "1 (verifying)", the image processing unit 34 combines the captured image data with a character image indicating the verification status. Specifically, for each partial image having the verification status of "1 (verifying)" in the object displacement management table, the image processing unit 34 refers to the position of the partial image in the object displacement management table, and combines a character image with the captured image such that the character image is displayed at a specific position of the captured image (S236).

FIG. 45 illustrates an example of a combined image, generated by combining the captured image with the character image. Specifically, FIG. 45 is an illustration of an image capturing area of the imaging unit, when the image acquisition terminal is provided in a certain room (in this example, at an entrance of the store such as in a building), according to the embodiment. For example, for the partial image having the verification status "1 (verifying)", the image processing unit 34 refers to the position (x2, y2), and adds a waiting status mark m1 "!", which indicates that the partial image is being verified, to a position of the captured image where the partial image is located. In this example, the waiting status mark m1 is displayed at the coordinates of the position (x2, y2) of the partial image. For example, as illustrated in FIG. 45, for the partial image having the verification status "2 (verification completed)" in the object displacement management table (object displacement management DB 3008), the image processing unit 34 refers to the position (x3, y3) and the object ID m2 (that is, s001), and adds the object ID m2 to a position of the captured image where the partial image is located. The object ID m2 is read out from the object displacement management DB 3008. As described above referring to S112 and S113 of FIG. 37, the communication unit 48 transmits the captured image data, which is obtained at S236 or S239, to the distributed data processing terminal 6. The display control 67 of the distributed data processing terminal 6 controls the display 517 to display a captured image as illustrated in FIG. 45 in real time (S114).

Referring back to FIG. 40, the communication unit 48 determines whether a verification result is received in response to a request for verification (S237). When the communication unit 48 does not receive a verification result at S318 to be described below (S237: NO), the operation proceeds to S212 of FIG. 28.

When the communication unit 48 receives the verification result (that is, the object ID and the partial image ID) (S237: YES), the storing and reading unit 39 stores the received object ID, in the object ID field associated with the received partial image ID in the object displacement management table (S238). Further, the storing and reading unit 39 changes the verification status, from the "1 (verifying)" to "2 (verification completed)". Next, the image processing unit 34 further combines the captured image data with a character image indicating the verification status "2 (verification completed)". Specifically, for each partial image having the verification status of "2 (verification completed)" in the object displacement management table, the image processing unit 34 refers to the position of the partial image in the object displacement management table associated with the received partial image ID, and combines a character image indicating the received object ID with the captured image such that the character image is displayed at a specific position of the captured image (S239). The operation then returns to S212 of FIG. 39. As illustrated in FIG. 45, the display control 67 controls the display 517 to display the partial image representing a particular object captured in the detectable area P. When the object is in the detectable area P, but not within the verification area C, the display 517 displays the partial image data with no character image. When the object enters into the verification area C, the display 517 displays the partial image data with the mark m1, indicating that the object is being verified. When the object has been verified, the display 517 displays the partial image data with the mark m2, indicating that the object has been verified, with the verification result indicating the object ID. Since the image being displayed changes according to the verification status, the user at the distributed data processing terminal 6 is able to promptly know the current verification status of the object being displayed.

The event generation processing, in the real-time processing, ends.

Referring to FIG. 37, the communication unit 48 of the real-time data processing terminal 3 transmits the event message "Send", with the partial image data of the object (in this case, human face), and the partial image ID, to the communication unit 58 of the terminal data processing device 5 (S115).

Next, the data detector 56 of the terminal data processing device 5 determines whether or not the event message "Send" is received at the communication unit 58 (S116). When the event message is received (S116: YES), the communication unit 58 receives the partial image data and the partial image ID transmitted together with the event message (S117). The storing and reading unit 59 temporarily stores the partial image data and the partial image ID in the storage unit 5000 (S118).

Next, the data detector 56 monitors for the partial image data to determine whether reception of the partial image data is completed or not (S119). The processing of S119 is repeated until all items of partial image data is received for all of event messages that are received (S119: NO). When reception of the partial image data is completed (S119: YES), the storing and reading unit 59 reads partial image data and partial image ID, each having been transmitted with the event message and temporarily stored in the storage unit 5000 (S120). The transmitter and receiver 51 transmits all items of partial image data and partial image ID, read out at S120, to the transmitter and receiver 61 of the distributed data processing terminal 6 via the intranet 200 (S121). Accordingly, the transmitter and receiver 61 of the distributed data processing terminal 6 receives all items of partial image data and partial image ID. The partial image data is later used as data to be verified using verification data.

Figure 43:
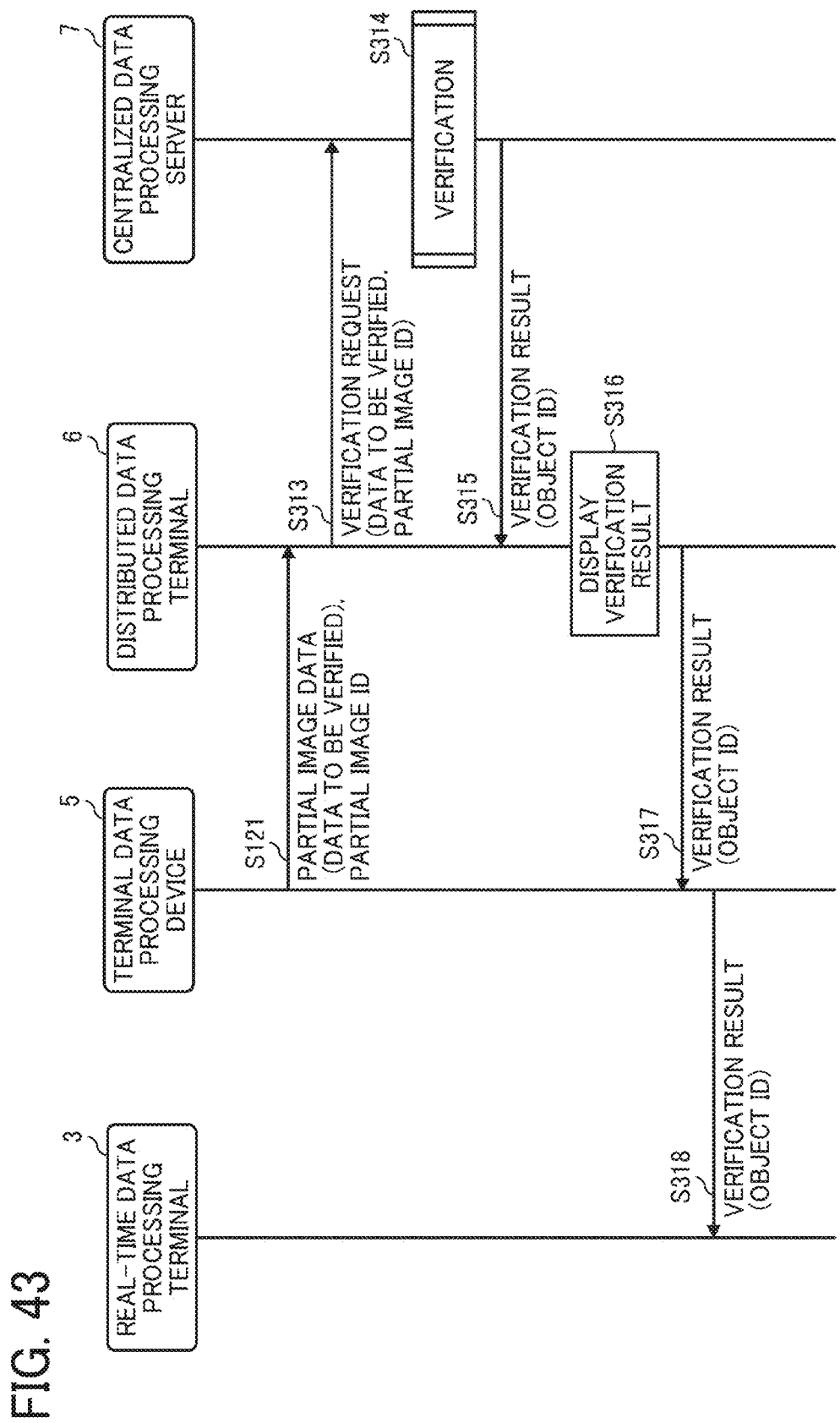
FIG. 43 is a sequence diagram illustrating verification processing, according to an embodiment.
Figure 44:
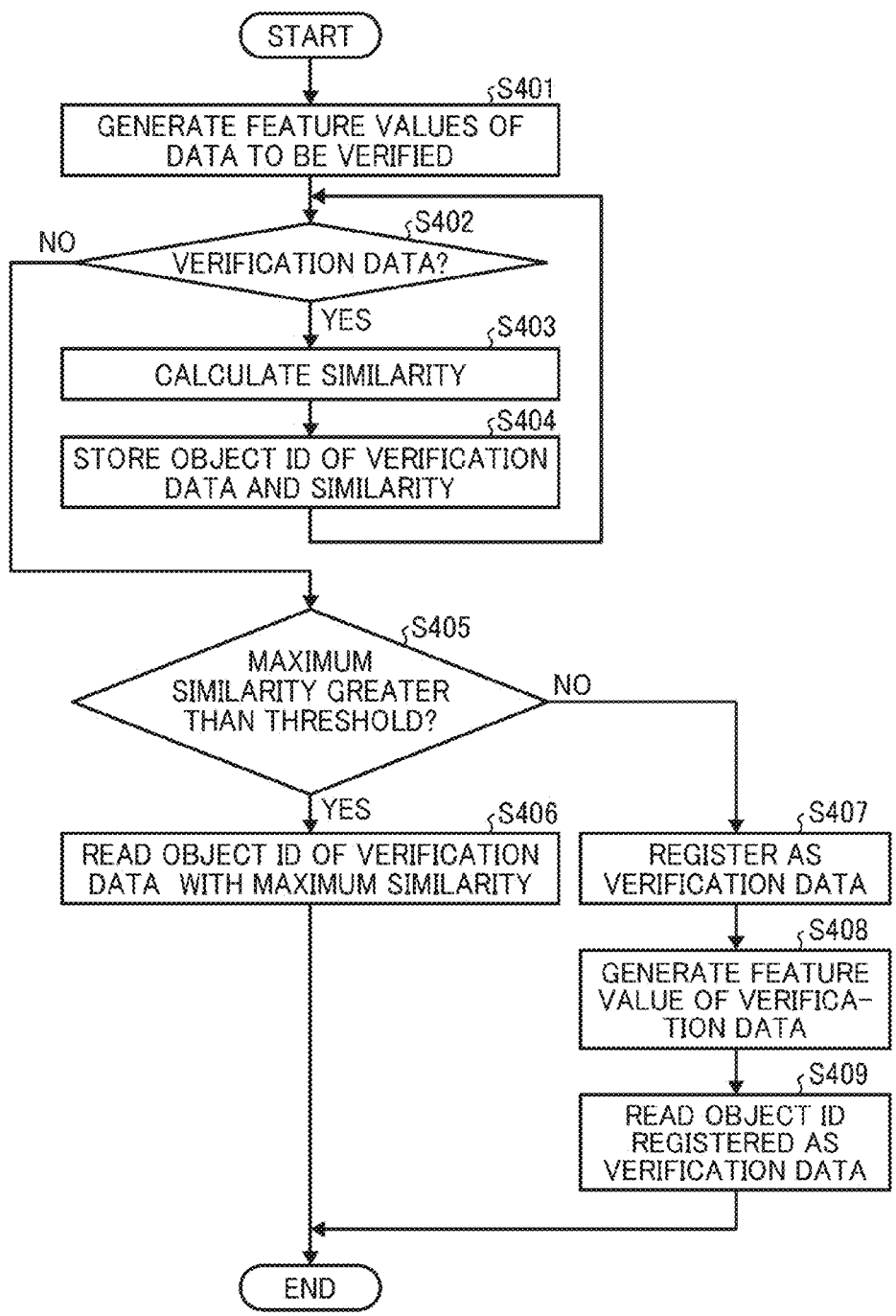
FIG. 44 is a flowchart illustrating verification processing, according to the embodiment.

Verification Processing:

Next, referring to FIGS. 43 to 45, processing of verifying data to be verified, i.e., the partial image data, is described, according to an embodiment. FIG. 43 is a sequence diagram illustrating verification processing, according to the embodiment. FIG. 44 is a flowchart illustrating verification processing, according to the embodiment. FIG. 45 is a diagram illustrating an image capturing area of the imaging unit, when the image acquisition terminal is provided in a certain room, according to the embodiment.

Next, as the transmitter and receiver 61 of the distributed data processing terminal 6 receives the partial image data as data to be verified, and the object ID for identifying the object (the object ID associated with the partial image data), at S121 of FIG. 37, the transmitter and receiver 61 transmits, to the centralized data processing server 7, verification request information indicating a verification request (S313). The verification request includes the partial image data (target data to be verified) and the object ID associated with the partial image data. The centralized data processing server 7 receives the verification request at the transmitter and receiver 71.

Next, the centralized data processing server 7 performs verification processing (S314). Referring to FIG. 44, verification processing is described according to the embodiment.

As illustrated in FIG. 44, the feature value generator 74 of the centralized data processing server 7 decodes the data to be verified, which is received at 5313, into bitmap data, and calculates parameters of feature values for the data to be verified (S401). Such feature value parameters are used to identify an individual using various types of information that can be discriminative such as height or slope of facial components such as a nose or eyes detected in the facial image.

Then, the storing and reading unit 79 searches the verification data management DB 7001 to determine whether or not there is any registered verification data (S402). When it is determined at S517 that there is the registered verification data (S402: YES), the verification unit 75 compares the feature value parameters between the verification data and the data to be verified, and calculates the degree of similarity between these data (S403). Next, the storing and reading unit 79 temporarily stores, in the storage unit 7000, the object ID assigned to the verification data and the "similarity" calculated at S403 in association (S404). The above-described processing from S402 is performed on verification data listed next in the verification data management table in FIG. 19A.

On the other hand, when it is determined at S402 that there is no verification data being registered (including cases where there is absolutely no verification data), the operation proceeds to S405. The determiner 73 determines whether the maximum similarity of the verification data, from among the similarities temporarily stored in the storage unit 7000, is greater than a threshold (S405).

When the determiner 73 determines that the maximum similarity is greater than the threshold (S405: YES), the storing and reading unit 79 reads the object ID assigned to the verification data having the maximum degree of similarity, from the verification data management DB 7001 (S406). The threshold is set to, for example, "80%". When the similarity is less than the threshold, the object ID of such verification data is not read out.

When the determiner 73 determines that the maximum similarity, of the similarities stored in the storage unit 7000, is equal to or less than the threshold (S405: NO), the storing and reading unit 79 registers this data to be verified, as data used for verification (S407). When the verification data is registered, the storing and reading unit 79 assigns an object ID, which is a number that is obtained by incrementing the number of verification data items by one, and registers the verification data in association with the object ID. Next, the feature value generator 74 generates feature values of the registered verification data (S408). Then, the storing and reading unit 79 reads out the object ID associated with the registered verification data at 5407 (S409).

The operation of FIG. 44 ends.

Referring back to FIG. 43, the transmitter and receiver 71 of the centralized data processing server 7 transmits verification result information indicating the verification result that includes the calculated similarity to the distributed data processing terminal 6 (S315). The verification result information includes the object ID that is read at 5406 or 5409, and the object ID associated with the partial image data that is received at 5313. The transmitter and receiver 61 of the distributed data processing terminal 6 receives the verification result information.

Next, the display control 67 of the distributed data processing terminal 6 controls the display 517 to display the screen including the verification result as illustrated in FIG. 45 (S316). In the following, processing to display the verification result is described with reference to FIG. 45. FIG. 45 is an illustration of an example of verification result display screen.

As described above referring to the detectable area setting screen of FIG. 32, the detectable area P is a range of the image capturing area in which the imaging unit 40 can detect an object (in this case, a face). The detectable area P includes a verification area C in which an image of the object (in this case, a face) can be verified, and a non-verification range R other than the verification area C in which an image of the object cannot be verified. Still referring to FIG. 45, the verification area Q can be defined by margins a and b of the detectable area P. The margin a is arbitrarily set for each of right and left sides in X direction, and the margin b is arbitrarily set for each of upper and lower sides in Y direction. Information on the areas, such as the margins a and b, is previously set. For example, such information may be stored in the service program acquired by the real-time data processing terminal 3.

As described above, the detectable area P is previously determined based on an image capturing area of the imaging element 401a, such that it is usually fixed. The verification area C can be freely set, for example, by the user of the distributed processing system 100, so as to match a size or a range of a room or an area where verification processing is applied. Even after a certain object is detected in the detectable area P, unless the object is not detected in the verification area C, the real-time data processing terminal 3 does not send data to be verified to the centralized data processing server 7, via the terminal data processing device 5 and the distributed data processing terminal 6. This can greatly reduce communication costs.

The processing to detect an object at 5207 is performed throughout the detectable area P of the image capturing area. If the detected object is out of the range (in this case, a rectangular area) defined by the margins a and b, that object is not within the verification area C, but within the non-verification area R. In such case, the object in the detectable area P is detected, but not subject to verification as the object is out of the verification area C. That is, the object is detected in a non-verification area R other than the verification area C, of the detectable area P.

Here, (x1, y1) represents the coordinates of the upper left corner of the partial image data, when the object, represented by the partial image data, is detected in the non-verification area R.

(x2, y2) represents the coordinates of the upper left corner of the partial image data, when the object, represented by the partial image data, is detected in the verification area C. Further, the waiting status mark m1 represented by "!" is displayed near the upper left corner (x2, y2) of the partial image data detected in the verification area C. The waiting status mark m1 is displayed during a time period after the time when the distributed data processing terminal 6 transmits the verification request information (S313), until the time when the distributed data processing terminal 6 receives the verification result information from the centralized data processing server 7 (S315).

(x3, y3) represents the coordinates of the upper left corner of the partial image data, when the object, represented by the partial image data, is detected in the verification area C. Further, in FIG. 45, the object ID information m2 represented by "S001" is displayed near the upper left corner (x3, y3) of the partial image data detected in the verification area C. The object ID information, in this example, is the object ID of the partial image for the verified object, received from the centralized data processing server 7 at 5315. As described above, as the object enters the verification area C, the partial image representing the object is displayed with the waiting status mark m1 first, and then with the object ID information m2 after 1 to 2 seconds. With the object ID information, the user is able to know that a person, as the displayed object (in this example, the human face), is present.

Furthermore, as described above, the count display area m3 is displayed at the upper right of the verification result display screen. Referring to FIG. 31, of persons who have entered from the entrance of the store, one person has moved from the area a1 to the area a2, two persons have moved from the area a1 to the area a3, and three persons have moved from the area a1 to the area a4.

Referring back to FIG. 43, the transmitter and receiver 61 of the distributed data processing terminal 6 transmits (transfers) a verification result to the terminal data processing device 5 (S317). The verification result includes the degree of similarity, which is described above referring to S315. The transmitter and receiver 51 of the terminal data processing device 5 receives the verification result.

The communication unit 58 of the terminal data processing device 5 transmits (transfers) the verification result to the communication unit 48 of the real-time data processing terminal 3 (S318). The verification result includes the degree of similarity, which is the same information received at S317. The communication unit 48 of the real-time data processing terminal 3 receives the verification result.

Figure 46:
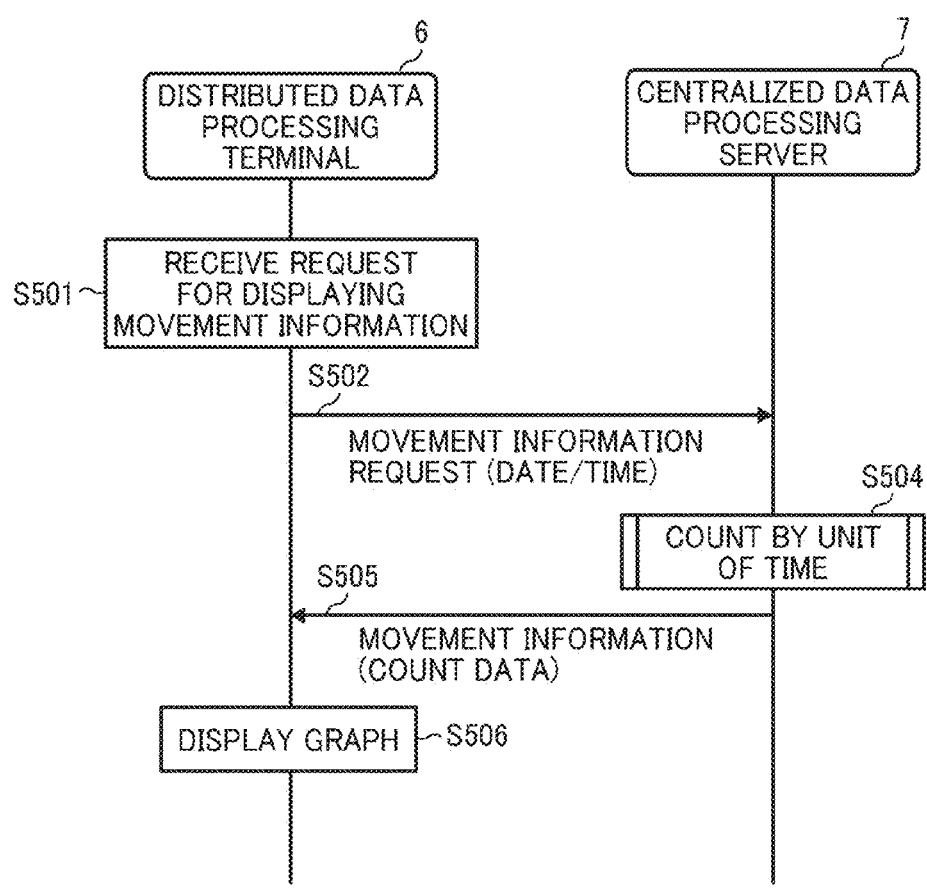
FIG. 46 is a sequence diagram illustrating processing to display movement information according to an embodiment.
Figure 47:
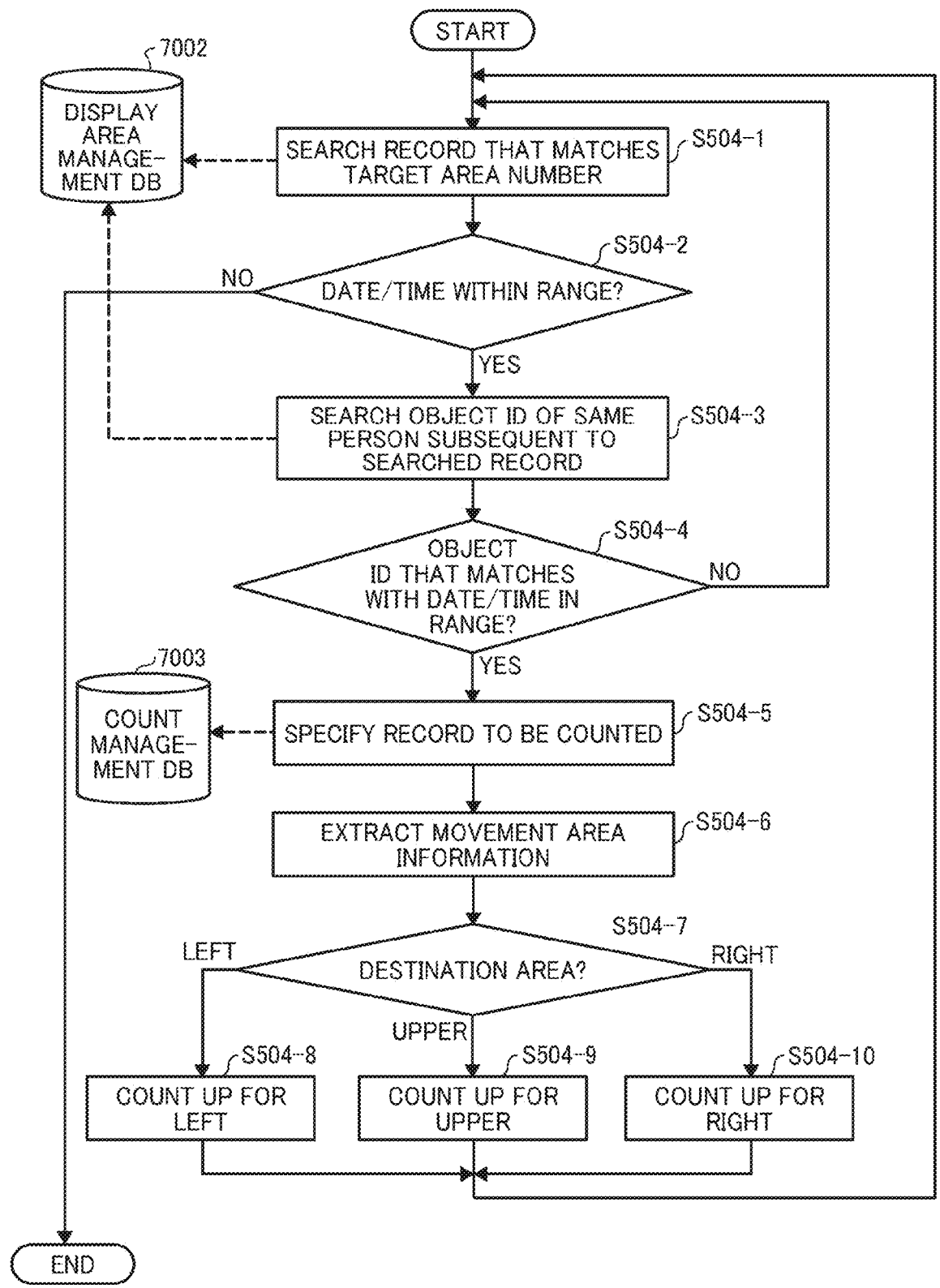
FIG. 47 is a flowchart illustrating processing to count entries or exits at a building, with reference to a direction of movement of an object, according to an embodiment.
Figure 48:
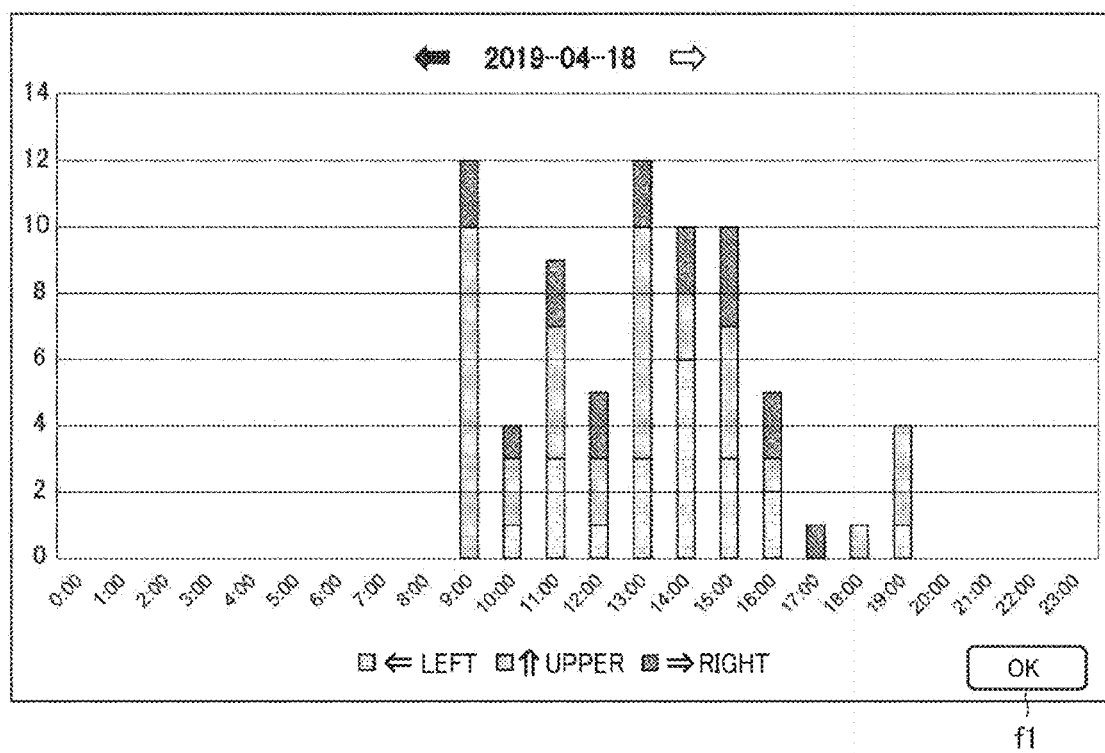
FIG. 48 is a diagram of an example of movement result display screen.

Display of Movement Information:

Referring now to FIGS. 46 to 48, processing to display movement information is described according to the embodiment. FIG. 46 is a sequence diagram illustrating processing of displaying movement information according to the embodiment. FIG. 47 is a flowchart illustrating example processing of counting a number of movements to a predetermined area (for example, the areas a1 to a4 in FIG. 31) in the building, in consideration of the destination direction of the object. FIG. 48 is a diagram of an example of movement result display screen.

First, as the user presses the "DISPLAY MOVEMENT INFORMATION" button el of FIG. 45, the acceptance unit 62 of the distributed data processing terminal 6 receives a request for displaying movement information (S501). Then, the transmitter and receiver 61 transmits a movement information request for requesting movement information to the centralized data processing server 7 (S502). The movement information includes the current date and time, and the display area management table (for example, FIG. 18B). The centralized data processing server 7 receives the movement information request at the transmitter and receiver 71.

Next, the counting unit 76 of the centralized data processing server 7 counts a number of records for the same combination of an object ID, and an area number indicating an area within the store to which a person identified with the object ID has moved, per unit time (in this embodiment, every hour) (S504). Referring to FIG. 47, processing of S504 is described in detail.

First, the storage and reading unit 79 refers to an area number field of the object position management table (FIG. 19B) in the object position management DB 7002, and starts searching, from top to bottom, any record having an area number that matches an area number assigned to the target area of the display area management table (FIG. 18B), received at S502 (S504-1). When the date and time in a date and time field of any of the retrieved records is not within the range to be read (or is outside the range) (S504-2: NO), operation of FIG. 47 ends. For example, when the received current date and time is any time on Apr. 18, 2019, the date and time that falls within the same date (Apr. 18, 2019) is considered to be within the range, and any date and time that is not that date is considered to be outside the range. On the other hand, if the date and time in a date and time field of the retrieved record (an example of the first record) is within the range to be read (S504-2: YES), the storing and reading unit 79 reads the object ID of the searched record, and further searches any subsequent record for the same object ID (an example of the second record) (S504-3). When there is any record for the same object ID, and such record has a date and time that is within the range (S504-4: YES), the operation proceeds to S504-5. When there is no record for the same object ID, or when any record for the same object ID has a date and time that is outside the range (S504-4: NO), the operation returns to S504-1.

When there is any record for the same object ID, and such record has a date and time that is within the range (S504-4: YES), the storing and reading unit 79 searches a time slot field of the count management table (FIG. 19C) of the count management DB 7003, using the date and time of the record retrieved at S504-3, to specify a record subjected to counting (S504-5). In this embodiment, it is assumed that a time slot is one hour. For example, if the date and time of the retrieved record falls within one hour from 8:00 AM on Apr. 16, 2019, the record for the time slot of 2019-04-16 08 is specified.

Next, the storing and reading unit 79 refers to the display area management table (FIG. 18B), received from the distributed data processing terminal 6 at S502, using the area number of the record retrieved at S504-3 as a search key, to obtain destination area information (left, upper, right, lower) of an object such as a person (S504-6). When the destination area is "left" (S504-7: left), the counting unit 76 increases a count for "left" by one (S504-8). When the destination area is "upper" (S504-7: upper), the counting unit 76 increases a count for "upper" by one (S504-9). When the destination area is "right" (S504-7: right), the counting unit 76 increases a count for "right" by one (S504-10). In this example, since a destination area that is "lower" than the target area will be outside the store, the computation unit 65 does not count in a case when the destination area is "lower". After S504-8, 9, and 10, the operation returns to S504-1.

The operation of FIG. 47 ends.

Referring back to FIG. 46, the transmitter and receiver 71 of the centralized data processing server 7 transmits movement information to the distributed data processing terminal 6 (S505). This movement information includes count data that is a result of counts at S504.

Next, the display control 67 of the distributed data processing terminal 6 controls the display 517 to display a movement result display screen including a bar graph as illustrated in FIG. 48, based on the movement information received at S505 (S506). FIG. 48 illustrates a display example of a counted result expressed in bar graph. In the graph of FIG. 48, each bar indicates a number of counts for each destination direction. Through displaying in the form of graph (bar) for each unit time, it is possible to visualize to which direction (destination) the person has moved. In the example of FIG. 48, since the time when the graph is displayed is the current date (Apr. 18, 2019), there is no count for any time after the time when pressing of the "DISPLAY MOVEMENT INFORMATION" button el (for example, after 20:00). Further, with selection of an arrow provided at right of the current date, the screen is updated to display a graph for the next following day. However, since the current date is Apr. 18, 2019 in this example of FIG. 48, the arrow is displayed in different color to indicate that the arrow is not selectable. With selection of an arrow at left of the current date, the screen is updated to display a graph for the previous day, according to operation of FIG. 46. Assuming that the counts for the previous day (Apr. 17, 2019) is displayed, all records of 24 hours are displayed, and the arrow provided at right of the current date is displayed in dark, for example, to indicate that the arrow is selectable to display counts for the next day. When the acceptance unit 62 accepts pressing of the "OK" button f1 at the lower right of FIG. 48, the display control 67 switches from the movement result display screen of FIG. 48 to the verification result display screen of FIG. 45.

As described above, according to one or more embodiments, any area in the captured image may be set as a detectable area in which an object can be detected, for example, using a user interface provided for the distributed data processing terminal, as described above referring to FIG. 30. That is, the distributed data processing terminal operates as an apparatus for setting a detectable area. For example, the distributed data processing terminal displays a viewable-area image representing a viewable area of a captured image, for example, on a detectable area setting screen of FIG. 30. The distributed data processing terminal receives an instruction to set the viewable-area image being displayed, as the detectable area, via the detectable area setting screen of FIG. 30.

For example, the distributed data processing terminal 6 may change the viewable-area image, from one portion to another portion of the captured image, according to user operation of swiping. In another example, the distributed data processing terminal 6 may change a range of the viewable-area image, according to user operation of pinching-in or pinching-out. Accordingly, the user can freely set a desired portion of the captured image, as a detectable area in which an object can be detected. This is useful when the user wants to change a detectable area, without changing a physical location of the camera (imaging unit 40).

Further, with this configuration, a wider area can be detected with less number of cameras. For example, the imaging unit 40, which is a single unit, may be disposed at one location of the store, which is capable of capturing an image of the store. In such case, a viewable-area image, which is an image of a viewable area, can be set as a detectable area in which an object can be detected, in the captured image. Specifically, in this example, the viewable area is any portion of the captured image. This is especially applicable to a case in which a spherical image (such as a 360-degree image), taken with the imaging unit 40b, is used as the captured image. In such case, a viewable-area image, which is an image of a viewable area, can be set as a detectable area in which an object can be detected, in the spherical image. That is, the viewable-area image functions as the image in the detectable area. Accordingly, it is possible to easily set a desired viewable area in the captured image as a detectable area in which the object can be detected. Depending on how large the store is, any number of imaging units 40b may be provided. Further, a type of camera is not limited to the imaging unit 40b, such that the imaging unit 40a capable of capturing a planar image (such as a wide-angle view image) may be used.

In one example, the distributed data processing terminal displays a detectable area setting screen that allows a user to set the detectable area.

In setting the detectable area, the distributed data processing terminal may receive an instruction to change the viewable area via the detectable area setting screen, such as an instruction to change the viewable area from one portion to another portion of the captured image, or an instruction to change a range of the viewable area.

In one example, the distributed data processing terminal displays a plurality of viewable-area images that correspond to different portions of the captured image. In response to selection of one of the viewable-area images, the distributed data processing terminal displays the detectable area setting screen for the selected viewable-area image In one example, the plurality of viewable-area images are respectively displayed in a plurality of display fields on a display area setting screen. The distributed data processing terminal receives an instruction to associate between each of the plurality of display fields on the display area setting screen, and each of a plurality of physical areas of a location where the captured image has been captured.

In one or more embodiments, the distributed processing system 100, which includes the distributed data processing terminal, transmits partial image data, which is a part of a particular object (the object detected in the detectable area), to the centralized data processing server 7 (S313), receives, from the centralized data processing server 7, an object ID identifying an object that is obtained based on a verification result (S315), and transmits to the centralized data processing server 7 a first area number identifying a first area of a plurality of areas included in an image capturing area of the imaging unit 40 and an object ID of an object detected in the first area in association (S304). Accordingly, even when the image capturing area, taken with the imaging unit 40, is divided into a plurality of areas, information on which of the areas the particular object is detected can be obtained. In this example, one or more areas of the plurality of areas do not necessarily set by the user, such that ranges of the areas may be set by default.

Furthermore, through repeating the above-described processing of transmission, even when a particular object moves between a plurality of areas, it is possible to detect and track the particular object, for example, even when the captured image is taken with the imaging unit 40, which is a single image capturing device.

Further, when the same object is captured at the real-time data processing terminal 3, none of the captured image data and the verification request is transmitted from the real-time data processing terminal 3 to the centralized data processing server 7 via the terminal data processing device 5 and the distributed data processing terminal 6. Accordingly, the user of the real-time data processing terminal 3 is not charged more than necessary, thus lowering the communication cost.

In one example, when the instruction to change the viewable area from one portion to another portion of the captured image causes change in positional relationship between at least two of the plurality of viewable-area images, the distributed data processing terminal displays warning.

For example, when setting any one of the areas 2, 3, and 4, the display control unit 67 displays warning, if the positional relationship with respect to the target area 1 changes from the positional relationship having been set at the display area setting screen of FIG. 30, thus preventing an error in setting of area. For example, when the area is set as illustrated in FIG. 30 and the image of the area 2 is to be changed, a semitransparent red, background image is superimposed on a screen, if the area deviates far right from the target area.

In any of the above-described embodiments, the determiner 33 determines whether the objects are the same at 5217 and 5218, based on a distance between the currently-detected object and the previously-detected object. However, determination may be made in various other ways. For example, the determiner 33 may make determinations based on the difference in area between partial image data representing the currently-detected object and partial image data representing the previously-detected object. Specifically, when the following two conditions including condition 1 and condition 2 are satisfied, the operation proceeds to S219. Even when the currently-detected object is close to the previously-detected object, as long as detection areas are greatly different, the determiner 33 may determine that these objects are not the same object. This can reduce transmission of requests, such as requests for verification (S115, S121), which are unnecessary.

(Condition 1) The distance between the previously-detected object and the currently-detected object is less than (or equal to or less than) a threshold (This condition is the same as S218).

(Condition 2) The absolute value of the area difference between the previously-detected object and the currently-detected object is less (or equal to or less than) a threshold. In this example, the area difference of the object is a difference in area calculated by the computation unit 31, from a height and a width of the partial image.

Further, in any one of the above-described embodiments, the waiting status mark m1 may be expressed in any way other than the mark "!". For example, the waiting status mark m1 may be represented by an icon such as an hourglass icon, or a comment such as "verifying" or "authenticating".

In any one or more of the above-described embodiments, any desired data other than the captured image data that has been captured with the imaging unit 40 may be processed, such as image data created by the user. That is, examples of image data to be processed include the captured image data and the image data created by the user. Alternatively, the image acquisition terminal 2, which is an example of a communication terminal, may generate image data rather than obtaining the image data from the outside. Further, the image acquisition terminal 2 may acquire data other than image data, such as audio data by collecting audio or even temperature data from a temperature sensor, or humidity data from a humidity sensor.

Examples of the above-described image data include, not only limited to the captured image data, but also partial image data representing the part of the object (for example, the face of a person) included in the captured image data or the entire object (for example, the whole body of the person). Further, when the image data is created image data, the partial image data may represent a part of a character such as a two-dimensional character or a three-dimensional character included in the created image data, or the entire character.

Further, any one of the CPUs 301, 501, and 701, etc. may be a single processor or a multiple processor. Similarly, any one of the image acquisition terminal 2, the distributed data processing terminal 6, and the centralized data processing server 7 may be implemented by one or more apparatuses such as one or more computers. The distributed data processing terminal 6 may also operate as a server.

Further, in this disclosure, the spherical image does not have to be the full-view spherical image. For example, the spherical image may be the wide-angle view image having an angle of about 180 to 360 degrees in the horizontal direction.

The above-described embodiments are illustrative and do not limit the present invention.

Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses.

The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments (such as the functional units illustrated in FIGS. 8 and 9) may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

This patent application is based on and claims priority pursuant to Japanese Patent Application Nos. 2019-177611, filed on Sep. 27, 2019, 2020-038773, filed on Mar. 6, 2020, 2020-150329, filed on Sep. 8, 2020, and 2020-150328, filed on Sep. 8, 2020, in the Japan Patent Office, the entire disclosure of which is hereby incorporated by reference herein.

REFERENCE SIGNS LIST

2 Image acquisition terminal (an example of communication terminal)
3 Real-time data processing terminal
5 Terminal data processing device
6 Distributed data processing terminal (an example of an apparatus for setting a detectable area)
7 Centralized data processing server (an example of server for verifying image)
31 Computation unit
34 Image processing unit (an example of image processing means)
35 Object detector (an example of object detection means)
38 Connection unit (an example of acquisition means)
51 Transmitter and receiver (an example of transmitting means)
61 Transmitter and receiver (an example of transmitting means, and receiving means)
62 Acceptance unit (accepting means)
65 Computation unit
67 Display control (display controlling means)
69 Storing and reading unit
71 transmitter and receiver
74 Feature value generator
75 Verification unit
76 Counting unit (counting means)
100 Distributed processing system (an example of image processing system)
200 Intranet
517 Display (an example of display means)

600 Internet
3001 Imaging element information management DB
3002 Cycle value management DB
3003 Image acquisition program DB
3004 Image composition program management DB
3005 Distortion correction program management DB
3006 Service program management DB
3007 Object information management DB
3008 Object displacement management DB
6000 Storage unit
7001 Verification data management DB
8000 Storage unit
8001 Session management DB
8002 Authentication server management DB
9000 Storage unit
9001 Authentication management DB

The invention claimed is:

1. An apparatus, comprising:
first processing circuitry configured to,
  display, on a display, a plurality of viewable-area images, the plurality of viewable-area images respectively representing images of a plurality of viewable areas of a viewable-area image representing a viewable area of a captured image having been captured;
  receive an instruction to set the viewable-area image as a detectable area in which an object can be detected, the detectable area including a verification area in which an object identifier of the object can be verified;
  determine whether the object identifier is stored in response to receiving a display update request including the object identifier and a first area number of a first viewable-area image of the plurality of viewable-area images;
  in response to the object identifier being stored, determine whether the first area number matches a target area number; and
  in response to the first area number not matching the target area number, update a count corresponding with a direction of a first area corresponding with the first area number in relation to a target area corresponding with the target area number.

2. The apparatus of claim 1, wherein the first processing circuitry is configured to,
display a detectable area setting screen for allowing a user to set the detectable area, and
receive the instruction to set the viewable-area image as the detectable area, via the detectable area setting screen.

3. The apparatus of claim 2, wherein the first processing circuitry is configured to,
receive an instruction to change the viewable area represented by the viewable-area image via the detectable area setting screen, the instruction to change including an instruction to change the viewable area from one portion to another portion of the captured image, or an instruction to change a range of the viewable area, and
in response to the instruction to change the viewable area, display an updated viewable-area image representing updated viewable area, on the detectable area setting screen, the updated viewable-area image to be set as the detectable area according to the instruction to set the viewable-area image as the detectable area.

4. The apparatus of claim 3, wherein the first processing circuitry is configured to,
receive a selection of one of the plurality of viewable-area images, and
display the detectable area setting screen for the selected viewable-area image, to allow the user to set the detectable area based on the selected viewable-area image.

5. The apparatus of claim 4, wherein the first processing circuitry is configured to,
display the plurality of viewable-area images in a plurality of display fields, respectively, on a display area setting screen, and
receive an instruction to associate between each of the plurality of display fields on the display area setting screen, and each of a plurality of physical areas of a location where the captured image has been captured.

6. The apparatus of claim 5, wherein the first processing circuitry is configured to, display a warning when the instruction to change the viewable area from one portion to another portion of the captured image causes a change in a positional relationship between at least two of the plurality of viewable-area images.

7. An image processing system comprising:
the apparatus of claim 1; and
an image acquisition terminal configured to capture an image to generate the captured image.

8. The image processing system of claim 7, wherein the apparatus further includes:
a transmitter configured to transmit image data representing the-a detected object to a server; and
a receiver configured to receive a verification result from the server, the verification result including the object identifier of the detected object,
wherein the transmitter is configured to transmit an area identifier and the object identifier to the server, the area identifier identifying an associated viewable area in the captured image,
the associated viewable area being one of a plurality of viewable areas in the captured image.

9. The image processing system of claim 8, wherein the transmitter is configured to transmit, to the server, another area identifier identifying another viewable area in the captured image and the object identifier of the detected object based on a determination that the detected object has moved from the viewable area to the another viewable area.

10. The image processing system of claim 8, wherein the image data is partial image data representing a part of the object.

11. The image processing system of claim 8, wherein each of the plurality of viewable areas is a viewable area of a spherical image having been captured with an imaging unit.

12. A communication system comprising:
the image processing system of claim 8; and
the server, the server configured to verify the captured image.

13. The image processing system of claim 7, further comprising:
second processing circuitry configured to,
  count a number of times this a detected object has moved toward each destination direction, per unit time; and
  display a count indicating the number of times the detected object has moved toward each destination direction.

14. The image processing system of claim 7, wherein the captured image is a spherical image.

15. The apparatus of claim 1, wherein the verification area is changeable.

16. The apparatus of claim 1, wherein the first processing circuitry is configured to change the verification area according to at least one of a horizontal margin or a vertical margin with respect to the detectable area.

17. The apparatus of claim 1, wherein the object identifier identifies a particular person.

18. The apparatus of claim 1, wherein the target area corresponds with a currently displayed area image of the plurality of viewable-area images.

19. The apparatus of claim 1, wherein the first processing circuitry is further configured to:
  in response to the object identifier not being stored, determine whether the first area number matches the target area number; and
  store the object identifier in response to the first area number matching the target area number.

20. The apparatus of claim 1, wherein the display update request is in response to the object identifier not corresponding with an object in an object displacement table.

21. A method for setting, comprising:
  displaying, on a display, a plurality of viewable-area images, the plurality of viewable-area images respectively representing images of a plurality of viewable areas of a viewable-area image representing a viewable area of a captured image having been captured;
  receiving an instruction to set the viewable-area image as a detectable area in which an object can be detected, the detectable area including a verification area in which an object identifier of the object can be verified;
  determining whether the object identifier is stored in response to receiving a display update request including the object identifier and a first area number of a first viewable-area image of the plurality of viewable-area images;
  in response to the object identifier being stored, determine whether the first area number matches a target area number; and
  in response to the first area number not matching the target area number, update a count corresponding with a direction of a first area corresponding with the first area number in relation to a target area corresponding with the target area number.

22. A non-transitory recording medium storing a computer readable code which, when executed by processing circuitry, causes the processing circuitry to perform the method of claim 21.

23. An image processing method comprising:
  displaying, on a display, a plurality of viewable-area images, the plurality of viewable-area images respectively representing images of a plurality of viewable areas of a viewable-area image representing a viewable area of a captured image having been captured;
  transmitting image data of an image to a server, the image data representing a detected object detected within a verification area of a detectable area of the viewable-area image;
  receiving a verification result from the server, the verification result including an object identifier of the detected object; and
  transmitting an area identifier and an object identifier of the detected object to the server, the area identifier identifying one of the plurality of viewable areas;
  receiving, from the server, a display update request including the object identifier and a first area number of a first viewable-area image of the plurality of viewable-area images;
  determining whether the object identifier is stored in response to receiving the display update request;
  in response to the object identifier being stored, determining whether the first area number matches a target area number; and
  in response to the first area number not matching the target area number, updating a count corresponding with a direction of a first area corresponding with the first area number in relation to a target area corresponding with the target area number.

24. A non-transitory recording medium storing a computer readable code which, when executed by processing circuitry, causes the processing circuitry to perform the method of claim 23.

* * * * *